United States Patent
Mumma et al.

(10) Patent No.: US 12,117,108 B1
(45) Date of Patent: Oct. 15, 2024

(54) RAIL-PIPE BRACKETS, PIPE CLAMPS, AND RELATED COMPONENTS FOR SUPPORTING SOLAR PANELS

(71) Applicant: Sunmodo Corporation, Vancouver, WA (US)

(72) Inventors: Steve Mumma, Oregon City, OR (US); Roland Jasmin, Vancouver, WA (US); Matthew Danning, Oakland, CA (US); Boutros Abou Chacra, El Cajon, CA (US)

(73) Assignee: Sunmodo Corporation, Vancouver, WA (US)

( * ) Notice: Subject to any disclaimer, the term of this patent is extended or adjusted under 35 U.S.C. 154(b) by 0 days.

(21) Appl. No.: 18/591,356

(22) Filed: Feb. 29, 2024

(51) Int. Cl.
*F16L 3/10* (2006.01)
*H02S 20/10* (2014.01)
*H02S 20/23* (2014.01)

(52) U.S. Cl.
CPC ............ *F16L 3/1075* (2013.01); *H02S 20/10* (2014.12); *H02S 20/23* (2014.12)

(58) Field of Classification Search
CPC ..... F16L 3/1075; F16L 3/1083; F16L 3/1091; H02G 3/32; F16B 2/06; F16B 2/065; F16B 2/10
USPC ... 248/229.13, 229.23, 228.4, 230.4, 231.51, 248/74.4, 74.1, 67.7, 70, 569, 285, 489, 248/517, 279–282, 24
See application file for complete search history.

(56) References Cited

U.S. PATENT DOCUMENTS

| | | | |
|---|---|---|---|
| 631,887 A | 8/1899 | Clark | |
| 749,222 A | 1/1904 | Purdy et al. | |
| 1,102,126 A * | 6/1914 | Barnes | F16B 7/0446 403/236 |
| 1,835,473 A | 12/1931 | Davidson | |
| 2,370,748 A * | 3/1945 | O'Donnell | F16B 7/0493 24/329 |
| 2,547,932 A * | 4/1951 | Downs, Jr. | F16B 2/10 439/100 |
| 2,876,027 A | 3/1959 | Sulmonetti | |

(Continued)

FOREIGN PATENT DOCUMENTS

| CN | 218408792 U | 1/2023 |
|---|---|---|
| DE | 2215707 A1 | 10/1972 |

(Continued)

OTHER PUBLICATIONS

Go Big on Turf, SunTurf Ground Mount System, Mar. 2018, Sunmodo Corporation, Vancouver, Washington.
(Continued)

*Primary Examiner* — Christopher Garft
(74) *Attorney, Agent, or Firm* — Stone Creek Services LLC; Alan M Flum

(57) ABSTRACT

Disclosed are devices that may include brackets and clamps for assembling mounting structures built from pipes and cross-braces. These mounting structures support solar panels. The devices may include a rail-pipe bracket that secures a rail to a pipe. The rail-pipe bracket may include openings for seating a pipe and include hooks for securing the rail. The devices may also include one or more pipe clamps that secure the pipes together. These pipe clamps are adjustable and may accommodate pipes of various sizes thanks to a multi-tier hinge structure.

9 Claims, 42 Drawing Sheets

(56) References Cited

U.S. PATENT DOCUMENTS

| | | | |
|---|---|---|---|
| 3,486,726 | A | 12/1969 | Kindorf et al. |
| 3,721,412 | A | 3/1973 | Kindorf |
| 3,778,537 | A | 12/1973 | Miller |
| 4,157,800 | A | 6/1979 | Senter et al. |
| 4,662,590 | A | 5/1987 | Hungerford, Jr. |
| 4,953,819 | A * | 9/1990 | Davis .................. A61M 5/1415 248/230.8 |
| 5,102,074 | A | 4/1992 | Okada |
| 5,653,411 | A | 8/1997 | Picco et al. |
| 6,012,691 | A | 1/2000 | van Leeuwen |
| 6,464,180 | B2 | 10/2002 | Workman |
| 6,729,585 | B2 | 5/2004 | Ogden |
| 7,011,284 | B2 | 3/2006 | Melius |
| D580,748 | S | 11/2008 | Polak et al. |
| 7,621,486 | B1 | 11/2009 | Barrepski |
| 8,413,944 | B2 | 4/2013 | Harberts et al. |
| 8,882,056 | B2 | 11/2014 | Greenfield |
| 8,984,818 | B2 | 3/2015 | McPheeters et al. |
| 9,057,542 | B2 | 6/2015 | Schuit et al. |
| 10,371,373 | B2 | 8/2019 | Johnson et al. |
| 10,794,654 | B2 * | 10/2020 | Burton ...................... F16B 2/10 |
| 11,079,048 | B2 | 8/2021 | Magagna et al. |
| 11,125,356 | B2 | 9/2021 | Gallegos et al. |
| 11,152,889 | B1 | 10/2021 | Affentranger, Jr. et al. |
| D938,813 | S | 12/2021 | Newton |
| 11,384,780 | B2 | 7/2022 | Katz |
| 11,384,866 | B2 | 7/2022 | Zhang et al. |
| 11,435,010 | B1 | 9/2022 | Bridges |
| 11,463,040 | B2 | 10/2022 | Affentranger, Jr. |
| 11,621,665 | B2 | 4/2023 | Jasmin et al. |
| 2006/0080933 | A1 | 4/2006 | Robicheau |
| 2009/0159759 | A1 | 6/2009 | Ansperger |
| 2010/0116947 | A1 | 5/2010 | Winker |
| 2010/0261390 | A1 * | 10/2010 | Gardner .................. H01R 4/40 439/775 |
| 2015/0096403 | A1 * | 4/2015 | Hirotomi .................. F16B 2/10 74/551.8 |
| 2018/0238359 | A1 * | 8/2018 | Cross ...................... F41C 23/04 |
| 2020/0207279 | A1 * | 7/2020 | Kulick .................. F16M 13/022 |

FOREIGN PATENT DOCUMENTS

| | | |
|---|---|---|
| DE | 19933810 C2 | 11/2002 |
| DE | 102008047787 A1 | 5/2010 |
| DE | 102017204432 A1 | 9/2018 |
| EP | 2985500 B1 | 10/2016 |
| FR | 3123960 A1 | 12/2022 |
| GB | 180802 A | 6/1922 |
| GB | 553631 A | 5/1943 |
| JP | 2000249258 A | 9/2000 |
| WO | 2022204136 A1 | 9/2022 |

OTHER PUBLICATIONS

Own the Roof, SunTurf Roof Mount Advantage, Jun. 2019, Sunmodo Corporation, Vancouver, Washington.

SunTurf Overview, May 2021, Sunmodo Corporation, Vancouver, Washington.

SunTurf Ground Mount System, Oct. 2021, Sunmodo Corporation, Vancouver, Washington.

The Swivel Pipe Cap Kit Can Handle Any Twist or Turn Your Sloped Terrain has to Offer, Nov. 2021, Sunmodo Corporation, Vancouver, Washington.

SunTurf System Parts Guide, Nov. 2021, Sunmodo Corporation, Vancouver, Washington.

Jacob Proctor, Sunmodo Sunturf Ground Mount A9 (85x45) Ground Mount PV Array Installation, Project No. U2716-0276-211, Vector Structural Engineering, LLC, May 2022, downloaded from the Internet from https://knowledgebase.sunmodo.com/wp-content/uploads/2022/05/CA-GM-Package-A9-calc-ASCE-7-16-Exposure-C-140-mph-70-psf-35-deg-OP.pdf on Sep. 10, 2023.

Structural Pipe Fitting: External Coupling, 1 1/2 in For Pipe Size, Cast Iron, 4 in Overall Lg, Item 4NXU9, Grainger, downloaded from the Internet from https://www.grainger.com/product/4NXU9 on Sep. 10, 2023.

Morris 14359 Malleable Rigid Set Screw Coupling, 4" Thread Size, 1-Pack, downloaded from the Internet from https://www.amazon.com/Morris-14359-Malleable-Coupling-Thread/dp/B00VNT2JQ0 on Sep. 10, 2023.

Sigma Electric ProConnex 55245M EMT Set Screw Coupling 2-Inch, 1-Pack, downloaded from the Internet from https://www.amazon.com/Sigma-EMT-2-Inch-Screw-Coupling/dp/B00C3YCUCC/ on Sep. 10, 2023.

M 18 Swivel Weld on Hinge with Nut, downloaded from the Internet from https://www.springcreekproducts.com/M-18-SWIVEL-WELD-ON-HINGE-W-NUT on Sep. 10, 2023.

Bolt on Gate Hinge with Easy Block Nut, Product No. 305F, downloaded from the Internet from https://www.slamproof.co.uk/epages/BT3287.sf/en_GB/?ObjectPath=/Shops/BT3287/Products/305F on Sep. 10, 2023.

Thompson Seatpost Sadle Clamp Bolt/Washer/Barrel Nut, downloaded from the Internet from https://www.pushys.com.au/thomson-seatpost-sadle-clamp-bolt-washer-barrel-nut.html on Sep. 10, 2023.

Tamarack Solar Products Ground Mount System, Rev. 2.2, Jan. 2023, Tamarack Solar Products, Willits, California.

SnapNRack Series 200 System Details, Drawing No. SNR-DC-00202, Aug. 2021, Sunrun South LLC, San Francisco, California.

Ironridge Ground Mount System Datasheet, Version 1.51, Apr. 2023, Ironridge Inc., Hayward, California.

Single Day Install, SunTurf Ground Mount Systems, Apr. 2023, Sunmodo Corporation, Vancouver, Washington.

SunTurf System Parts Guide, May 2023, Sunmodo Corporation, Vancouver, Washington.

SunTurf Overview, May 2023, Sunmodo Corporation, Vancouver, Washington.

SunTurf SMR Ground Mount Installation Manual, D10100 V14.2, May 2023, Sunmodo Corporation, Vancouver, Washington.

Roland Jasmin, U.S. Appl. No. 18/400,244, Unpublished, Filed: Dec. 29, 2023, Assigned to Sunmodo Corporation, Vancouver, Washington.

* cited by examiner

RAIL-PIPE BRACKETS, PIPE CLAMPS, AND RELATED COMPONENTS FOR SUPPORTING SOLAR PANELS

TECHNICAL FIELD

This disclosure relates to rail-pipe brackets, pipe clamps, and other related components for supporting solar panels.

BACKGROUND

Residential and commercial buildings may include solar panels secured to their rooftops. Larger solar panel systems are often ground mounted in open fields and as stand-alone structures. These are known as ground-mount solar panel mounting systems.

System designers may construct ground-mount solar panel mounting systems using pipes and rails. The pipes may be arranged in rows and columns, with some pipes ascending vertically from the ground and other pipes spanning horizontally across the vertical pipes. An installer may use clamps to attach solar panels directly to the horizontal pipes. Alternatively, the installer may attach rails across the horizontal pipes and use solar panel clamps to secure the solar panels to the rails.

SUMMARY

General Discussion

The Inventors develop solar panel mounting systems. They observed the complexity of ground-mount systems may significantly increase installation time and parts count. They also observed that electrical bonding for these systems is often less than ideal. The Inventors created a solar panel mounting system that decreases installation complexity, parts count, and simplifies electrical bonding. The system is adaptable to ground mount and commercial concrete roof top structures.

The mounting system, conceived by the Inventors, may include rail-pipe brackets and pipe clamps, which simplify assembly, reduce parts count, and help facilitate electrical grounding. The pipe clamps use a multiple-tier hinge and a pivotable threaded fastener to simplify assembly and reduce parts count. The pipe clamps use movable bonding pins to facilitate electrical bonding. The rail-pipe bracket secures a pipe to a rail. The rail-pipe bracket secures the rail by spring tension and uses clamping pressure to secure the pipe against the rail. The rail-pipe bracket may optionally include a spacer to prevent over tightening and prevent damage to the rail.

Pipe Clamp Common Features

The pipe clamps come in several variations. For example, one type of pipe clamp may secure pipes together at a fixed angle. A second type of pipe clamp may secure pipes together at an adjustable angle to account for uneven terrain. A third type of pipe clamp may secure cross-braces to pipes. Cross-braces help to add structural rigidity to the solar panel mounting system. These three types of pipe clamps may include common features.

For example, the pipe clamps may include a hinge arm and a pipe clamp body that both surround a pipe. The hinge arm is removably attached to the pipe clamp body and can pivot, or hinge away from the pipe clamp body. The pipe clamp body may include a hinge-receiver. The hinge receiver includes two or more channels that may extend widthwise (i.e., from side-to-side) and that are typically stacked one above the other. The hinge end of the hinge arm may selectively pivot within any one of these channels, but one at a time. In this way, the hinge-receiver acts as the multi-tier hinge mentioned earlier in this summary. This allows the pipe clamp to accommodate different sized pipes. The hinge end may curve or arc upward. Likewise, the channels may each curve, or arc, upward within the hinge-receiver. The channels may be taller or larger) than the hinge end of the hinge arm. This structure allows the hinge arm to pivot.

The clamp body also includes a cradle structured to seat a pipe. The hinge-receiver extends upward from one end of the cradle. A retainer extends outward from the opposite end of the cradle. The retainer is so-called because, combined with other elements, for example, a threaded fastener and a cross-dowel, it helps to "retain," or clamp the hinge arm. The other end of the hinge arm, the clamp end, may clamp to the retainer with the help of a threaded fastener and a cross-dowel. To help facilitate assembly and disassembly, the threaded fastener may extend radially through a threaded aperture in the cross-dowel. The cross-dowel is positioned within a retainer channel. The retainer channel extends along the retainer between an upper arm and a lower arm of the retainer. To quickly latch and unlatch the clamp, the threaded fastener, while still attached to the cross-dowel, pivots through slot-shaped openings in the clamp end, the upper arm, and the lower arm.

The pipe clamps may use bonding pins to help facilitate electrical bonding. The structure described above helps ensure the bonding pins remain in contact with various-sized pipes when the clamp is tightened. For example, a bonding pin may be movable within an aperture in the hinge arm and project inward toward the cradle. Likewise, a bonding pin may be movable within an aperture in the cradle and extend outward toward the hinge arm. These bonding pins are optionally slotted lengthwise. The lengthwise slot allows the bonding pin to compress when inserted into an aperture that is smaller than the bonding pin's resting diameter. Once inserted in the aperture, the bonding pin re-expands. Spring tension from the re-expansion of the bonding pin holds it within the aperture. As the installer fastens the hinge arm to the pipe clamp body, the bonding pin digs into the pipe. This creates an electrical bond as the bonding pin breaks through the thin non-conductive oxide surface layer and into the conductive layer of both the pipe and the pipe clamp. The pressure from the bonding pin against the conductive layer creates a conductive electrical bond that is airtight and will resist deterioration over time from oxidation.

The pipe clamps also may include a base that extends downward from the cradle. The base attaches to other pipes using additional threaded fasteners that extend through a base wall.

Pipe Clamp Variations

The pipe base of the fixed-angle pipe clamp and the adjustable-angle pipe clamp may include a sleeve. The sleeve portion of the pipe base captures and secures one pipe while the hinge arm and pipe clamp body together capture a second pipe. Threaded fasteners extending through the pipe base wall press and secure the first pipe against the interior wall of the sleeve.

The pipe base of the cross-brace pipe clamp may include a pedestal. The threaded fastener extends through the cross-brace and engages a threaded aperture in the pedestal, to secure the cross-brace against the pedestal. The pedestal side facing the cross-brace may be shaped to press more directly against the cross-brace. For example, the pedestal side may be flat, or planar, to seat against a rectangular or square cross-brace. The pedestal side may be concave to seat against a round cross-brace.

The pipe clamp base and the pipe clamp body may be a one-piece body, for rigidity, and strength. The pipe clamp body and the pipe clamp base of the adjustable-angle pipe clamp are separate. The pipe clamp body of the adjustable-angle pipe clamp includes a pivot arm extending downward from the pipe clamp body. The pivot arm may include a radiused, or curved, bottom surface. Within the pivot arm is a radiused, or curved, slot-shaped aperture. A threaded fastener may extend through the curved slot-shaped aperture and engage a threaded aperture in the pipe clamp base. As the pipe clamp body is rotated about the curved slot-shaped aperture, the bottom of the pivot arm rotates along a pivot base within the pipe clamp base. The pivot base may be concave and is typically radiused with the same or similar curve as the bottom of the pivot arm to help facilitate smooth rotation.

Rail-Pipe Bracket

The rail-pipe bracket secures a pipe to a rail. The pipe may be laterally oriented. The rail-pipe bracket may include a rail-pipe bracket body. The rail-pipe bracket body may include a bottom and a pair of sides that extend upward from the bottom. The pair of sides may include hooks, or clamping portions, that hold rail sides to the rail-pipe bracket body by spring tension. The hooks typically extend downward and snap into catches or detents in the rail sides. The pipe extends through a pair of pipe openings in the rail sides. A threaded fastener may extend upward through the bottom of the rail-pipe bracket and press the pipe upward against the bottom of the rail. Once the rail is snapped into place, the installer can tighten threaded fasteners that extend between the first and second sides of the rail-pipe bracket body. This squeezes the sides of the clamp body against the rail sides. This helps to prevent the rail from pulling away from the hooks, or clamping portions, when the solar panel system is pushed upward by the wind.

To prevent damage to the rail from over tightening, and to provide a seat for the bottom of the rail, independent of the pipe, the threaded fasteners discussed immediately above, may extend through spacers. The spacers are positioned between the first and second sides of the rail-pipe bracket body and below the hooks. The spacers are also positioned on either side of the pipe openings they do not interfere with the pipe. The spacers may include top surfaces that are structured to seat the rail bottom surface against the spacers. For example, the spacers may have planar top surfaces. The spacers may be positioned relative to the hooks so the hooks engage the rail detents when the rail rests against the spacer.

The rail-pipe bracket body may include platforms that extend inward from one side. These platforms may be sized, shaped, and positioned to seat the spacer bottom surfaces and prevent the spacers from rotating.

Bonding screws can extend through one of the clamping arms and dig into the rail, breaking through the oxide layer, and electrically bonding the rail-pipe bracket to the rail.

The rail-pipe bracket body may comprise a one-piece body. This allows for natural spring tension to form between the pair of sides and the bottom of the rail-pipe bracket body. The rail-pipe bracket body may be cast, stamped and punched, extruded and machined, 3D printed or otherwise formed.

Conclusion

This Summary discussed various examples and concepts. These do not limit the inventive concept. Other features and advantages can be understood from the Detailed Description, figures, and claims.

DETAILED DESCRIPTION

The Detailed Description includes the following sections: Definitions, System Overview, Pipe Clamp Common Features, Pipe Clamp Variations, Rail-Pipe Bracket, Assembly Method Example, Additional Numbered Examples, and Conclusion and Variations.

Definitions

The Detailed Description and Claims may use ordinals such as "first," "second," or "third," to differentiate between similarly named parts. These ordinals do not imply order, preference, or importance. This disclosure uses "optional" to describe features or structures that are optional. Not describing a feature or structure as "optional" does not imply the feature or structure is essential or required. In this disclosure, "or" is an inclusive or, unless preceded by a qualifier, such as "either," which signals that the "or" that follows is an exclusive or. As used throughout this disclosure, the terms: "comprise," "comprising," "include," "including," "have," "having," "contain," "containing," or "with" are inclusive, or open-ended, and do not exclude unrecited elements.

"Front," "rear," "left," and "right," "up," "down," "top," and "bottom" are relative terms. For the convenience of the reader, these refer to directions relative to the front of the solar panel assembly.

As defined in this disclosure, cross-dowel means an elongated body with a threaded aperture extending radially through the body. Cross-dowels may include a cylindrical or semi-cylindrical cross section, but are not limited to these cross-sectional shapes.

As defined in this disclosure, a slot-shaped opening is an elongated opening through an object, where the elongated opening is open on at least one edge of an object. This is in contrast to a slot-shaped aperture, which refers to an enclosed elongated aperture.

As defined in this disclosure, an upward-oriented pipe is one that extends upwardly away from the mounting surface of the structure. For example, the mounting surface of a solar panel mounting system may be the ground or a concrete roof. As defined in this disclosure, a lateral-oriented pipe is one that extends across or lateral to an upward-oriented pipe. An upward-oriented pipe may be vertical and a lateral-oriented pipe may be horizontal, but these pipes are not limited to these orientations.

As defined in this disclosure, when referring to the relationship between threaded fasteners and apertures, stating that the threaded fastener passes through the aperture means that at least a portion of the threaded fastener passes through the threaded aperture. It does not require the entire threaded fastener to pass through the threaded aperture. It also does not preclude the entire threaded fastener from passing through the aperture.

System Overview

Figure 1:
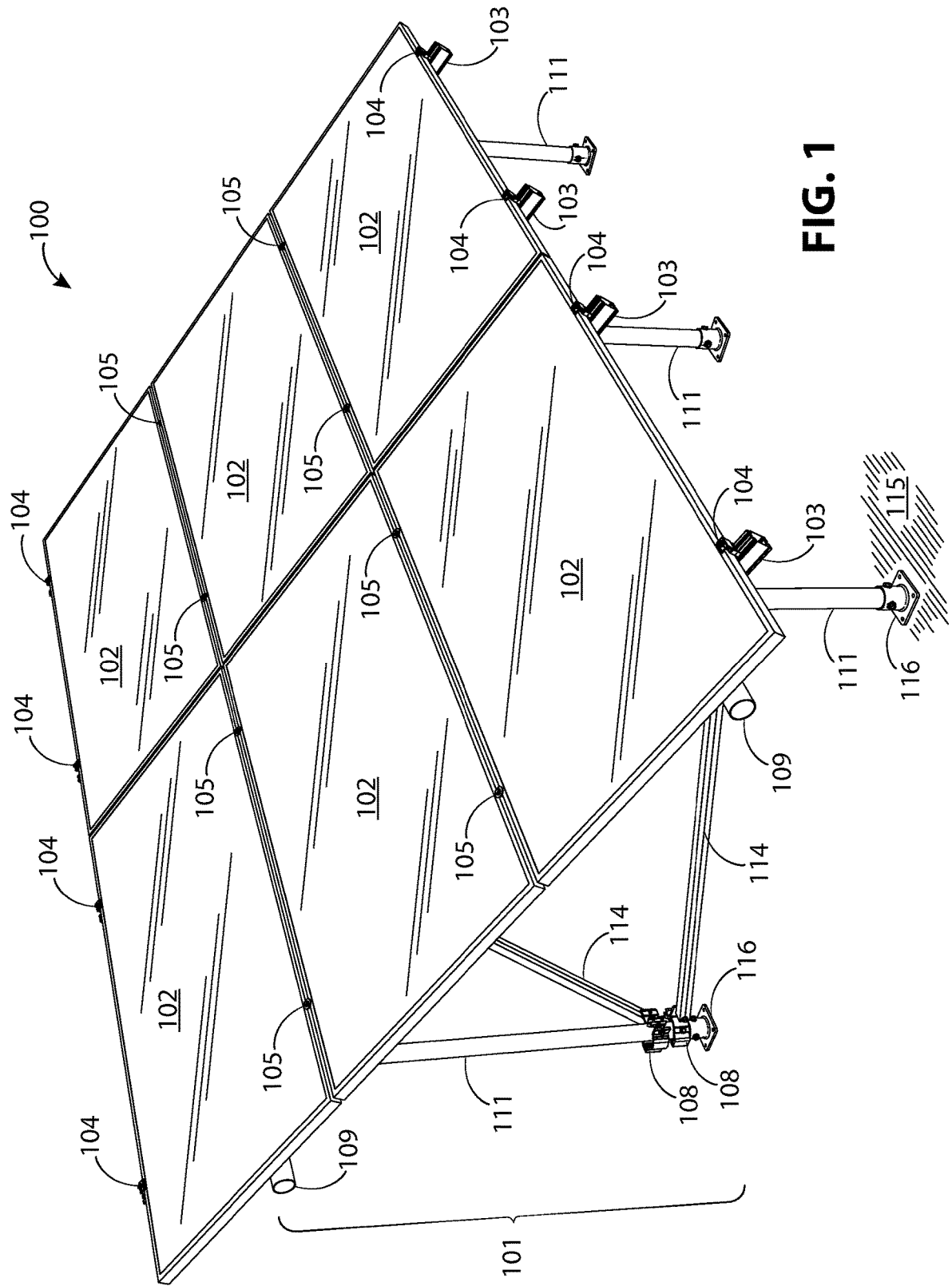
FIG. 1 illustrates the solar panel system and solar panel mounting system in front perspective view.
Figure 2:
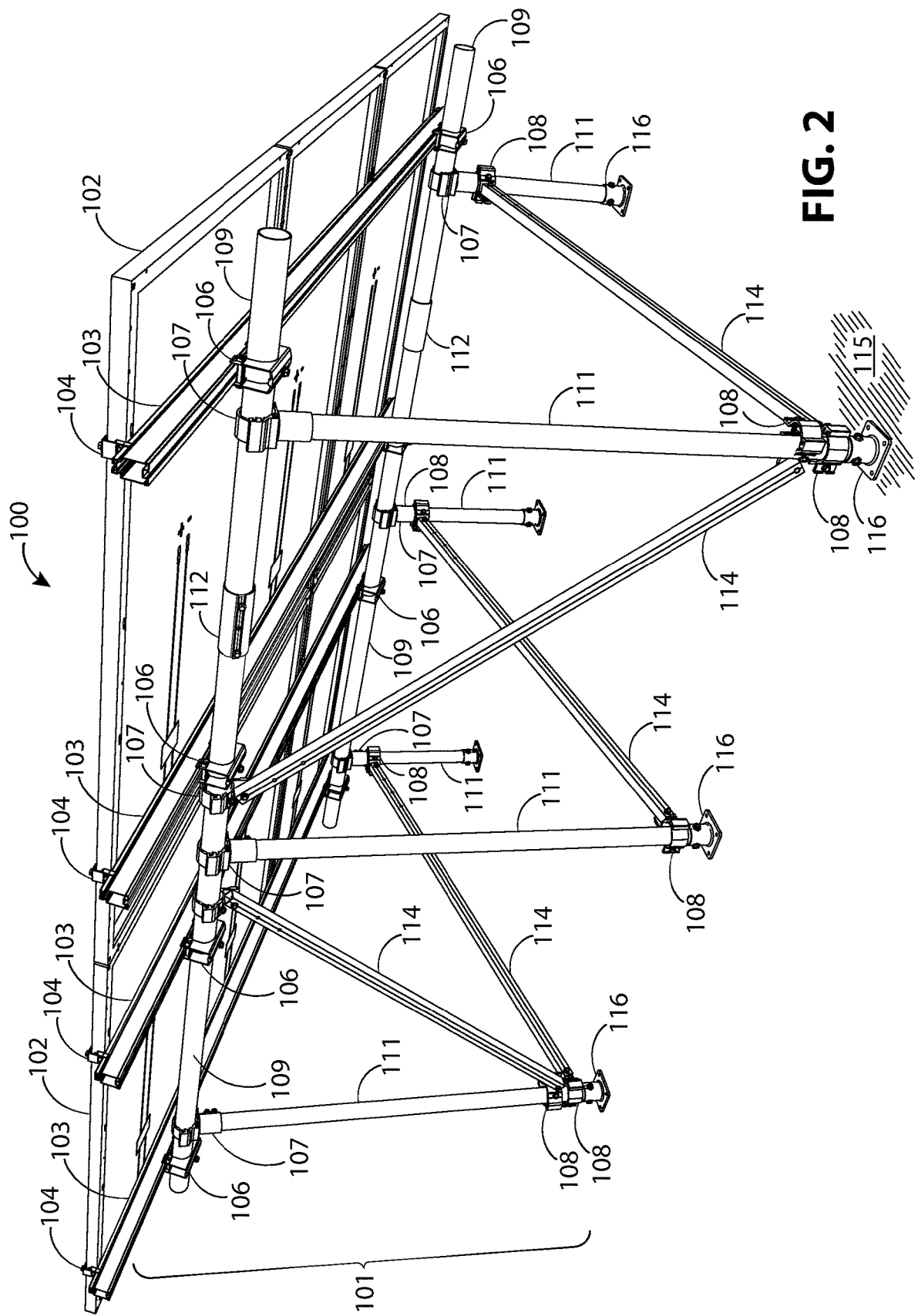
FIG. 2 illustrates the solar panel system and the solar panel mounting system in rear perspective view.
Figure 3:
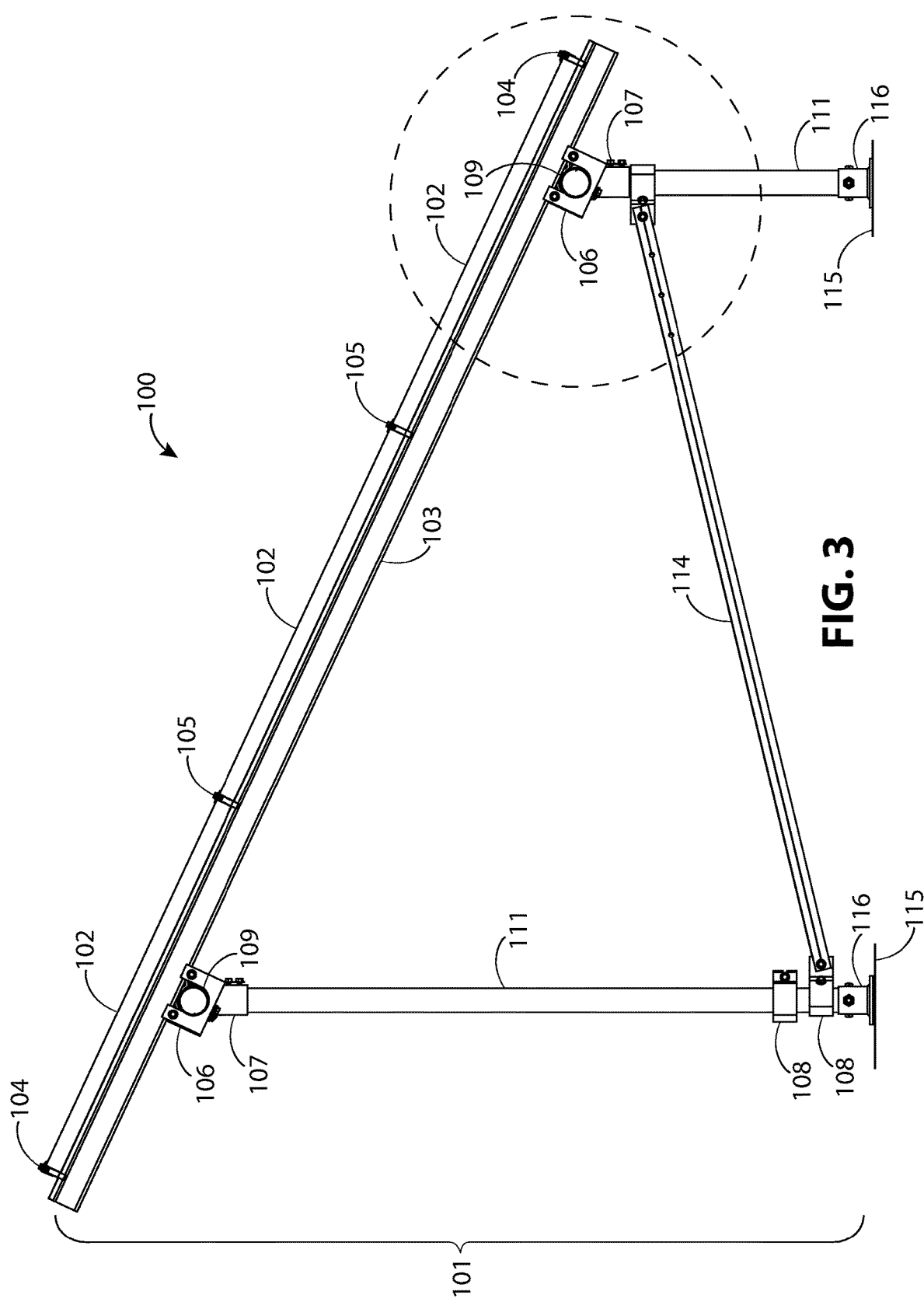
FIG. 3 illustrates the solar panel system and the solar panel mounting system in left-side view.

As discussed in the Summary, the Inventors develop ground-mount solar panel mounting systems. They observed that the complexity of typical ground-mount solar panel mounting systems may significantly increase installation time and increase parts count. They also observed electrical bonding for solar panel mounting systems is often less than ideal. The Inventors created a solar panel mounting system that decreases installation complexity, reduces parts count, and simplifies electrical bonding. FIGS. 1-3 illustrate a simplified version of a solar panel system 100 that includes an example of a solar panel mounting system 101 envisioned by the Inventors. FIG. 1 illustrates solar panel system 100, solar panel mounting system 101, and multiple instances of solar panel 102 in front perspective view. Each solar panel 102 rests on two or more instances of rail 103. Multiple instances of end clamp 104 and mid clamp 105 secure the solar panel 102 to rail 103. In FIGS. 2 and 3, multiple instances of end clamp 104 secure the solar panel 102 to rail 103. In FIG. 3, the end clamp 104 and the mid clamp 105 secure the rail 103 to the solar panel 102.

The solar panel mounting system 101 may include pipe clamps and rail-pipe brackets that simplify assembly, reduce part count, and facilitate electrical grounding. For example, FIGS. 2 and 3 illustrate several instances of rail-pipe bracket 106, pipe clamp 107, and pipe clamp 108. FIG. 1 illustrates instances of pipe clamp 108. In FIG. 1, rail-pipe bracket 106 and pipe clamp 107 are hidden from view. The system assembly method will be discussed in FIGS. 41-57.

The rail-pipe bracket secures pipes to rails. For example, FIGS. 2 and 3 illustrate multiple instances of rail-pipe bracket 106 securing rail 103 to pipe 109. Rail 103 attaches to rail-pipe bracket 106 by spring tension. Rail-pipe bracket 106 will be discussed in more detail for FIGS. 32-37, with additional discussion of spacer 154 associated with rail-pipe bracket 106, for FIGS. 38-40. FIGS. 58, and 61-67 discuss additional variations for the rail-pipe bracket.

The pipe clamps come in several variations. For example, one pipe clamp may attach pipes to each other at a fixed-angle (i.e., "a fixed-angle pipe clamp"). A second type of pipe clamp may attach pipes to each other at an adjustable-angle to account for uneven terrain ("adjustable-angle pipe clamp"). A third type may secure cross-braces to pipes ("cross-brace pipe clamp").

The fixed-angle and adjustable-angle pipe clamps can, for example, secure upward-oriented pipes to lateral-oriented pipes. For example, in FIGS. 2 and 3, instances of pipe clamp 107 attaches to pipe 109 and pipe 111. Pipe 109 typically is a lateral-oriented pipe (i.e., lateral with respect to pipe 111). Referring to FIG. 2, multiple instances of pipe 109 may be joined by a pipe splice, such as pipe splice 112. Pipe 111 is typically an upward-oriented pipe. FIGS. 1-3 illustrate instances of pipe 109 as horizontal and instances of pipe 111 as vertical, but pipe 109 and pipe 111 are not limited to these orientations. Pipe clamp 107 is a fixed-angle pipe clamp, however, an installer can use an adjustable-angle pipe clamp in place of pipe clamp 107 as needed. FIGS. 4-17 illustrate the pipe clamp 107 in various views. FIGS. 18-25 illustrates an example of an adjustable-angle pipe clamp, pipe clamp 113 in various views.

Referring to FIGS. 1-3, pipe clamp 108 is an example of a cross-brace pipe clamp. FIGS. 1-3 show instances of securing pipe clamp 108 to cross-brace 114. Cross-braces help to add structural rigidity to the solar panel mounting system 101. Pipe clamp 108 is illustrated in various views in FIGS. 26-31.

Pipe Clamp Common Features

Figure 14:
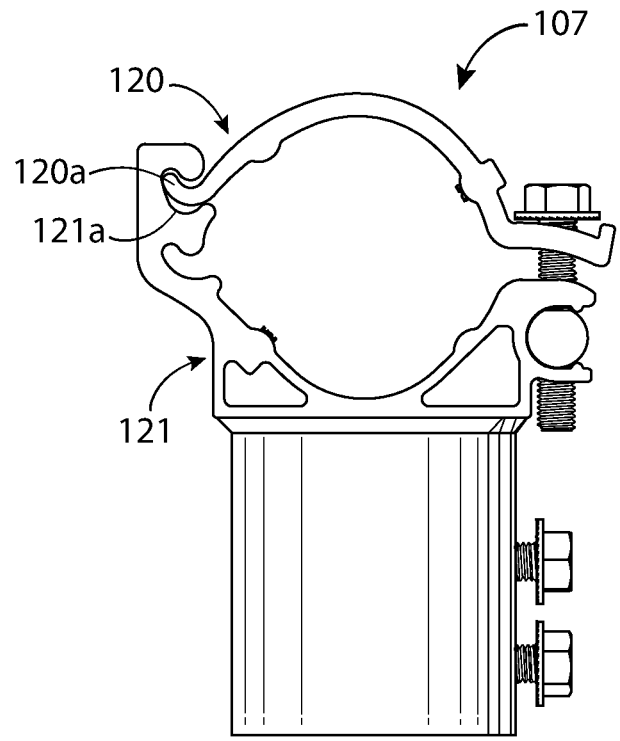
FIGS. 14 and 15, illustrate, in left-side view, the pipe clamp in a tightened state and with hinge arm positioned in a first channel and the hinge arm positioned in a second channel, respectively.
Figure 15:
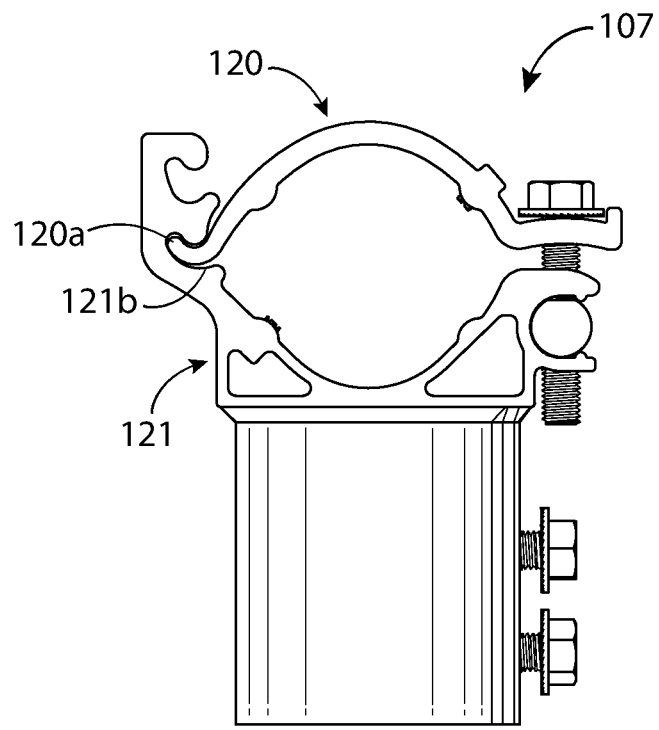
Figure 16:
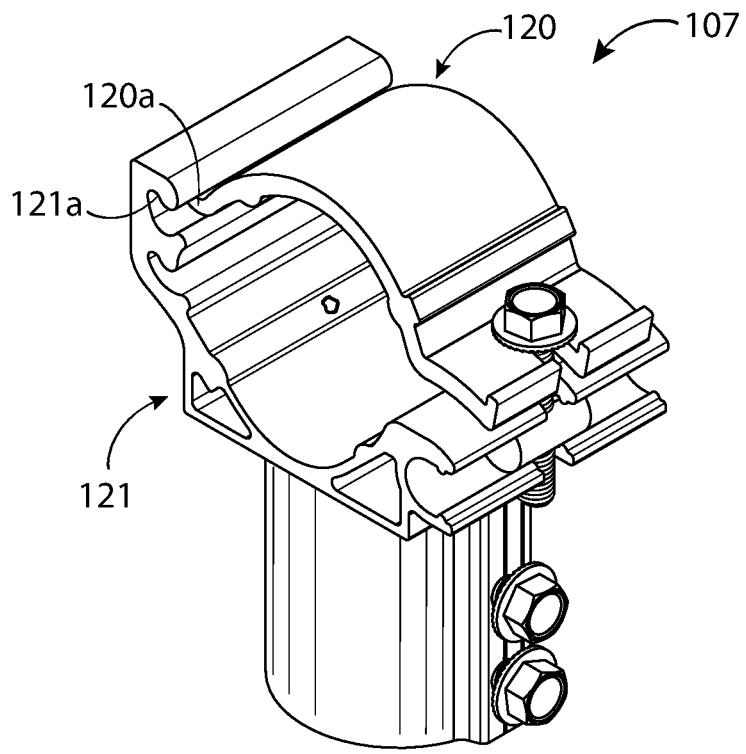
FIGS. 16 and 17, illustrate, in front isometric view, the pipe clamp in a tightened state and with hinge arm positioned in a first channel and the hinge arm positioned in a second channel, respectively.
Figure 17:
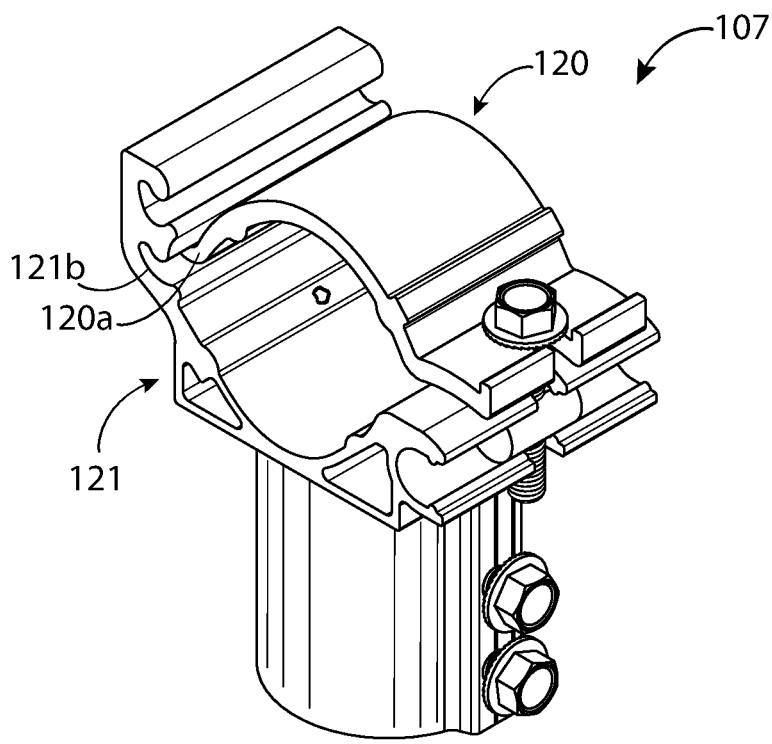

The pipe clamps may include common features that aid in assembly. For example, the pipe clamps may include a hinge arm and a pipe clamp body that both surround a pipe. FIGS. 4-17 illustrate the hinge arm 120 and the pipe clamp body 121 for pipe clamp 107. FIGS. 18-25 illustrate the hinge arm 130 and pipe clamp body 131 for pipe clamp 113, and FIGS. 26-31 illustrate the hinge arm 140 and pipe clamp body 141 for pipe clamp 108. The hinge end of the hinge arm may selectively pivot within one of several channels positioned in a hinge-receiver portion of the pipe clamp body. That is, the hinge end can be positioned in any one of several channels, one channel at a time. The channels may extend widthwise along the hinge-receiver. In this case, widthwise means in a side-to-side direction. The channels are typically stacked one above the other within the hinge-receiver. This stacking of the channels allows the pipe clamp to accommodate different sized pipes. FIGS. 14 and 16 illustrate the hinge end 120a of the hinge arm 120, positioned within the first channel 121a. In comparison, FIGS. 15 and 17 illustrate the hinge end 120a positioned within the second channel 121b.

Figure 6:
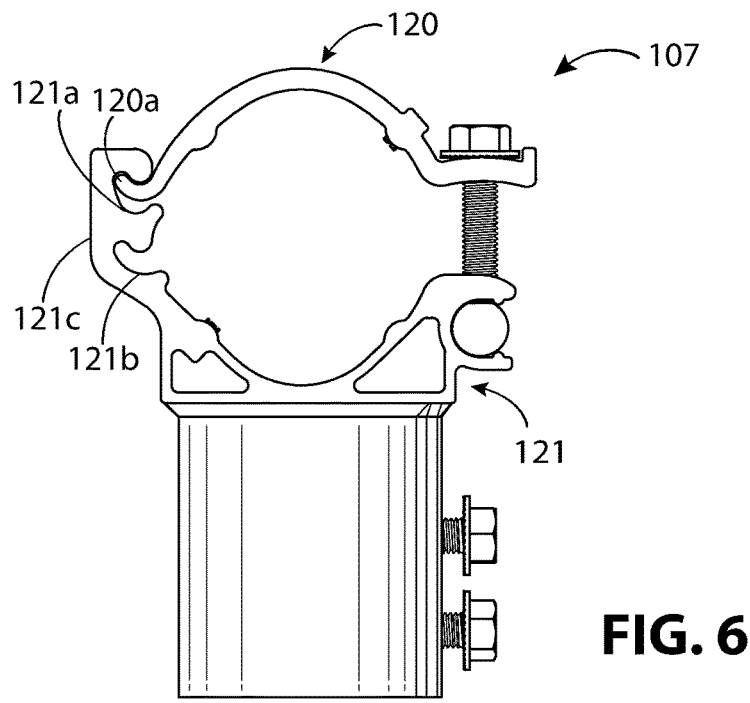
Figure 20:
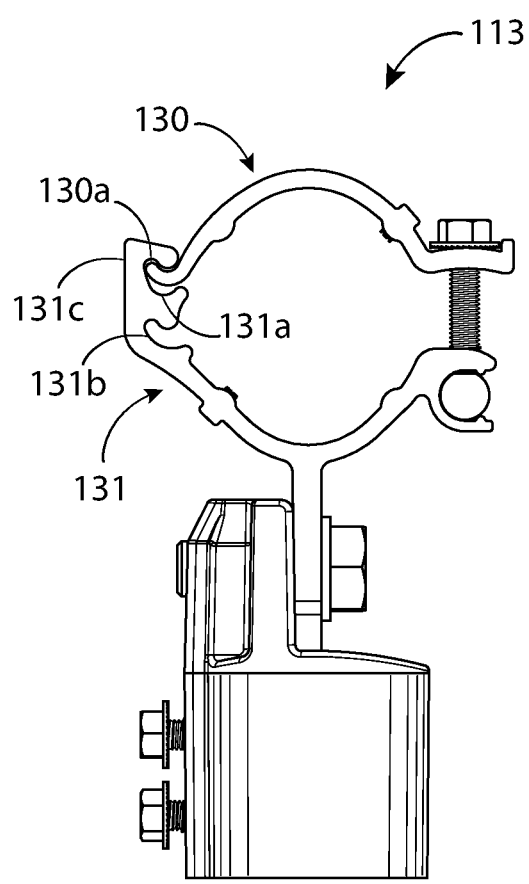
Figure 28:
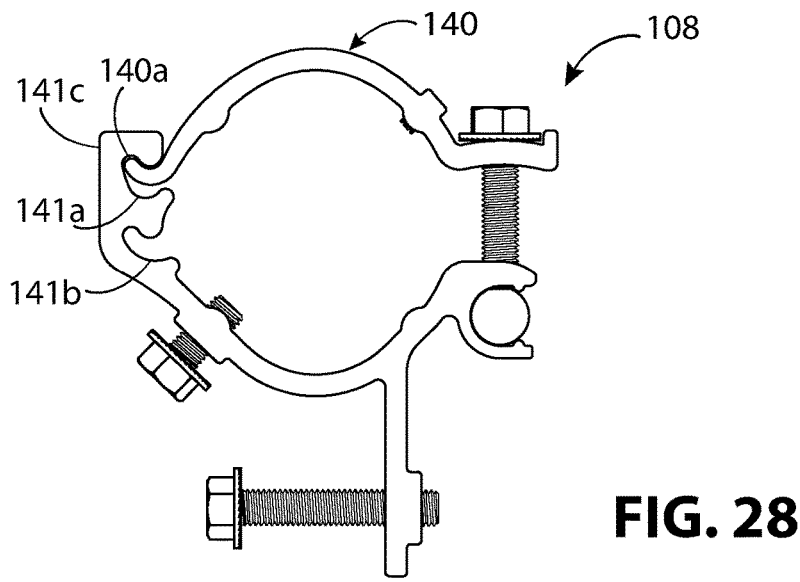

The hinge ends of the hinge arm and the channels of the hinge receiver may curve, or arc, upward. For example, hinge end 120a, first channel 121a, and second channel 121b of FIGS. 6 and 7, curve upward. Similarly, referring to FIGS. 20 and 21, hinge end 130a of hinge arm 130, and first channel 131a and second channel 131b within hinge-receiver 131c curve upward. The hinge end 140a of hinge arm 140, and first channel 141a and the second channel 141b within hinge-receiver 141c in FIGS. 28 and 29, curve upward. Referring to FIGS. 6, 20, and 28, first channel 121a, first channel 131a, and first channel 141a, respectively, are sized to allow their respective hinge end to move and pivot in the channel. In these examples, the first channels are taller heightwise that the hinge end. The outside surfaces above and below the second channel 121b, the second channel 131b, and second channel 141b, of FIGS. 6, 20, and 28, respectively, are shaped to allow the hinge end of the hinge arm to pivot.

Figure 7:
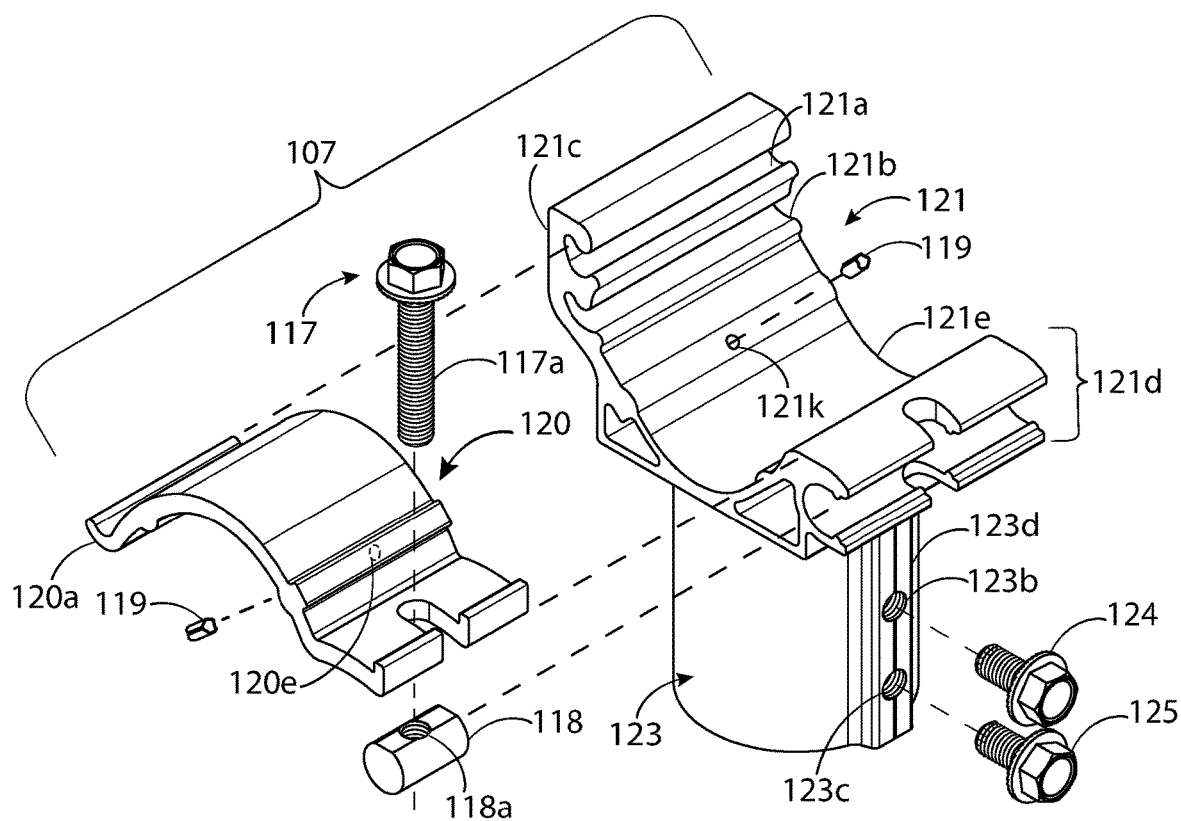
Figure 8:
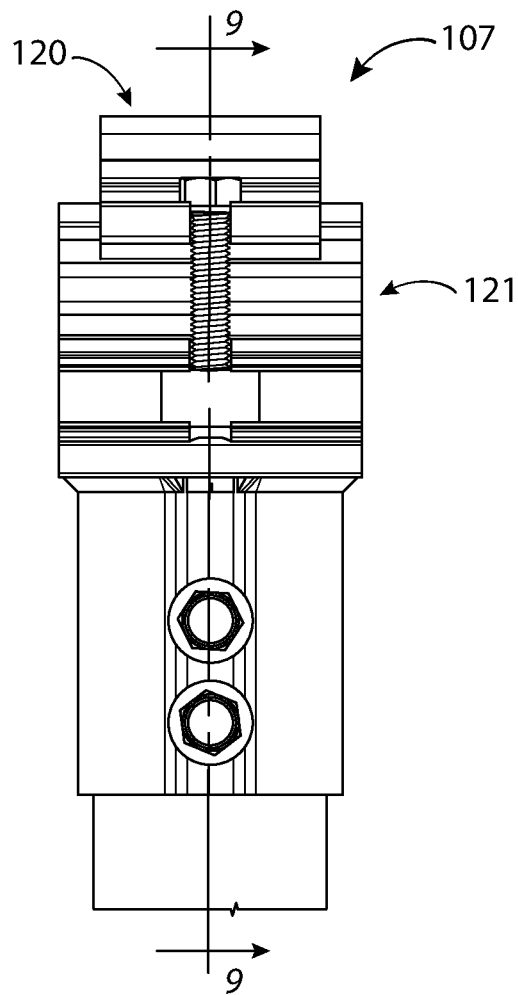
Figure 9:
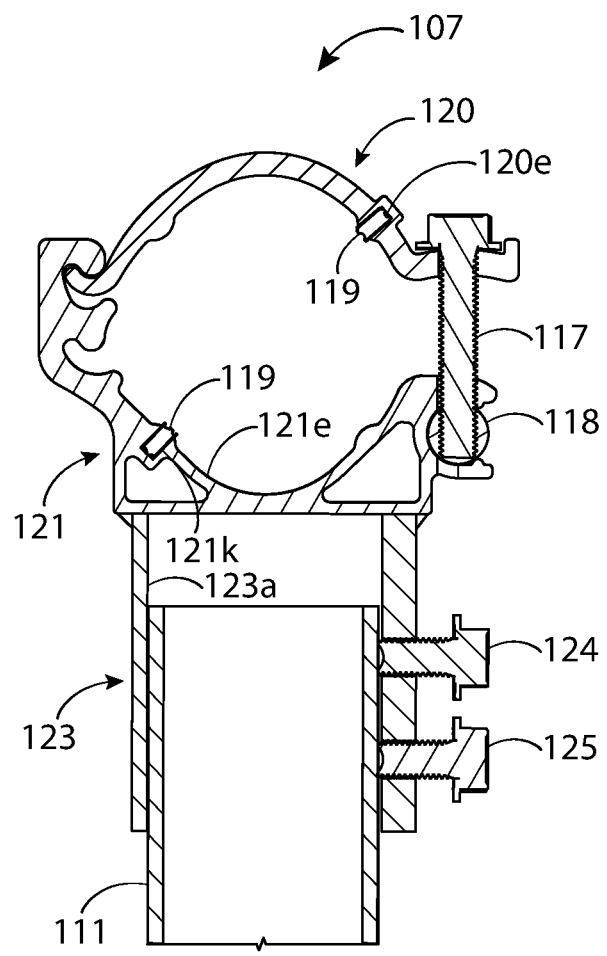
FIG. 9 illustrates a section view of the pipe clamp of FIG. 8 taken along section lines 9-9.
Figure 21:
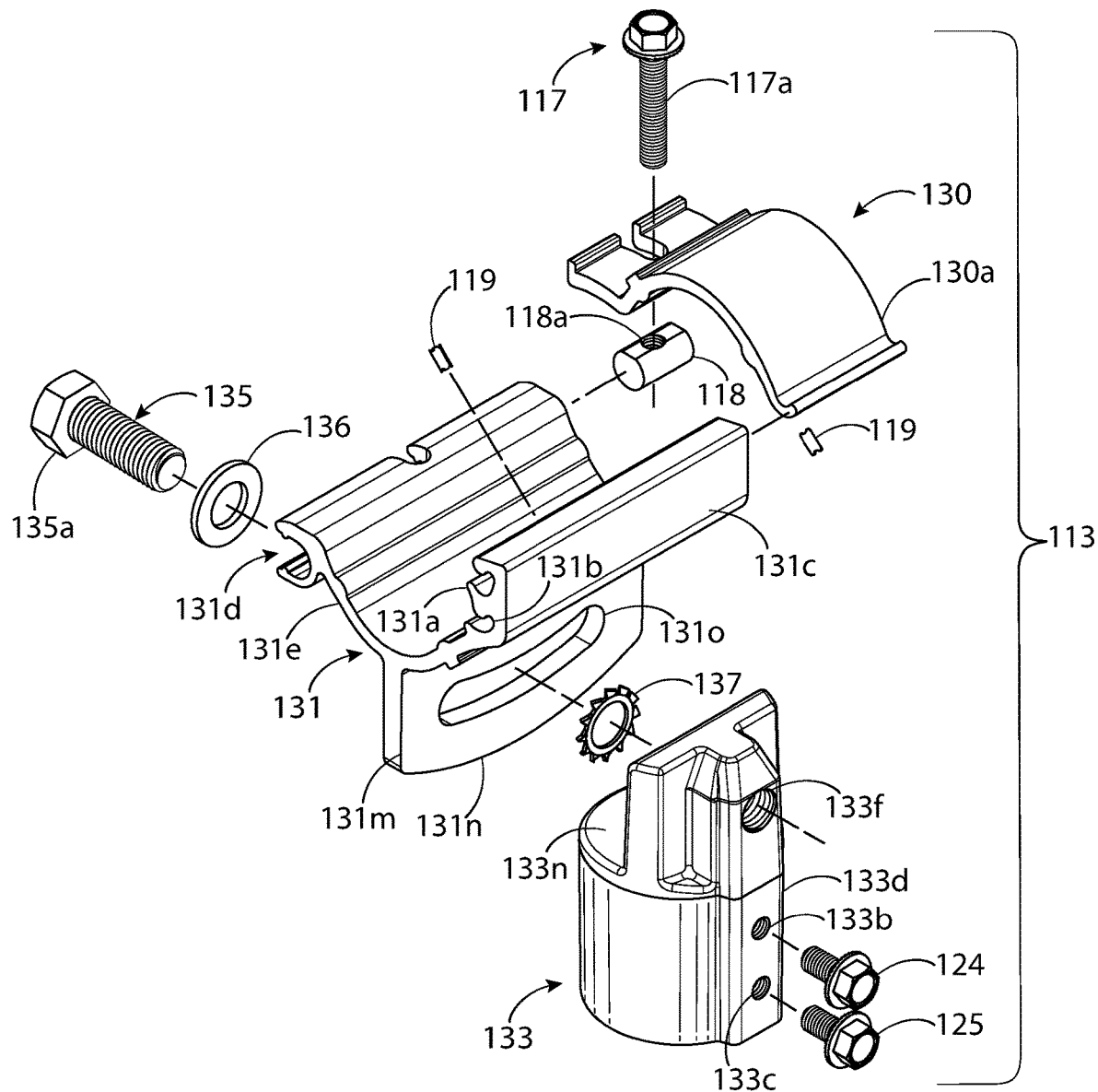
Figure 22:
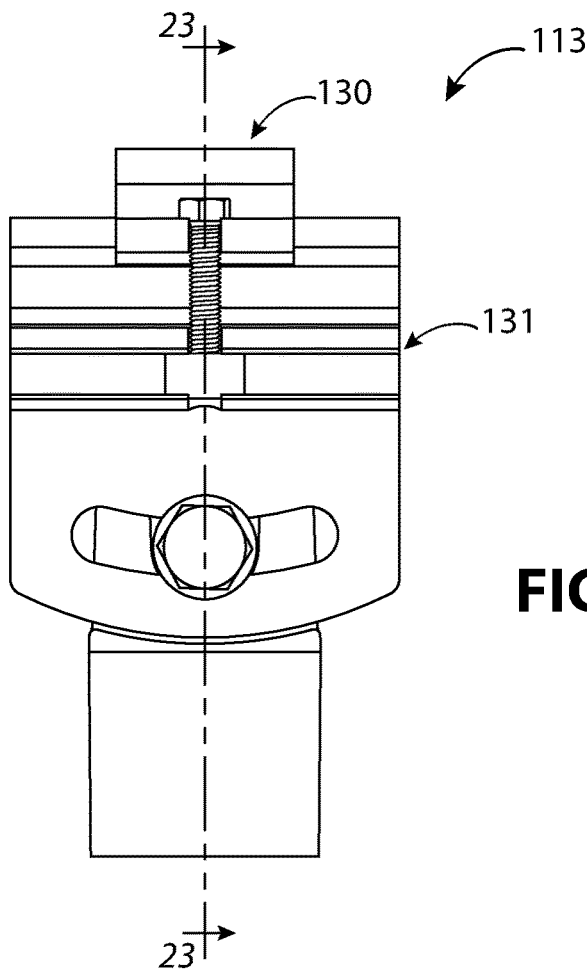
Figure 23:
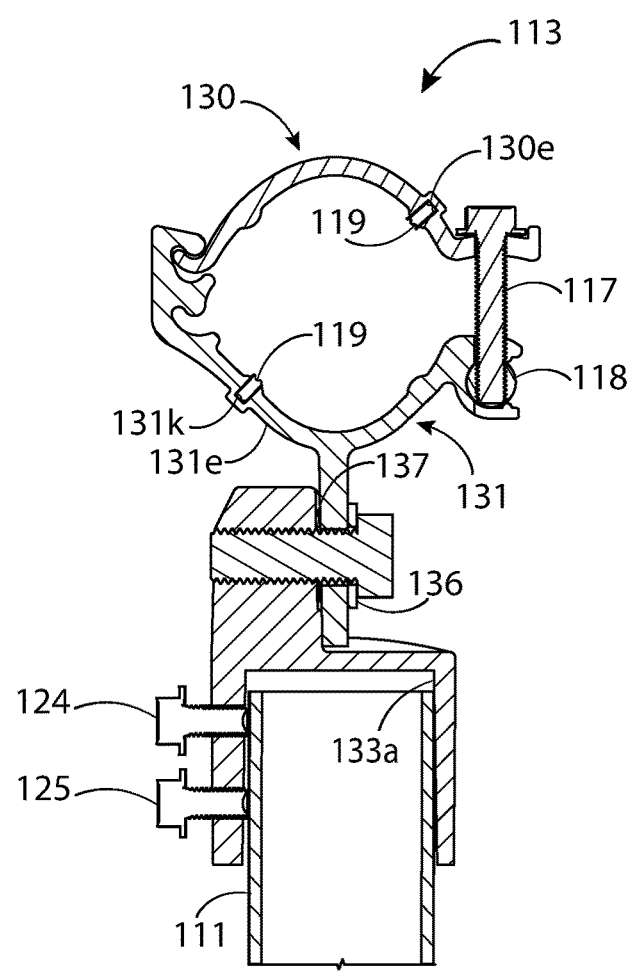
FIG. 23 illustrates a section view of the second pipe clamp of FIG. 22 taken along section lines 23-23.
Figure 29:
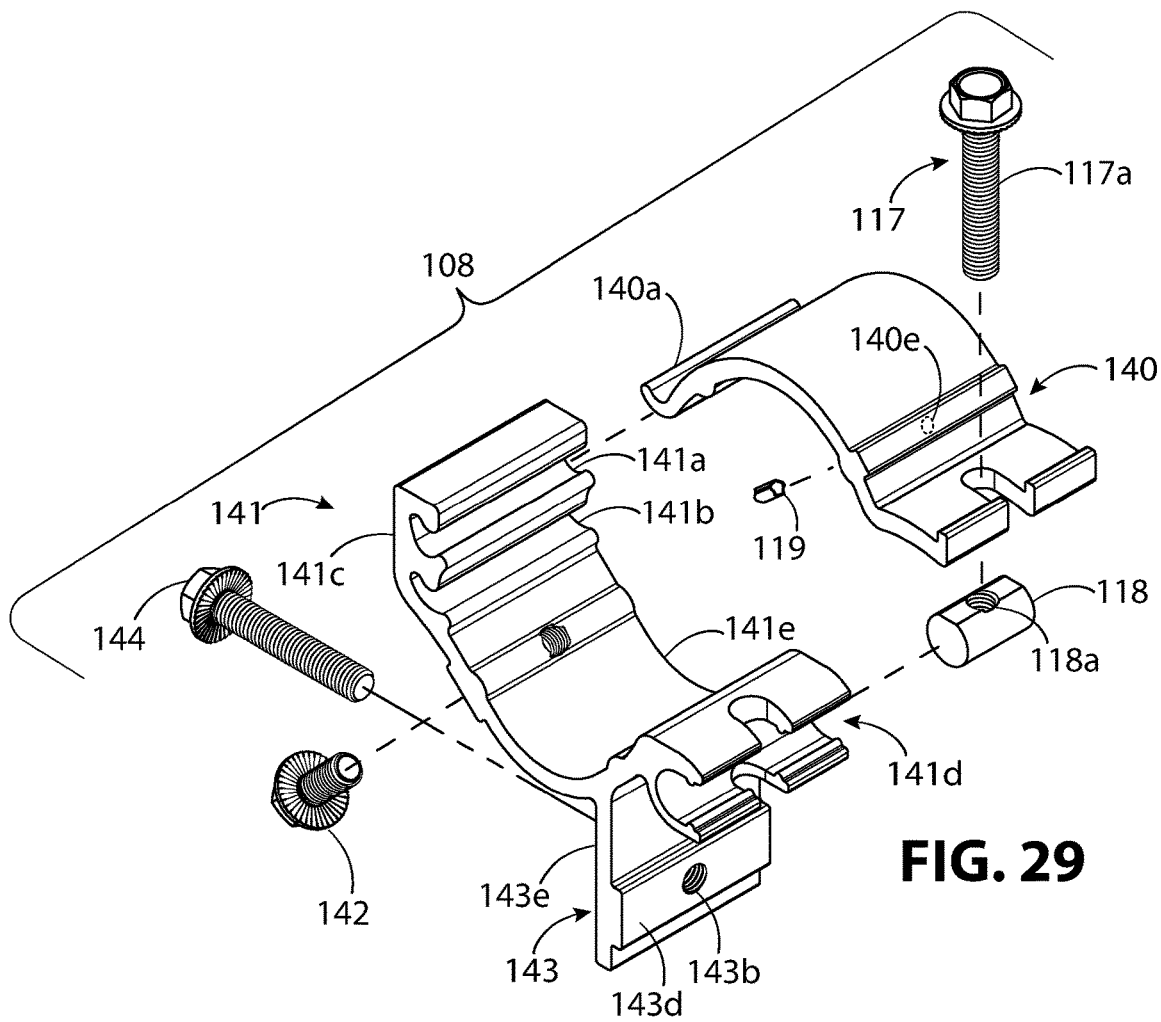
Figure 30:
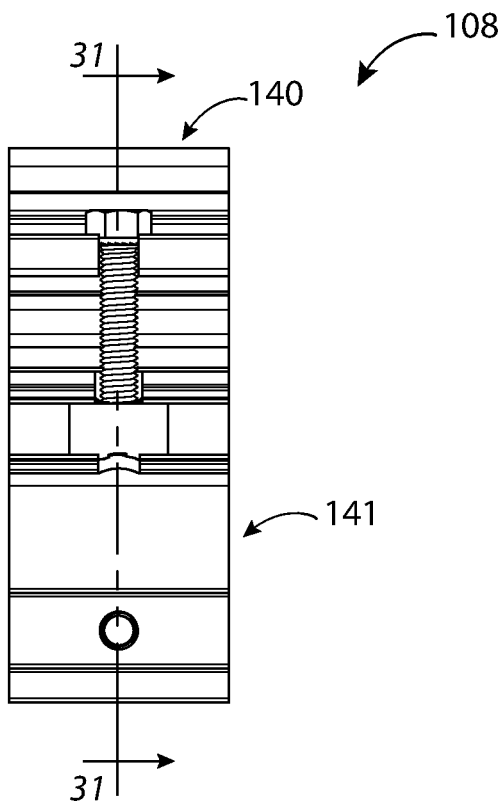
Figure 31:
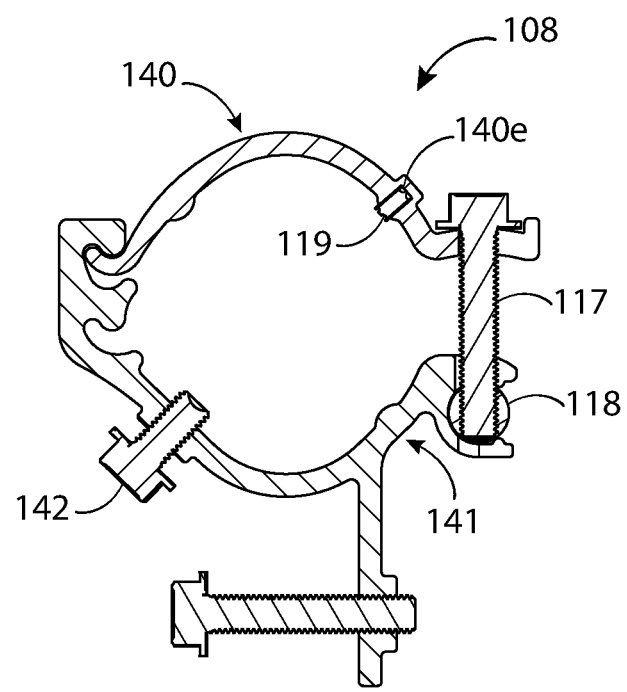
FIG. 31 illustrates a section view of the third pipe clamp of FIG. 22 taken along section lines 31-31.

The other end of the hinge arm, the clamp end, clamps to the other end of the clamp body, the retainer. The retainer and hinge-receiver are positioned on opposite ends of a cradle just as the hinge end and clamp end are positioned on opposite ends of the hinge arm. The cradle supports the pipe. The hinge-receiver extends upward from the cradle. FIG. 7 shows the relationship between the retainer 121d, the cradle 121e, and the hinge-receiver 121c for pipe clamp 107. FIG. 21 shows the relationship between the retainer 131d, the cradle 131e, and the hinge-receiver 131c for pipe clamp 113. The retainer extends outward, away from the cradle. FIG. 29 shows the relationship between the retainer 141d, the cradle 141e, and the hinge-receiver 141c for pipe clamp 108. To help facilitate assembly and disassembly, a threaded fastener may extend radially within a cross-dowel. The cross-dowel is positioned within a retainer channel. FIGS. 9, 23, and 31, illustrate the threaded fastener 117 extending radially with the cross-dowel 118. FIGS. 7, 21, and 29 show the fastener body 117a of threaded fastener 117 extending into a threaded aperture 118a of cross-dowel 118. The retainer channel extends widthwise (i.e., from side-to-side) along the retainer and may be formed between an upper arm and a lower arm of the retainer.

Figure 12:
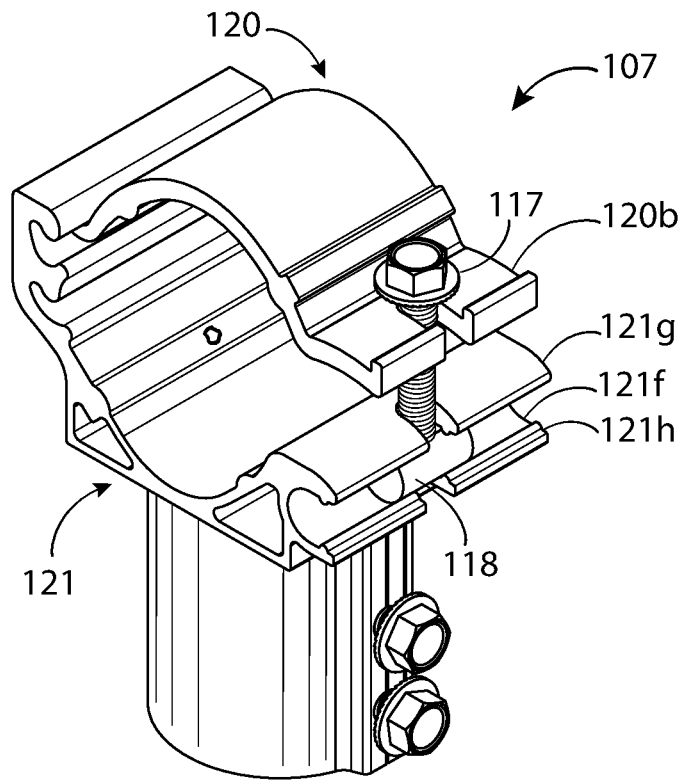
FIGS. 12 and 13 illustrate, in front isometric view, the pipe clamp with the threaded fastener loosened, and the threaded fastener rotated open, respectively.
Figure 13:
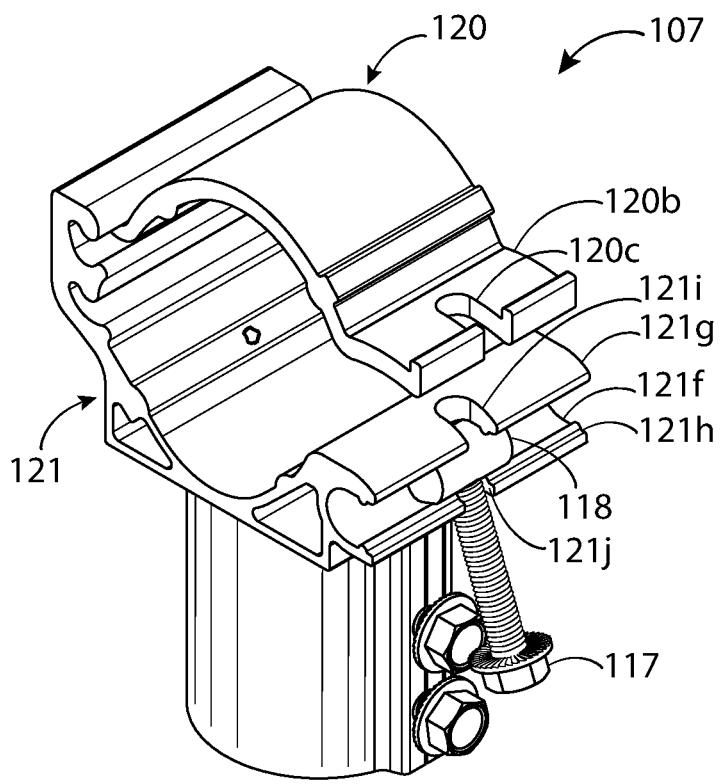
Figure 18:
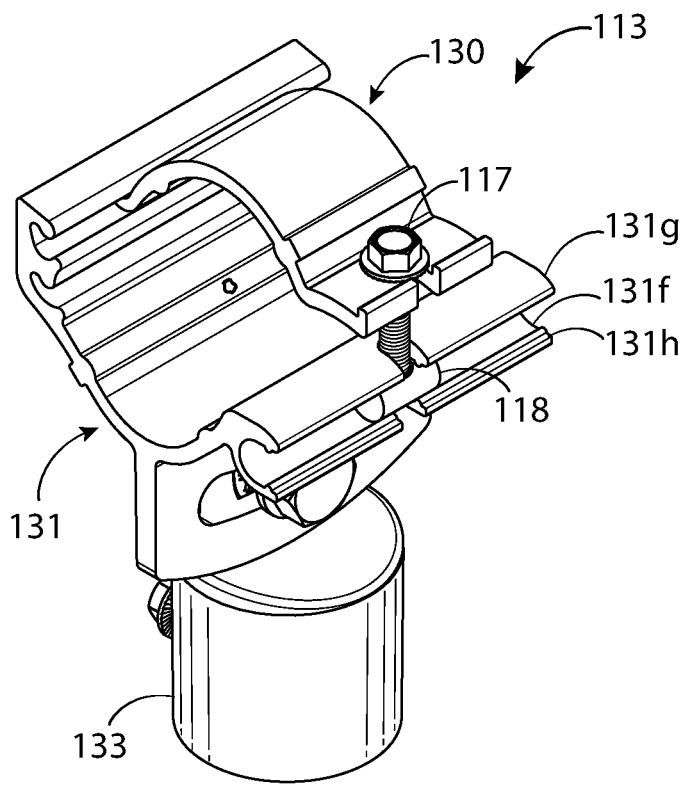
FIGS. 18, 19, 20, 21, and 22 illustrate a second pipe clamp of the present disclosure in a front isometric view, rear isometric view, left-side view, exploded view, and front view, respectively.
Figure 19:
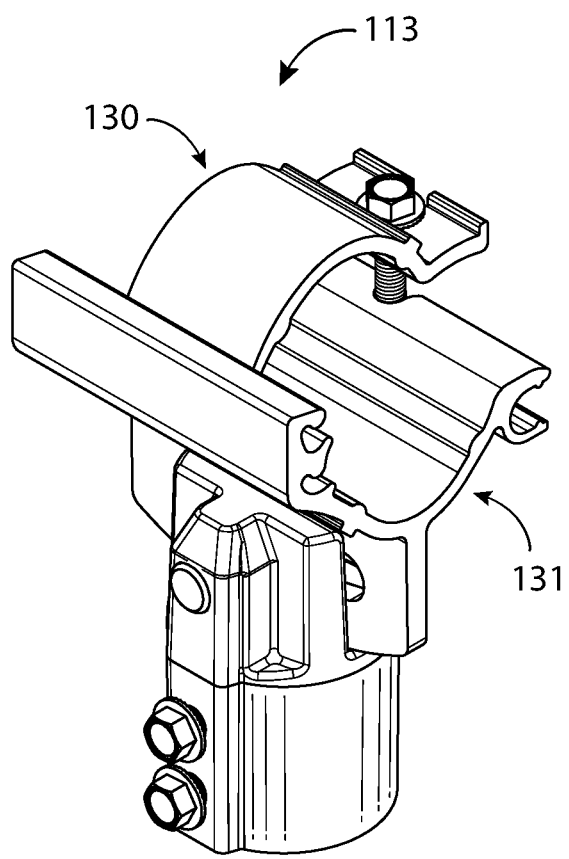
Figure 26:
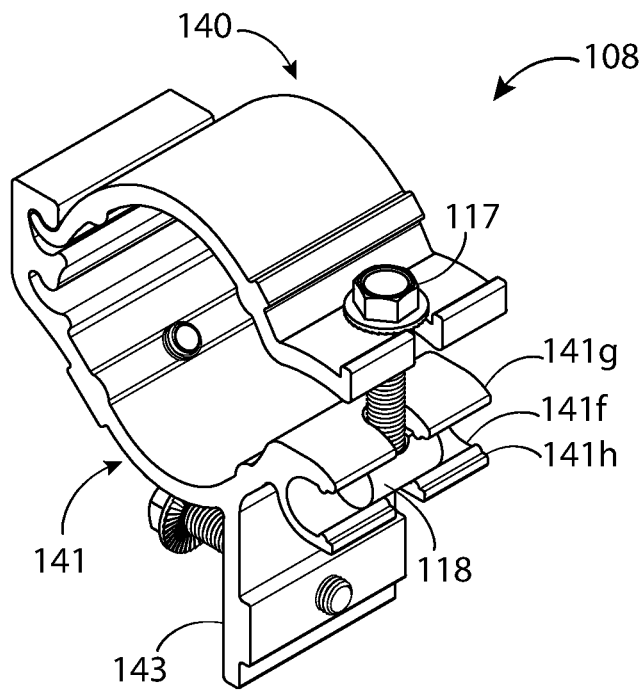
FIGS. 26, 27, 28, 29, and 30 illustrate a third pipe clamp of the present disclosure in a front isometric view, rear isometric view, left-side view, exploded view, and front view, respectively.
Figure 27:
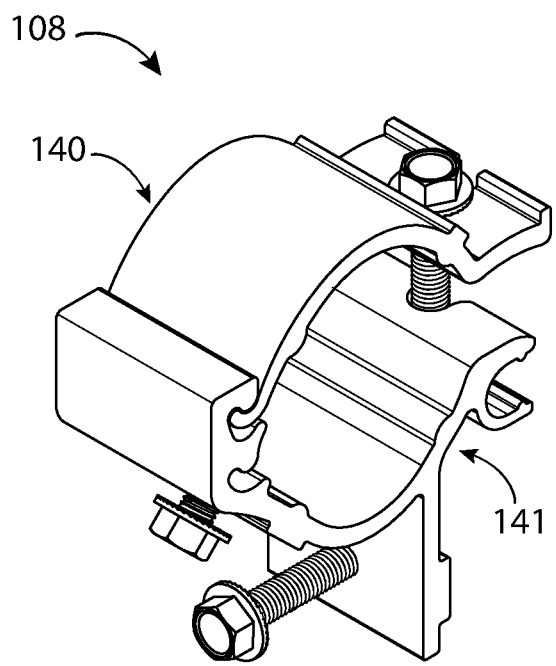

FIGS. 12 and 13 show the cross-dowel 118 within the retainer channel 121f between the upper arm 121g and the lower arm 121h of the retainer channel 121f of pipe clamp 107. FIG. 18 similarly shows the cross-dowel 118 within the retainer channel 131f between the upper arm 131g and the lower arm 131h of the retainer channel 131f of pipe clamp 113. FIG. 26 shows the cross-dowel 118 within the retainer channel 141f between the upper arm 141g and the lower arm 141h of the retainer channel 141f of pipe clamp 108. Referring to FIGS. 12 and 13, to quickly latch and unlatch the pipe clamp 107, the threaded fastener 117, while still attached to the cross-dowel 118, pivots through slot-shaped openings in the clamp end 120b, the upper arm 121g, and the lower arm 121h. FIG. 13 shows a slot-shaped opening 120c in clamp end 120b, a slot-shaped opening 121i in the upper arm 121g, a slot-shaped opening 121j in the lower arm 121h. The slot-shaped openings are so aligned with respect to each other so that the threaded fastener 117 can pivot freely when loosened. In this case, the slot-shaped openings extend perpendicularly outward from the retainer channel and are aligned one above the other.

Figure 10:
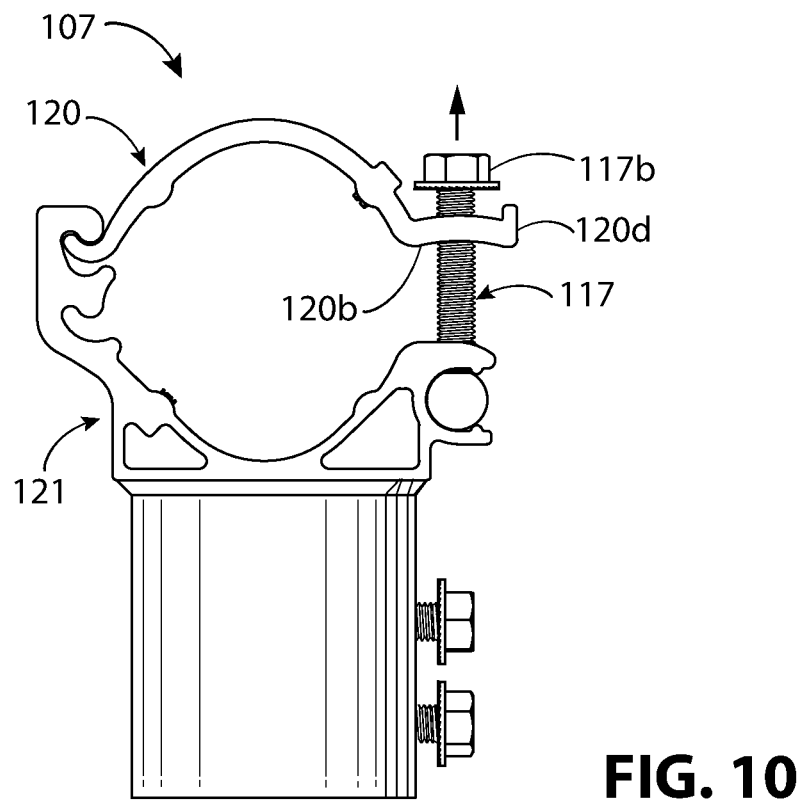
FIGS. 10 and 11 illustrate, in left-side view, the pipe clamp with the threaded fastener loosened, and the threaded fastener rotated open, respectively.
Figure 11:
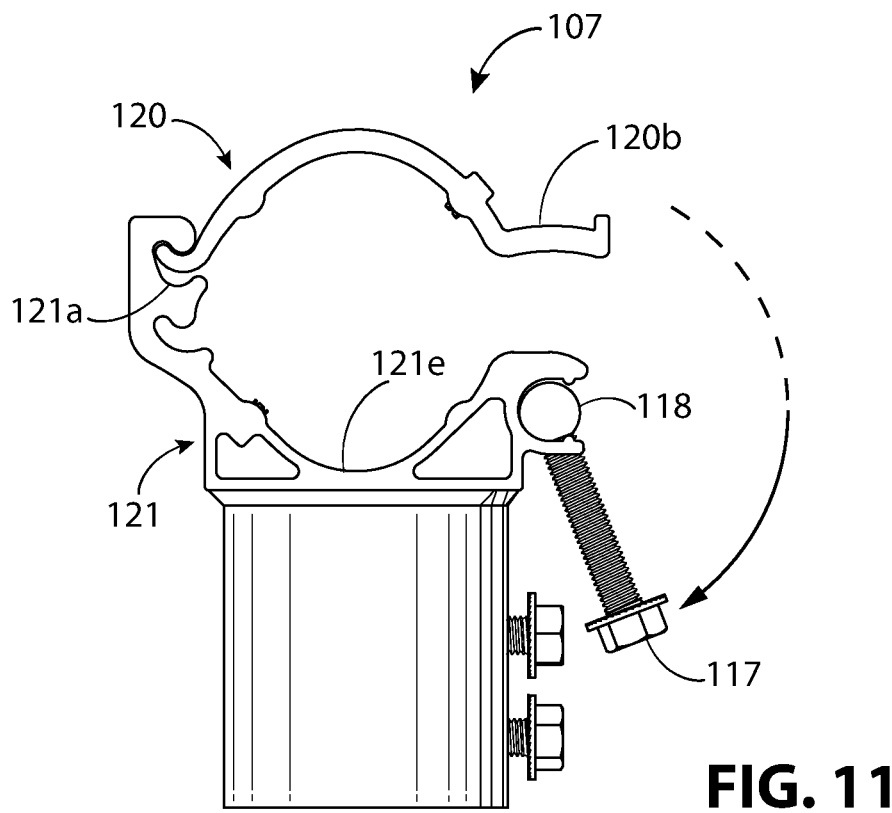

FIGS. 10 and 11 demonstrate, in left-side view, how to latch and unlatch the pipe clamp 107. In FIG. 10, the threaded fastener 117 is loosened sufficiently so that it clears the top of the clamp end 120b. In this example the retainer includes a fastener retainer 120d that extends upward from the end of the clamp end 120b. The fastener retainer 120d is optional. In FIG. 10, threaded fastener 117 is sufficiently loosened so the fastener head 117b clears the fastener retainer 120d. In FIG. 11, the cross-dowel 118 rotates as the threaded fastener 117 is pivoted downward away from the clamp end 120b. The hinge arm 120 is now free to pivot, or hinge, about the first channel 121a, allowing the hinge arm to open the cradle 121e to receive a pipe. While not illustrated, the pipe clamp 113 of FIGS. 18-25 and the pipe clamp 108 of FIGS. 26-31 unclamp in the same way as described in this paragraph. For example, for pipe clamp 108, in FIG. 26 and for pipe clamp 113 in FIG. 18, the threaded fastener 117 can be loosened and pivoted about the cross-dowel 118 in the same way as described above.

The pipe clamps may include bonding pins to help facilitate electrical bonding. The structure described above, helps ensure that the bonding pins remain in contact with various-sized pipes when the clamp is tightened. For example, a bonding pin may be movable within an aperture in the hinge arm and project inward toward the cradle. Likewise, a bonding pin may be movable within an aperture in the cradle and extend outward toward the hinge arm. FIGS. 7 and 9 show an instance of bonding pin 119 insertable (FIG. 7) or inserted (FIG. 9) in aperture 121k in the cradle 121e and an instance of bonding pin 119 insertable (FIG. 7) or inserted (FIG. 9) in aperture 120e. In FIG. 7, aperture 120e is shown in dashed lines to represent it is hidden from view. FIG. 23 shows instances of bonding pin 119 inserted in aperture 130e in the hinge arm 130 and aperture 131k in the cradle 131e. FIGS. 29 and 31 show an instance of bonding pin 119 insertable (FIG. 29) or inserted (FIG. 31) in aperture 140e. In FIG. 29, aperture 140e is shown in dashed lines to represent it is hidden from view. In FIGS. 29 and 31, the cradle may be electrically bonded to a pipe by a threaded fastener 142. In the figures discussed in this paragraph, the instances of bonding pin 119 are optionally slotted lengthwise. The lengthwise slot allows the bonding pin to compress when inserted into an aperture that is smaller than the bonding pin's resting diameter. Once inserted in the aperture, the bonding pin re-expands. Spring tension from the re-expansion of the bonding pin holds it within the aperture. As the installer fastens the hinge arm to the pipe clamp body, the bonding pin digs into the pipe. This creates an electrical bond as the bonding pin breaks through the thin non-conductive oxide surface layer and into the conductive layer of both pipe and the pipe clamp. The pressure from the bonding pin against the conductive layer creates a conductive electrical bond that is airtight and will resist deterioration over time from oxidation.

Figure 4:
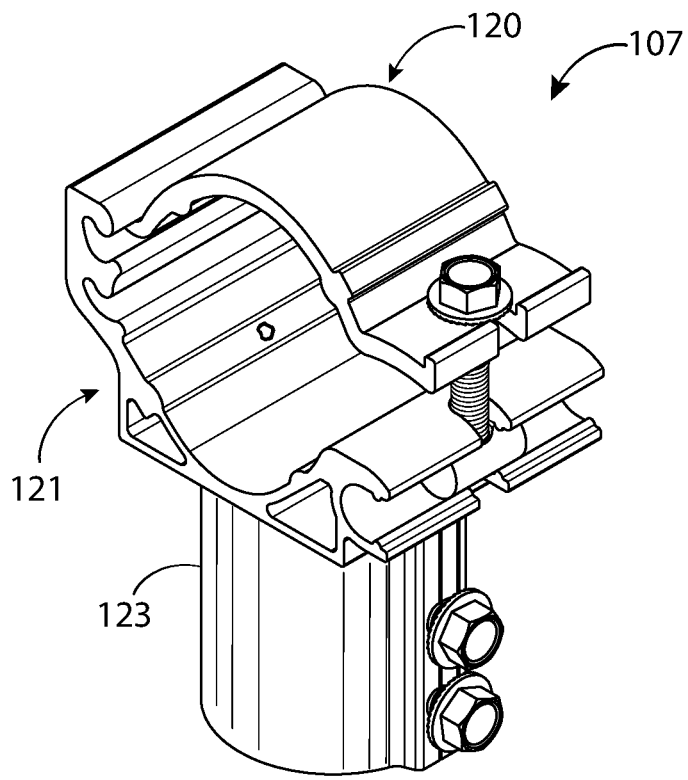
FIGS. 4, 5, 6, 7, and 8 illustrate a pipe clamp of the present disclosure in a front isometric view, rear isometric view, left-side view, exploded view, and front view, respectively.
Figure 5:
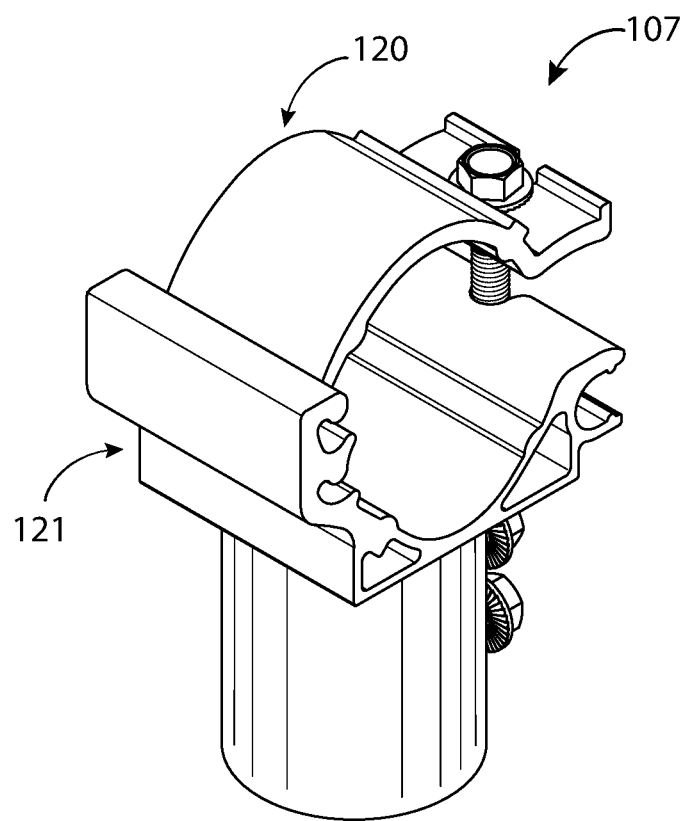

The pipe clamps also may include a base that extends downward from the cradle. The base attaches to other pipes using additional threaded fasteners that extend through a base wall. FIGS. 4, 18, and 26 illustrate the pipe clamp base 123, pipe clamp base 133, and pipe clamp base 143, respectively. These bases will be discussed in more detail in the next section.

Pipe Clamp Variations

Referring to FIGS. 9 and 23, pipe clamp base 123 pipe clamp base 133, respectively, include sleeves. These sleeves capture and secure the upward-oriented pipe. FIGS. 9 and 23 show the sleeve as pipe base interior 123a and pipe base interior 133a, respectively. Pipe 111 may be inserted into the pipe base interior 123a of FIG. 9 or pipe base interior 133a of FIG. 23, as illustrated. Threaded fasteners extending through the pipe base wall press and secure pipe 111 against the interior wall of the sleeve. In FIGS. 9 and 23, threaded fastener 124 and threaded fastener 125 extend through pipe base interior 123a and pipe base interior 133a, respectively. Referring to FIG. 7 threaded fastener 124 and threaded fastener 125 extend through threaded aperture 123b and threaded aperture 123c, respectively, in ridge 123d of pipe clamp base 123. Similarly, in FIG. 21, threaded fastener 124 and threaded fastener 125 extend through threaded aperture 133b and threaded aperture 133c, respectively, in ridge 133d of the pipe clamp base 133.

Figure 46:
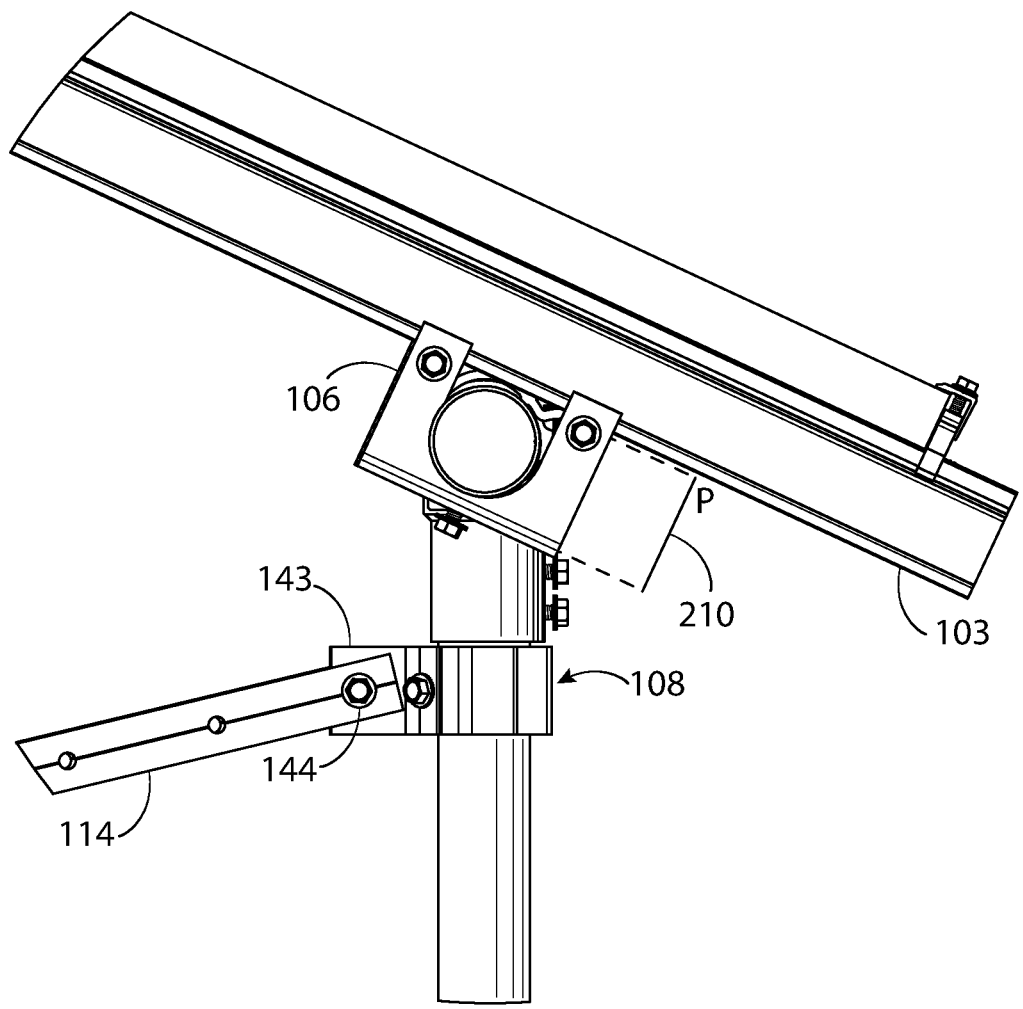
FIG. 46 illustrates an enlarged portion of FIG. 3.

Referring to FIG. 26, pipe clamp base 143 of pipe clamp 108 includes a pedestal. Referring to FIG. 46, a threaded fastener 144 extends through a cross-brace 114 to engage and secure the cross-brace 114 to the pedestal, i.e., pipe clamp base 143 of pipe clamp 108. Referring to FIG. 29, the threaded fastener 144 threadedly engages the threaded aperture 143b in the pedestal (i.e., the pipe clamp base 143) to secure the cross-brace against the pedestal. The threaded aperture 143b may extend through a ridge 143d. The ridge allows the threaded aperture 143b to have additional depth so that the threaded fastener 144 has more threading to secure to.

The pedestal side 143e facing the cross-brace may be shaped to press more directly against the cross-brace. For example, as illustrated in FIG. 29, the pedestal side 143e includes a planar surface. In this case, the pedestal side may be flat, or planar, to seat against a rectangular or square cross-brace. In another example, the pedestal side may be concave to seat against a round cross-brace.

Referring to FIG. 7 pipe clamp base 123 and the pipe clamp body 121 may be a one-piece body, for rigidity, strength, and precision of the angle between the pipe clamp base 123 and the pipe clamp body 121. Similarly, referring to FIG. 29, the pipe clamp base 143 and the pipe clamp body 141 may be a one-piece body and are illustrated in FIG. 29 as a one-piece body.

Referring to FIG. 21, the pipe clamp body 131 and the pipe clamp base 133 of the adjustable-angle pipe clamp are separate. The pipe clamp body includes a pivot arm 131m extending downward from the pipe clamp body 131. The pivot arm 131m may include a curved bottom surface 131n. Within the pivot arm is a curved slot-shaped aperture 1310. A threaded fastener 135 may extend through the curved slot-shaped aperture 1310 and engage a threaded aperture 133f in the pipe clamp base 133. The threaded fastener 135 may optionally extend through a first washer 136 and optionally extend through a second washer 137. The first washer 136, shown here as a flat washer, provides a round seating surface for the threaded fastener head 135a. The second washer 137 is shown as a star washer. This washer helps to facilitate electrical conductivity between the pipe clamp body 131 and pipe clamp base 133. FIG. 23 also shows the relationship between the first washer 136, the second washer 137, pipe clamp body 131, and the pipe clamp base 133.

Referring to FIG. 21, the pipe clamp body 131 is rotated about the curved slot-shaped aperture 1310. The curved bottom surface 131n, rotates along a pivot base 133n. The pivot base 133n is within the pipe clamp base 133. The pivot base 133n may be concave with a curve shape that is complementary to the curve of the curved bottom surface 131n to help facilitate smooth rotation.

Figure 24:
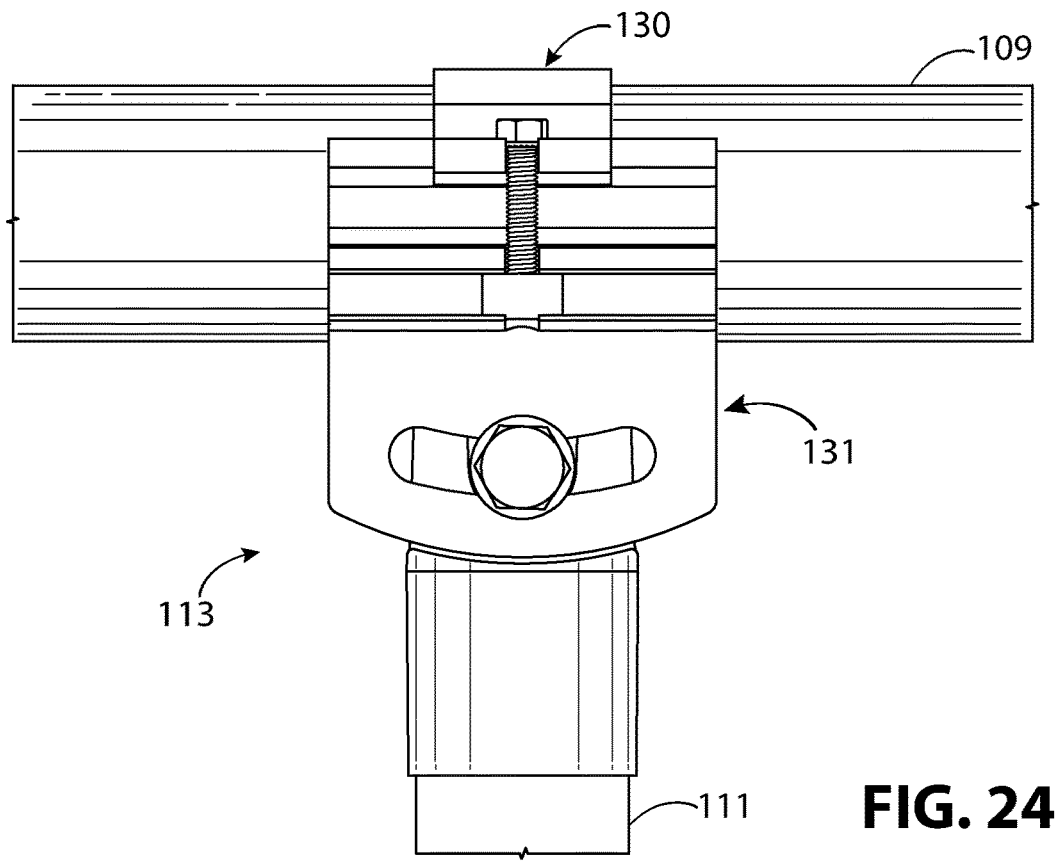
FIGS. 24 and 25 illustrate, in front view, the second pipe clamp with the pipes set at a right angle and oblique angle, respectively.
Figure 25:
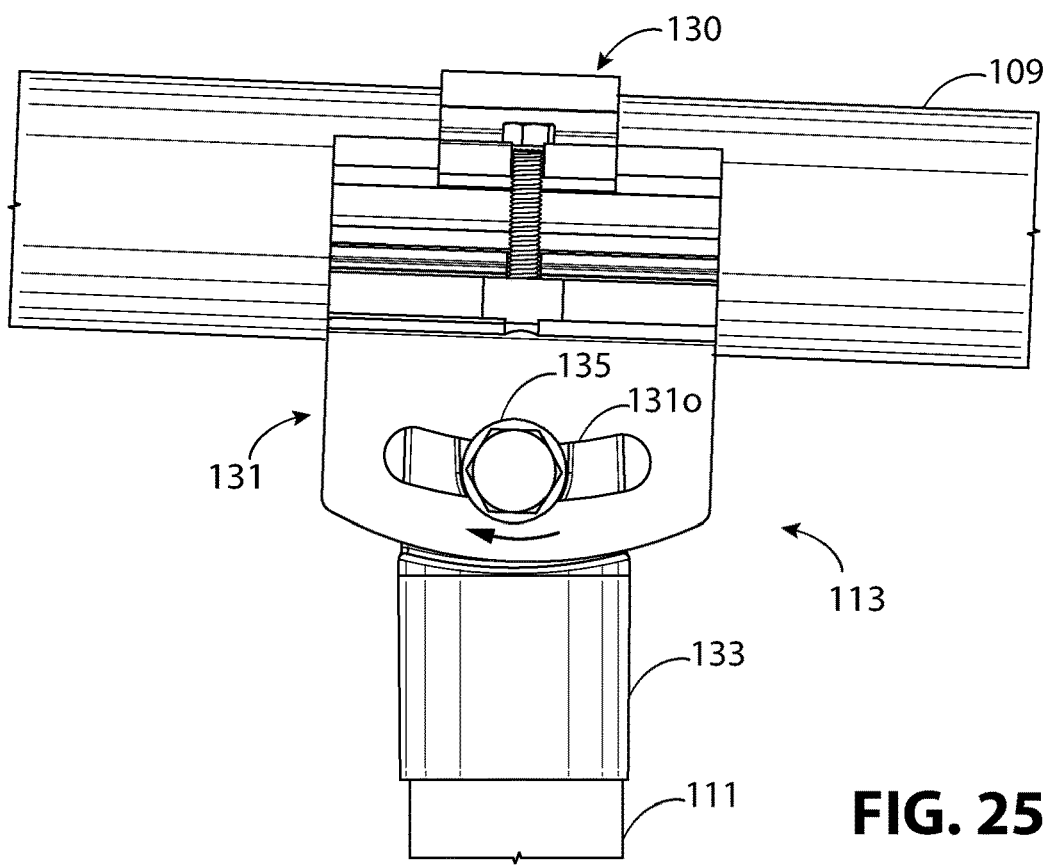

FIGS. 24 and 25 illustrate leveling a lateral-oriented pipe for uneven terrain. In FIG. 24, lateral-oriented pipe, pipe 109, is oriented perpendicularly to upward-oriented pipe, pipe 111. In FIG. 25, pipe 109 is rotated, so that is no longer perpendicular with pipe 111 to compensate for uneven terrain. In FIG. 25, the pipe clamp body 131 is rotated about curved slot-shaped aperture 1310. After adjustment, threaded fastener 135 is tightened against the pipe clamp base 133 to secure the pipe 109 in place.

Rail-Pipe Bracket

Figure 32:
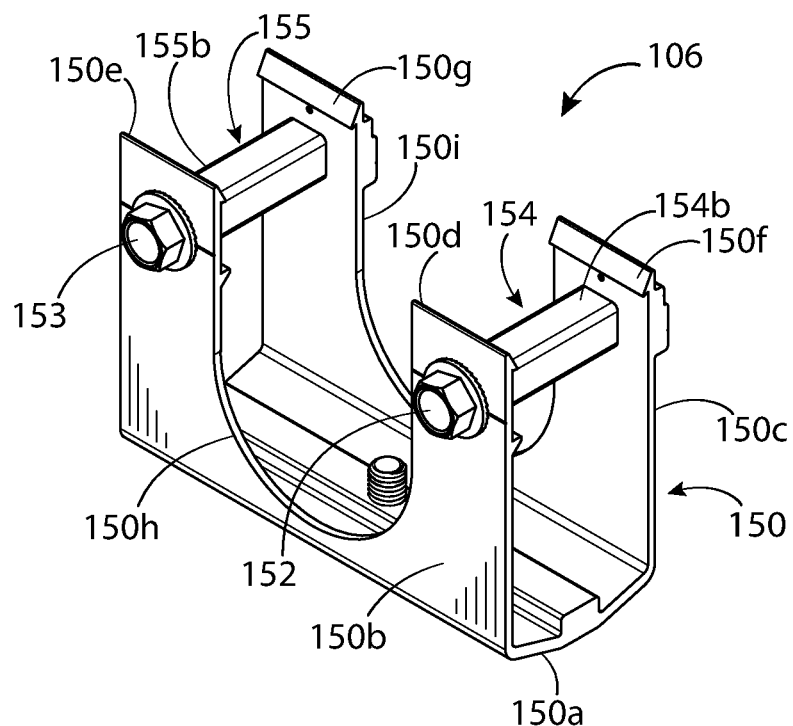
FIGS. 32, 33, 34, 35, and 36 illustrate a rail-pipe bracket of the present disclosure in a front isometric view, rear isometric view, front view, exploded view, and left-side view, respectively.
Figure 33:
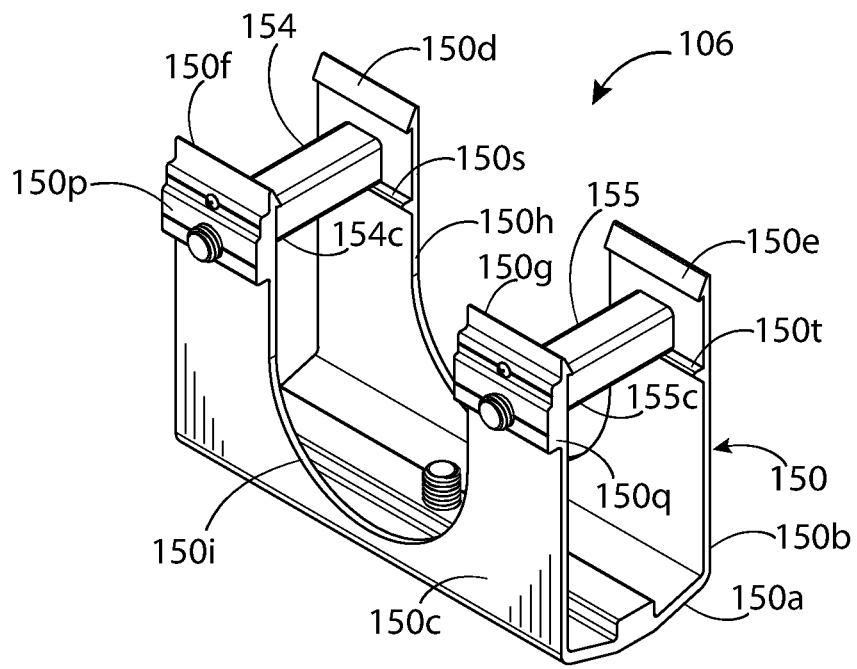
Figure 34:
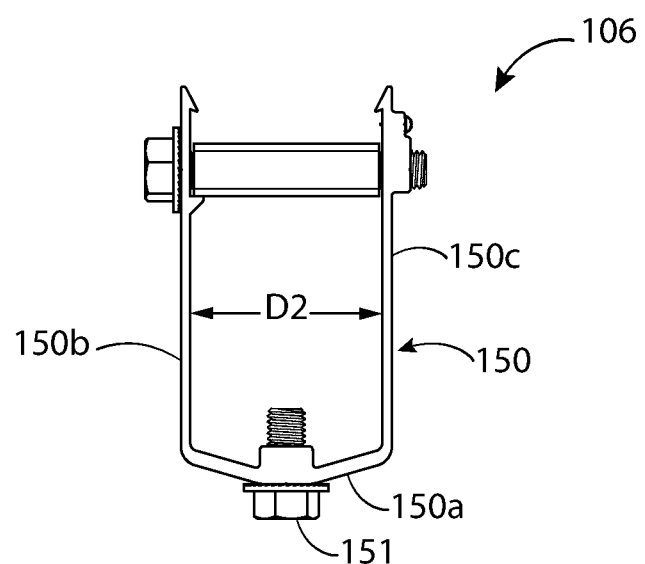
Figure 35:
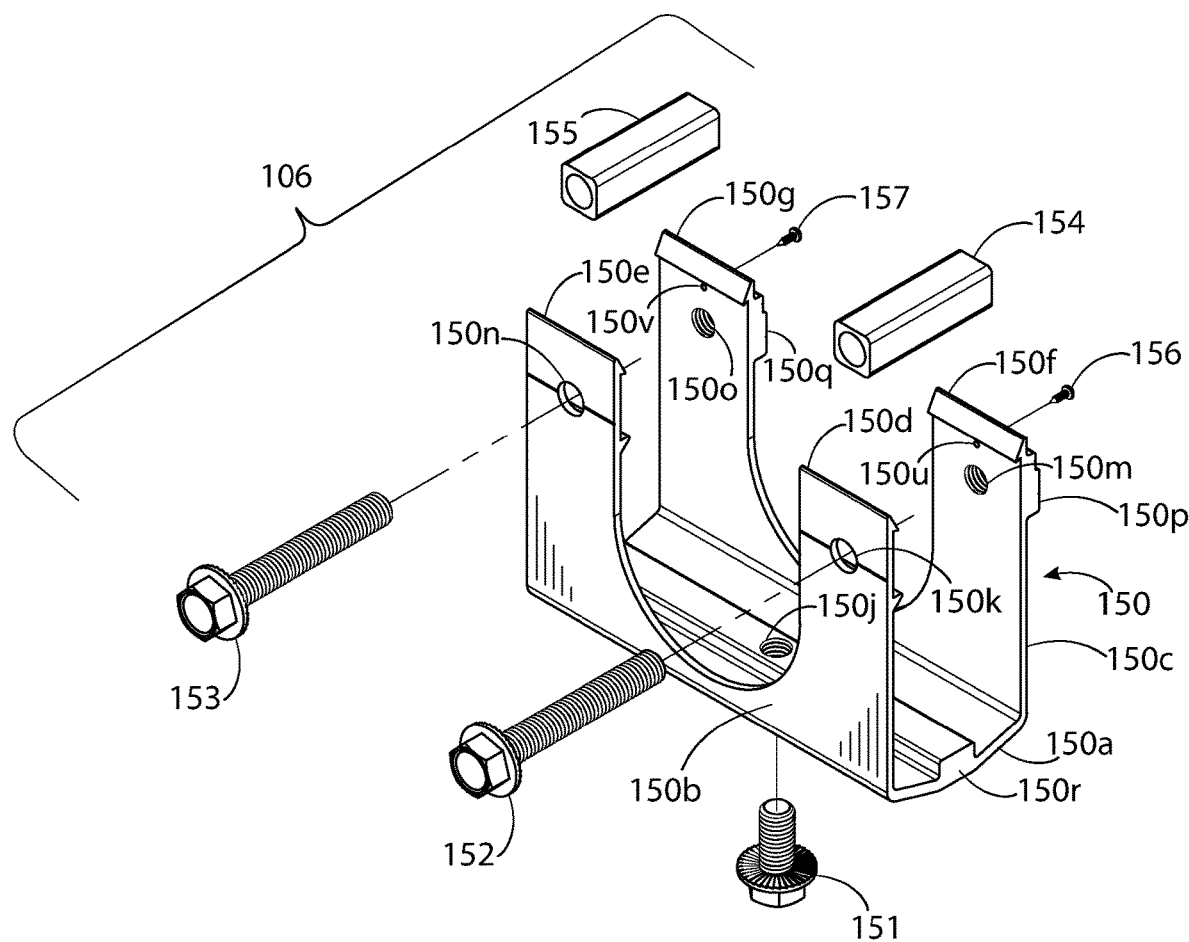
Figure 36:
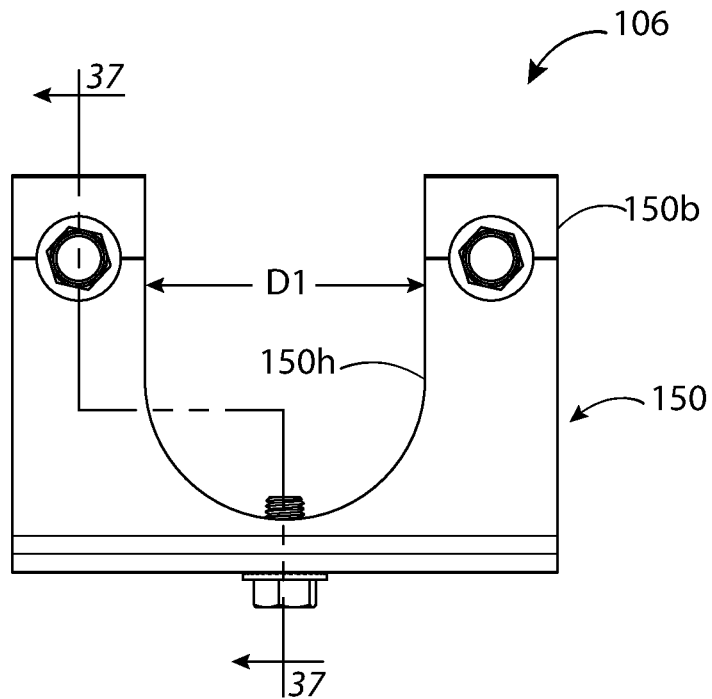
Figure 37:
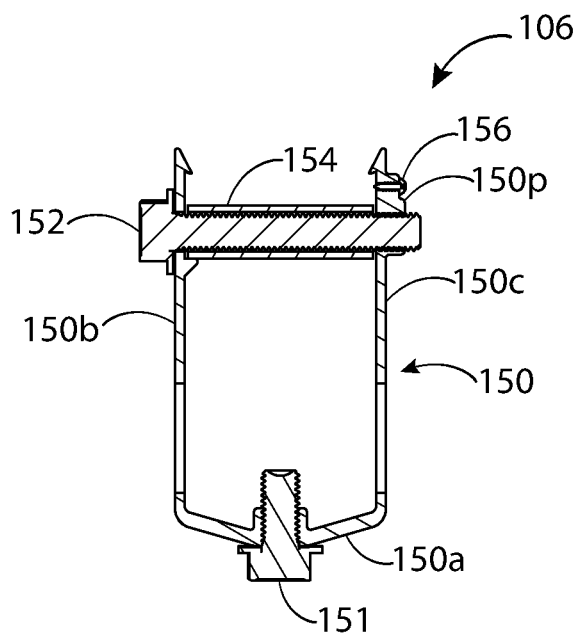
FIG. 37 illustrates a section view of the third pipe clamp of FIG. 36 taken along section lines 37-37.
Figure 47:
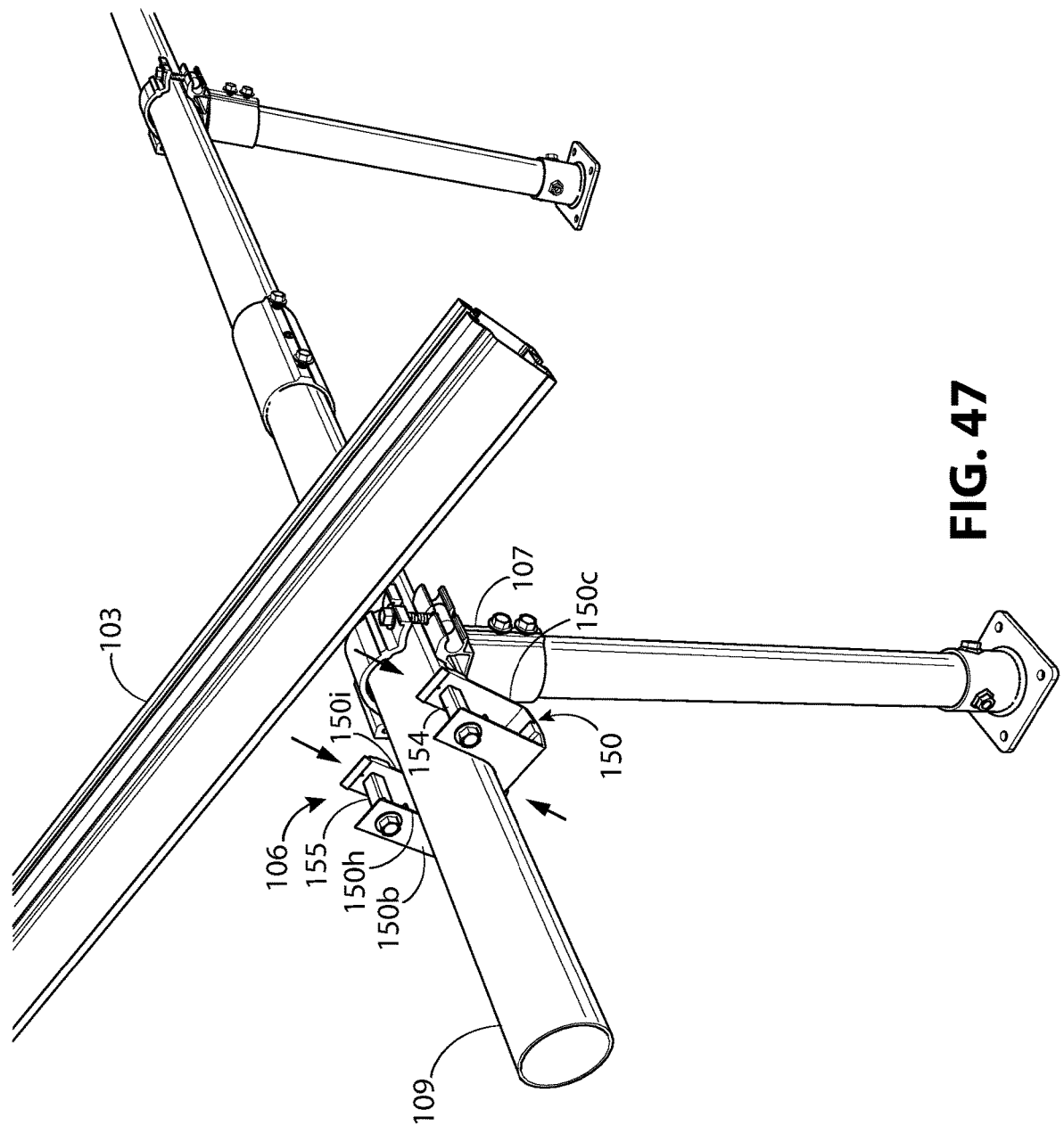
FIG. 47 illustrates, in perspective view, attaching a rail to a lateral-oriented pipe using a rail-pipe bracket.
Figure 48:
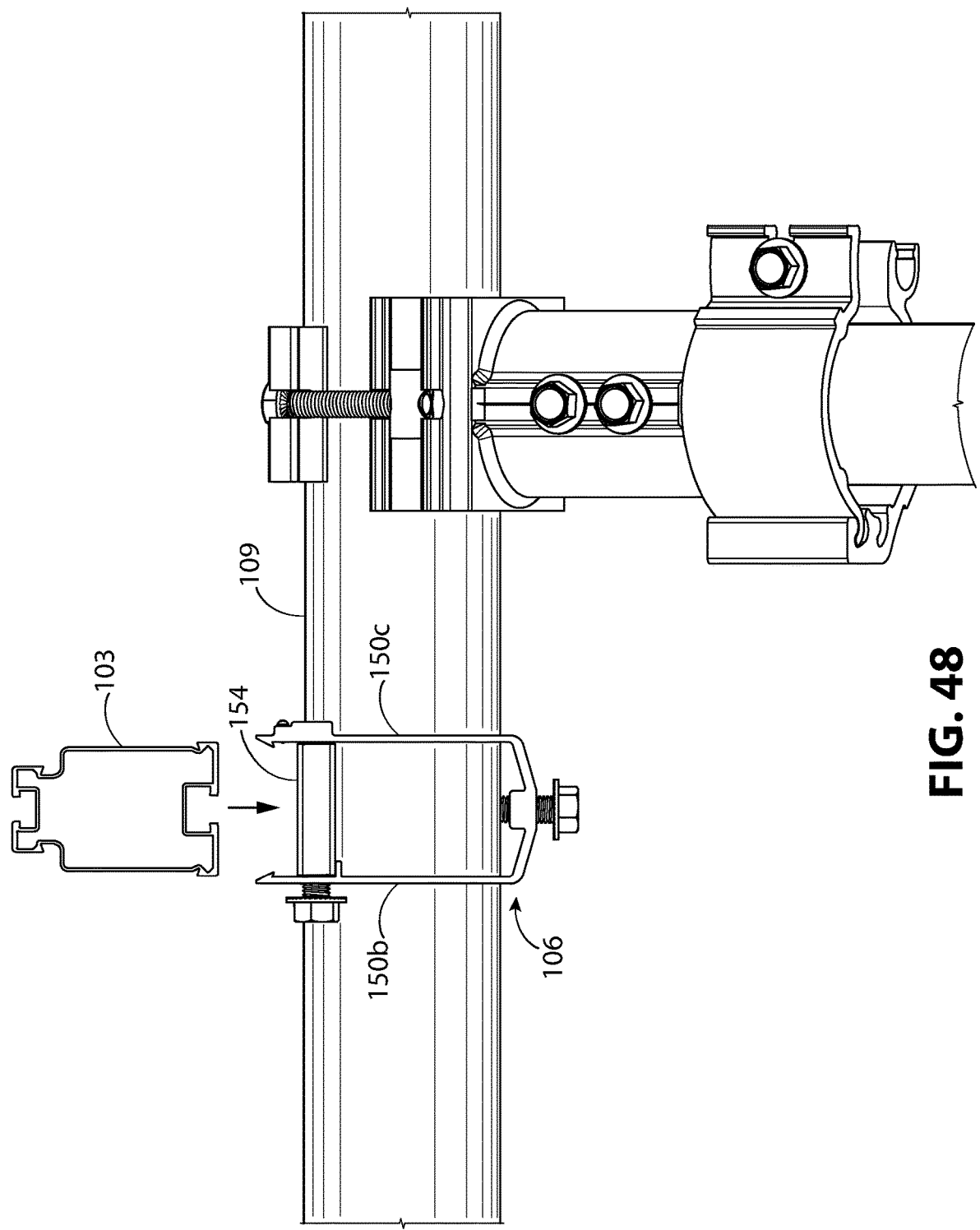
FIGS. 48-52, illustrates, in a front auxiliary view, a sequence of attaching a rail to a lateral-oriented pipe using a rail-pipe bracket, and then attaching a solar panel to the rail.
Figure 50:
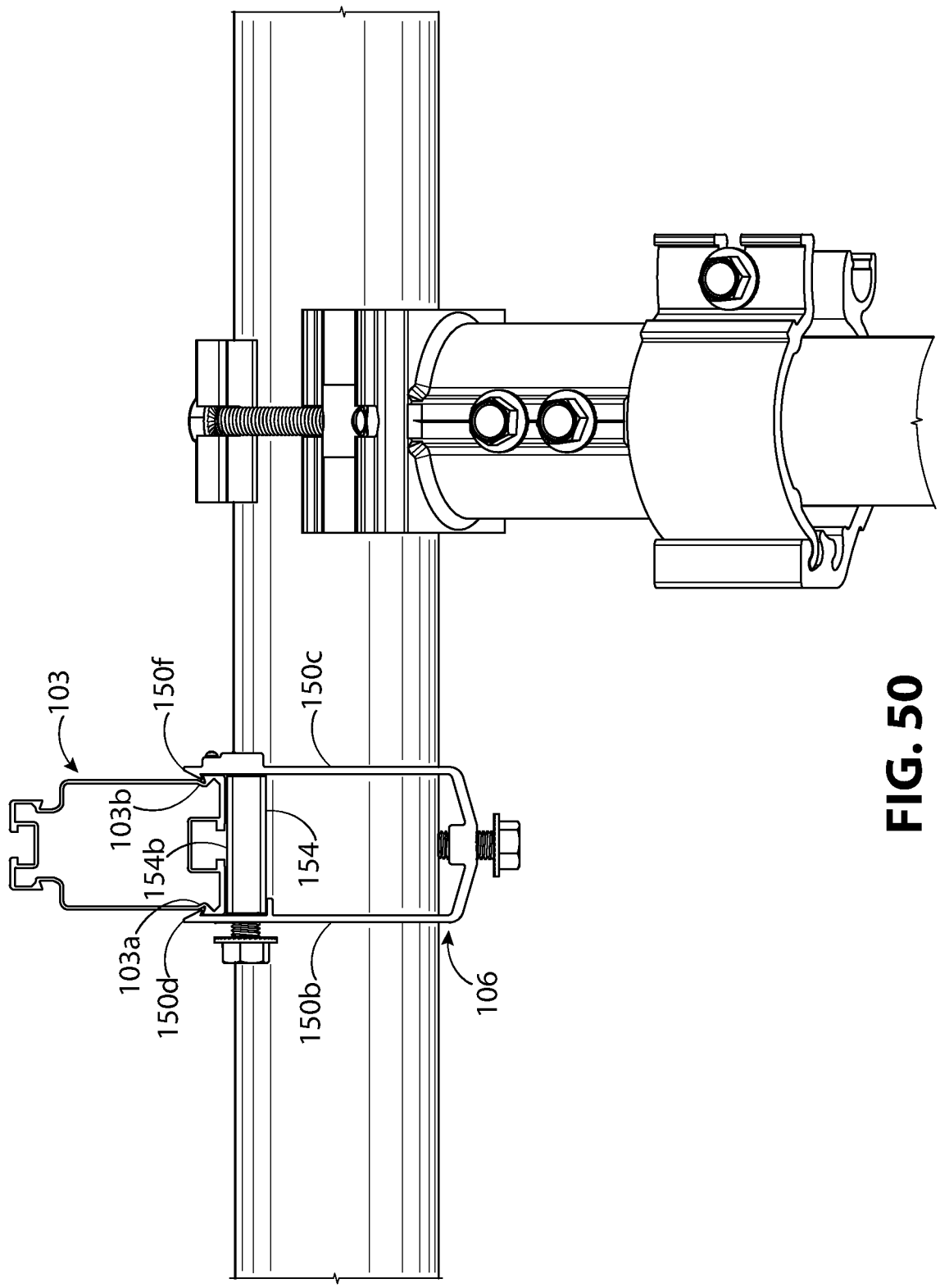
Figure 51:
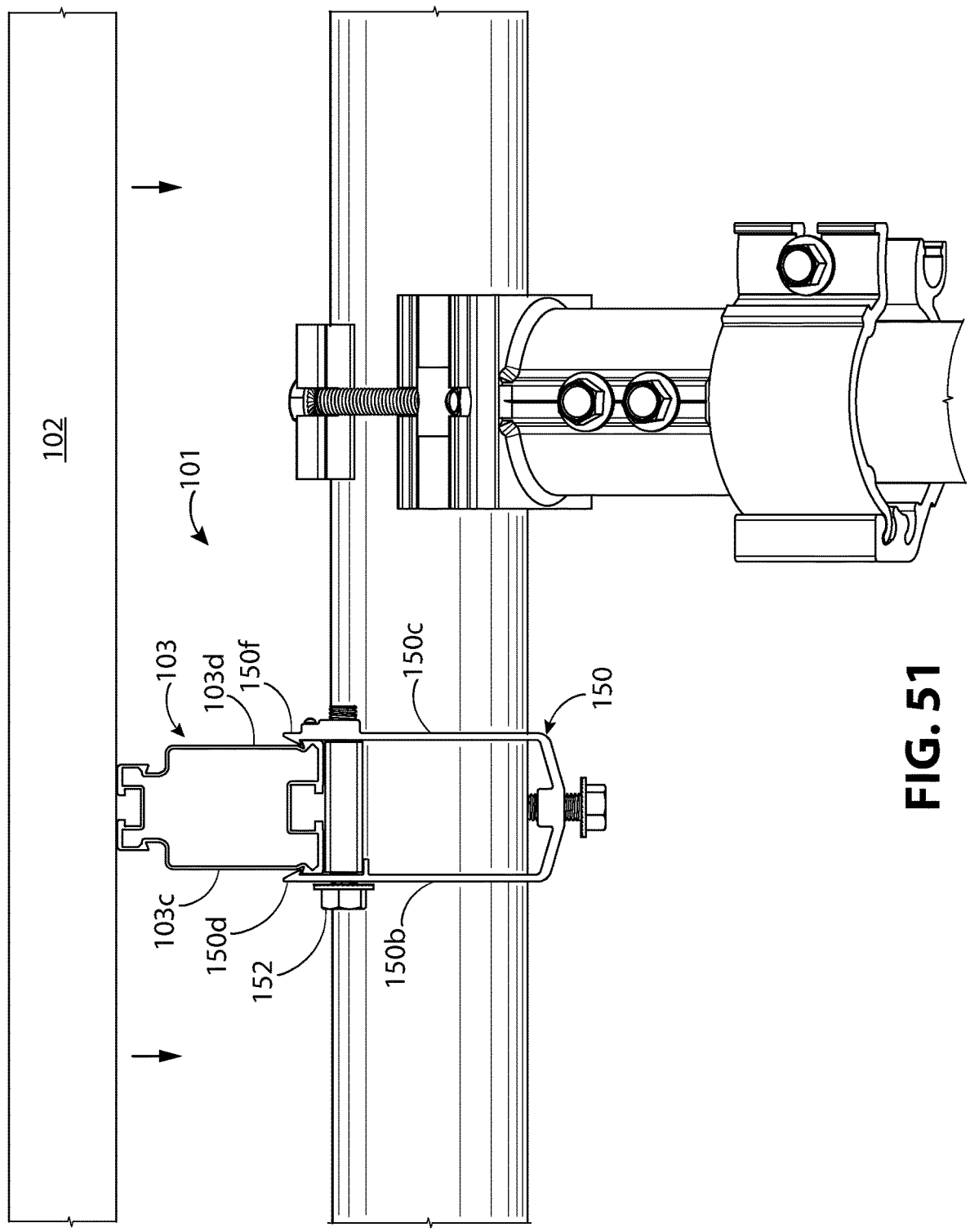
Figure 54:
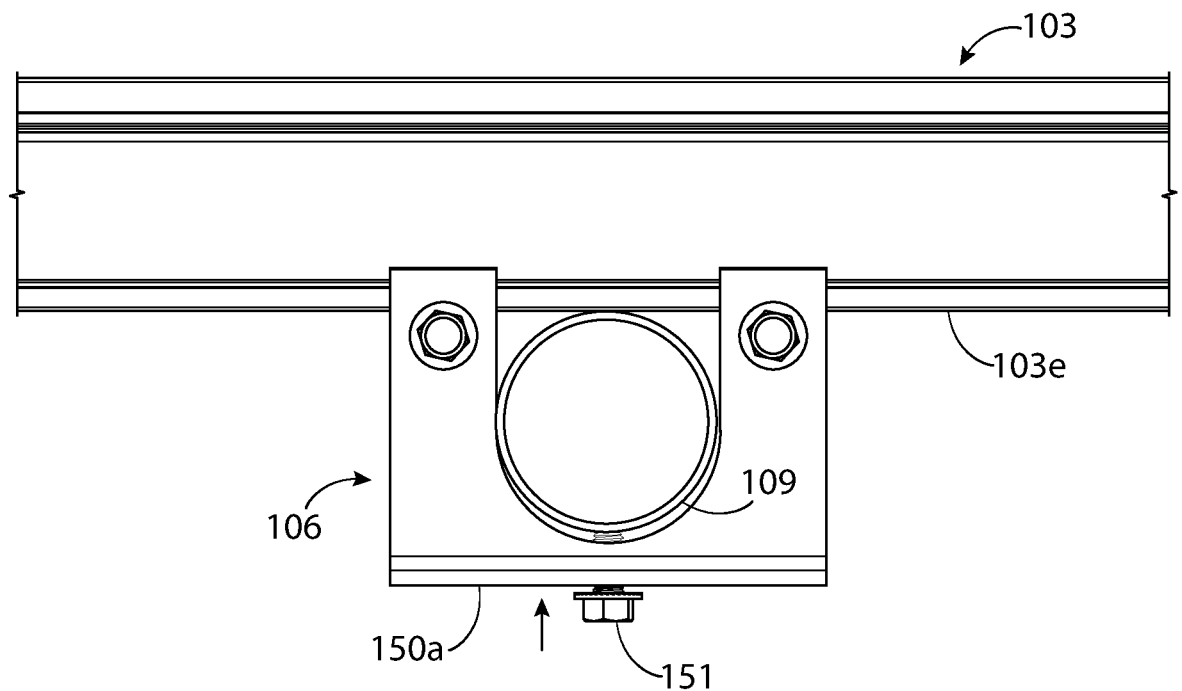

The rail-pipe bracket secures a pipe to a rail, typically a lateral-oriented pipe to a rail, such as pipe 109 to a rail 103 in FIG. 2. Referring to FIGS. 32-37, the rail-pipe bracket 106 may include a rail-pipe bracket body 150. The rail-pipe bracket body 150 may include a bottom 150a and a pair of sides, first side 150b and second side 150c, that extend upward from the bottom 150a. The second side 150c, is hidden from view in FIG. 36. The pair of sides may include hooks, or clamping portions, that hold rail sides to the rail-pipe bracket body. Referring to FIGS. 32, 33, and 35, the first side 150b includes first hook 150d and second hook 150e. The second side 150c includes third hook 150f and fourth hook 150g. The hooks typically extend downward and snap into catches or detents in the rail sides. FIG. 50 shows the first hook 150d and the third hook 150f secured into the rail lower detent 103a and the rail lower detent 103b, respectively, of rail 103. Referring to FIG. 47, the lateral-oriented pipe, pipe 109, extends through a pair of pipe openings in the rail-pipe bracket sides, first pipe opening 150h in the first side 150b and the second pipe opening 150i in the second side 150c. FIGS. 32, 33, and 35 also illustrate the pair of pipe openings. Referring to FIGS. 34 and 37, a threaded fastener 151 may extend through the bottom 150a. Referring to FIG. 35, the threaded fastener 151 may engage a threaded aperture 150*j*. The threaded fastener may optionally extend through a ridge 150*r*. The ridge 150*r* allows the threaded aperture 150*j* to be longer and provide more threading. Referring to FIG. 54, the threaded fastener 151 presses the pipe 109 against the rail bottom surface 103*e*. Referring to FIG. 51, once the rail 103 is snapped into place, the installer can tighten threaded fasteners, for example, the threaded fastener 152, that extend between the first side 150*b* and the second side 150*c* of the rail-pipe bracket body 150. This squeezes the sides of the rail-pipe bracket body 150 against the rail sides, first rail side 103*c* and second rail side 103*d*. This helps to prevent the rail from pulling away from the hooks when the wind pushes upward against the bottom of the solar panel. FIG. 35 illustrates the threaded fastener 152 extending through aperture 150*k* in the first side 150*b* and through threaded aperture 150*m* in the second side 150*c*. FIG. 35 also illustrates threaded fastener 153 extending through aperture 150*n* in the first side 150*b* and threaded aperture 150*O* and the second side 150*c*. Threaded aperture 150*m* and threaded aperture 150*O* may extend through a first ridge 150*p* and a second ridge 150*q*, respectively. FIG. 33 also illustrates the first ridge 150*p* and the second ridge 150*q*. The ridges extend the depth of their respective apertures and provide additional threading.

Referring to FIG. 32, threaded fastener 152 and threaded fastener 153 may extend through spacer 154 and spacer 155, respectively. The spacers prevent damage to the rail from over tightening, and to provide a seat for the bottom of the rail, independent of the pipe. Referring to FIGS. 32 and 33, spacer 154 and spacer 155 are positioned between first side 150*b* and second side 150*c* and below first hook 150*d*, second hook 150*e*, third hook 150*f*, and fourth hook 150*g*. As illustrated in FIG. 35, spacer 154 and spacer 155 may be removably attachable (i.e., they may be removed from the rail-pipe assembly). The spacers are also positioned on either side of the pipe openings so they not interfere with the pipe. In FIGS. 32 and 33, for example, spacer 154 is positioned on one side of the first pipe opening 150*h* and the second pipe opening 150*i*, while spacer 155 is positioned on the opposite side of the first pipe opening 150*h* and the second pipe opening 150*i*. The spacers prevent over tightening by limiting how much the threaded fastener 152 and threaded fastener 153 can squeeze together first side 150*b* and second side 150*c*. FIG. 37 shows threaded fastener 152 extending through first side 150*b*, spacer 154, and second side 150*c*, including first ridge 150*p*.

Figure 38:
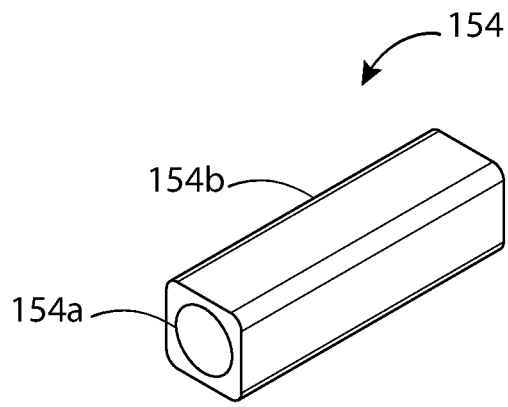
FIGS. 38 and 39 illustrate a spacer in isometric and left-side view, respectively.
Figure 39:
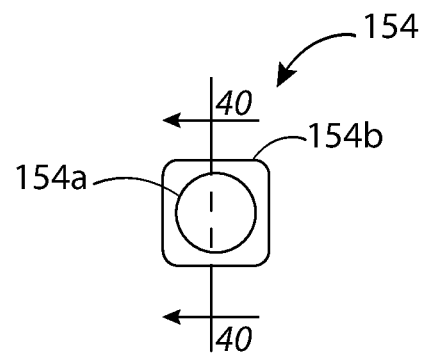
Figure 40:
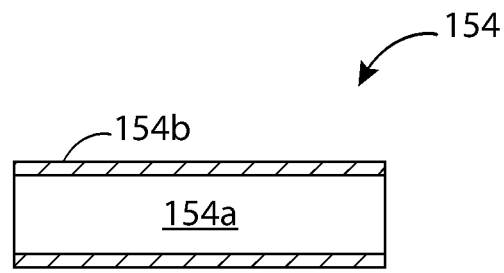
FIG. 40 illustrates a section view of the spacer taken along section lines 40-40 in FIG. 39.

FIGS. 38-40 illustrate the spacer 154, but the following discussion also applies to spacer 155. Referring to FIGS. 38-40, spacer 154 includes an aperture 154*a* structured to receive threaded fastener 152 or threaded fastener 153 of FIG. 35. The spacers are illustrated in FIGS. 38-40 as unthreaded. This allows the threaded fastener to rotate without rotating spacer 154. However, spacer 154 may optionally be threaded if required. Spacer 154 may include a spacer top surface 154*b* that is structured to seat the rail bottom surface. For example, spacer 154 may have a planar top surface for seating a rail bottom surface with planar portions. Referring to FIG. 32, spacer top surface 154*b* and spacer top surface 155*b* may be positioned so that with the rail resting against the spacers, the hooks are positioned in the rail lower detents. This is illustrated in FIG. 50, where rail 103 rests against spacer 154 with spacer top surface 154*b* positioned so that first hook 150*d* and third hook 150*f* engage rail lower detent 103*a* and rail lower detent 103*b*, respectively.

The rail-pipe bracket body 150 may include platforms that extend inward from one side. FIG. 33 shows platform 150*s* and platform 150*t* extending inward from second side 150*c*. These platforms may be sized, shaped, and positioned to seat the spacer bottom surfaces and prevent the spacers from rotating. In FIG. 33, platform 150*s* seats the spacer bottom surface 154*c*. The platform 150*t* seats the spacer bottom surface 155*c*.

Bonding screws can extend through one of the clamping arms and dig into the rail, breaking through the oxide layer, and electrically bonding the rail-pipe bracket to the rail. FIG. 35 shows bonding screw 156 and bonding screw 157 extending through aperture 150*u* and aperture 150*v*, respectively. FIG. 37 shows bonding screw 156 extending through first ridge 150*p* and second side 150*c* and into the space between first side 150*b* and second side 150*c*.

The rail-pipe bracket body, as illustrated, comprises a one-piece body. This one-piece body allows for natural spring tension to form between the pair of sides and the bottom of the rail-pipe bracket body. The rail-pipe bracket body can be cast, stamped and punched, extruded and machined, 3D printed, or otherwise formed.

Assembly Method Example

Figure 41:
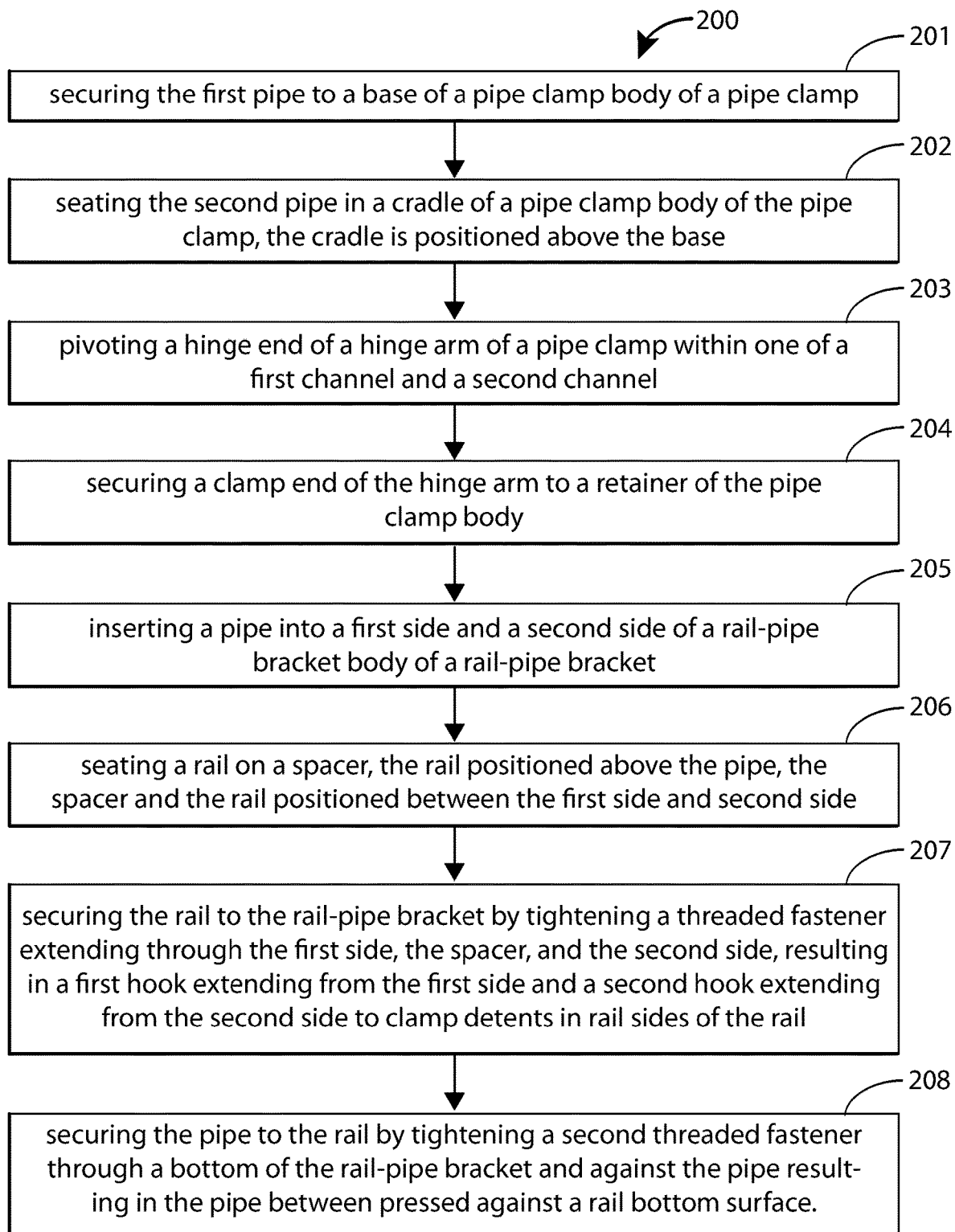
FIG. 41 illustrates a typical assembly sequence of the solar panel mounting system.

FIG. 41 shows a typical assembly method, method 200, for solar panel system 100 of FIGS. 1-3, and similar systems. Note that the method 200 is not limited to the solar panel system 100 of FIGS. 1-3 but is scalable to large residential and commercial solar panel systems. For example, the assembly method can scale to solar panel systems with fifty, one hundred, or even one thousand solar panels. FIGS. 42-57 illustrate the assembly steps.

When referring to FIG. 41 together with any of FIGS. 9, and 42-57, installation steps refer to FIG. 41, and structural elements refer to the other referenced figures.

Referring to FIGS. 9 and 41, in step 201, an installer can position and secure a first pipe, pipe 111, to the pipe clamp base 123 of the pipe clamp body 121 of the pipe clamp 107. The installer can do this by inserting the pipe 111 into the pipe base interior 123*a*, or sleeve, and tightening the threaded fastener 124 and the threaded fastener 125 against the pipe 111 so that the pipe is pressed against the pipe base interior 123*a*.

Figure 43:
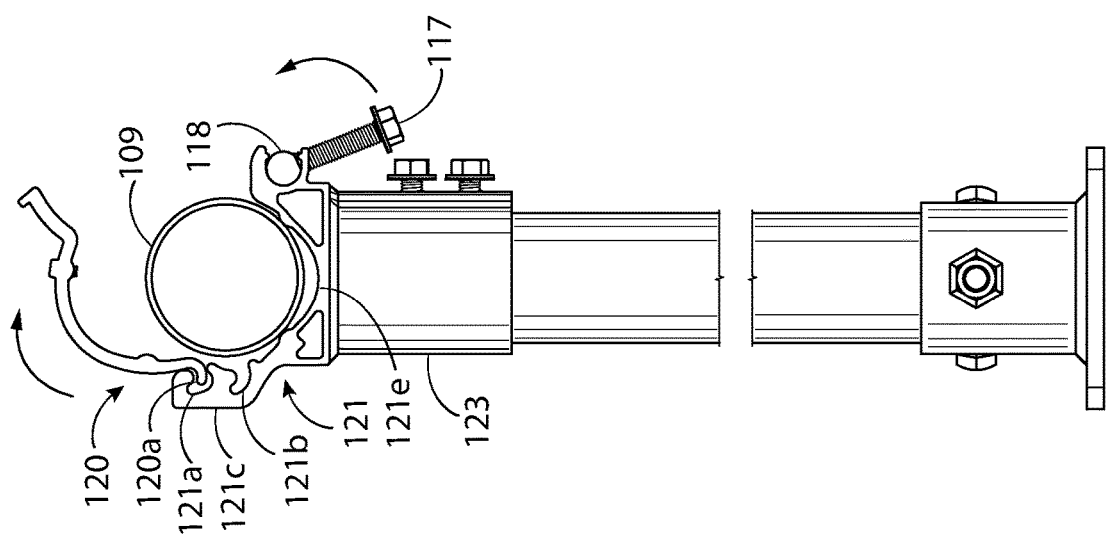
Figure 42:
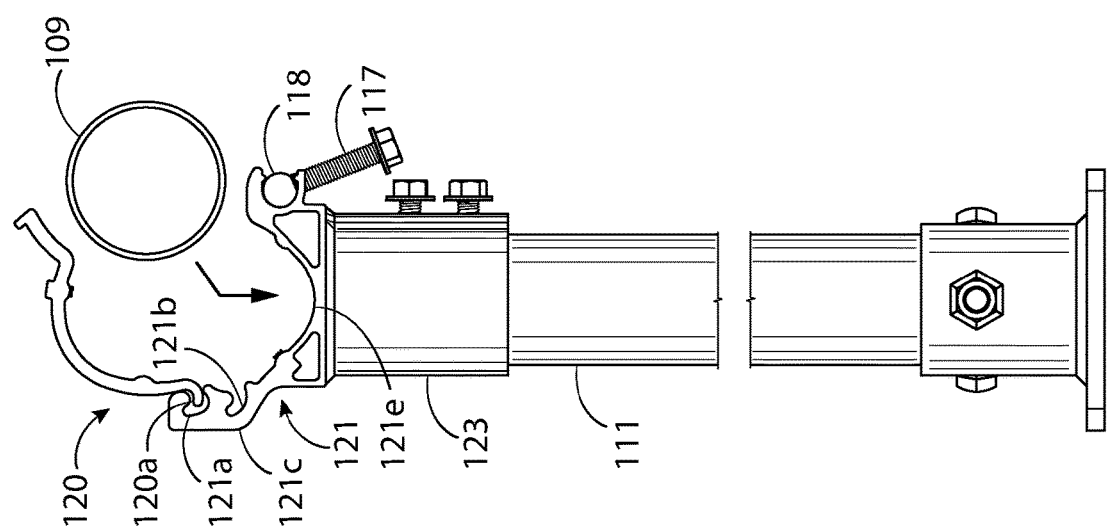
Figure 45:
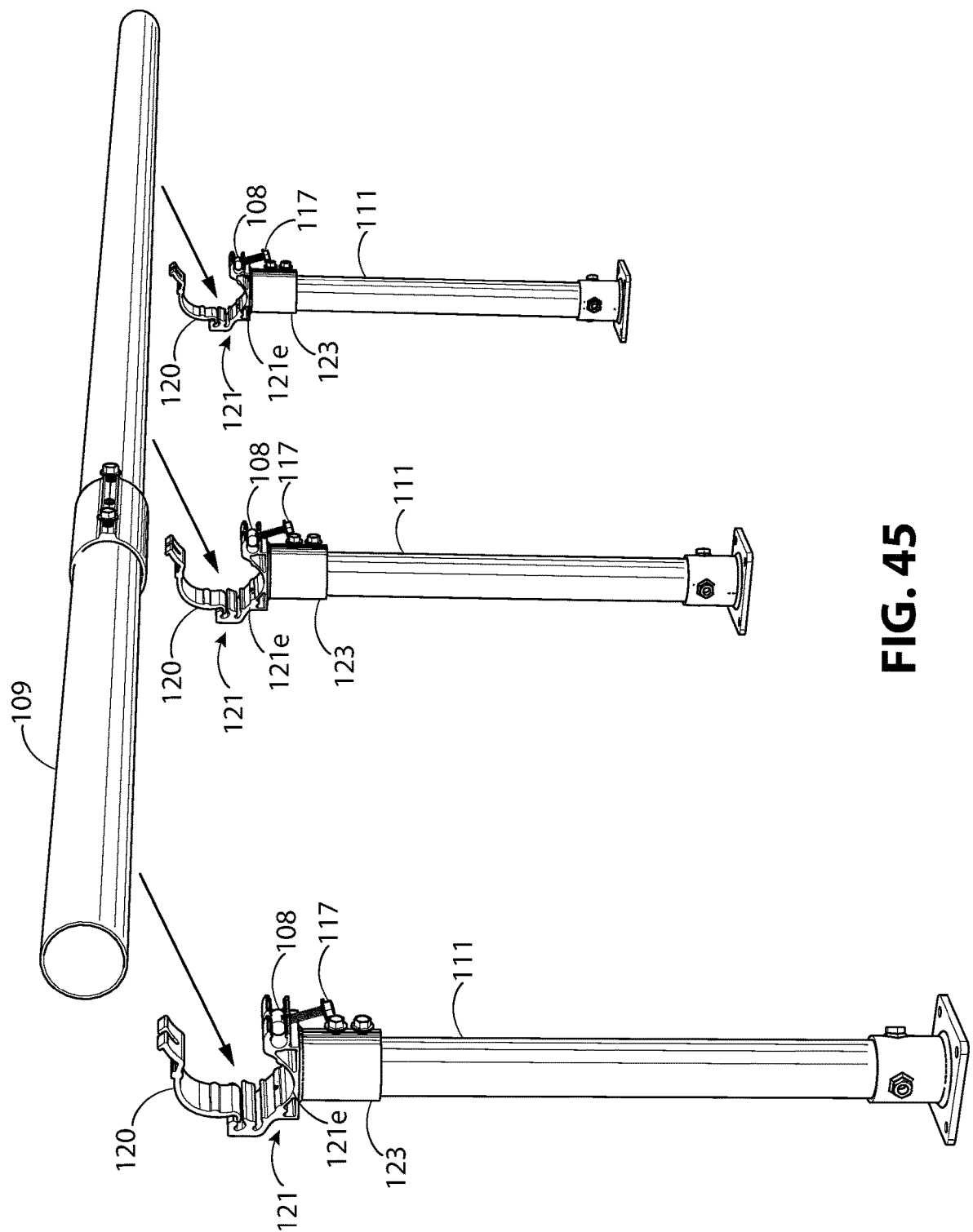
FIG. 45 illustrates, in perspective view, placing a lateral-oriented pipe in multiple pipe clamps.

Referring to FIGS. 41, 42, and 45, after securing the pipe 111 to the pipe clamp base 123 in step 201, in step 202, the installer seats the second pipe, pipe 109 in cradle 121*e* of pipe clamp body 121. The installer can do this by pivoting the hinge arm 120 open. Referring to FIGS. 42 and 43, the installer pivots the hinge end 120*a* of the hinge arm 120 in one of two channels, the first channel 121*a* and the second channel 121*b*, in the hinge-receiver 121*c*. That is, the hinge end may selectively pivot within the first channel 121*a* and the second channel 121*b*. Referring to FIGS. 42, 43, and 45, the threaded fastener 117 and cross-dowel 118 are pivoted downward as previously described. As previously discussed, the cradle 121*e* is positioned above the pipe clamp base 123.

Referring to FIGS. 41 and 43, in step 203, with pipe 109 seated in cradle 121*e*, the installer closes hinge arm 120 by pivoting hinge end 120*a* of a hinge arm 120 within either the first channel 121*a* or second channel 121*b*. In FIG. 43, hinge end 120*a* is seated in first channel 121*a* of pipe clamp body 121. The relationship between first channel 121*a* and second channel 121*b* was previously discussed in the Pipe Clamp Common Features section of this disclosure.

Figure 44:
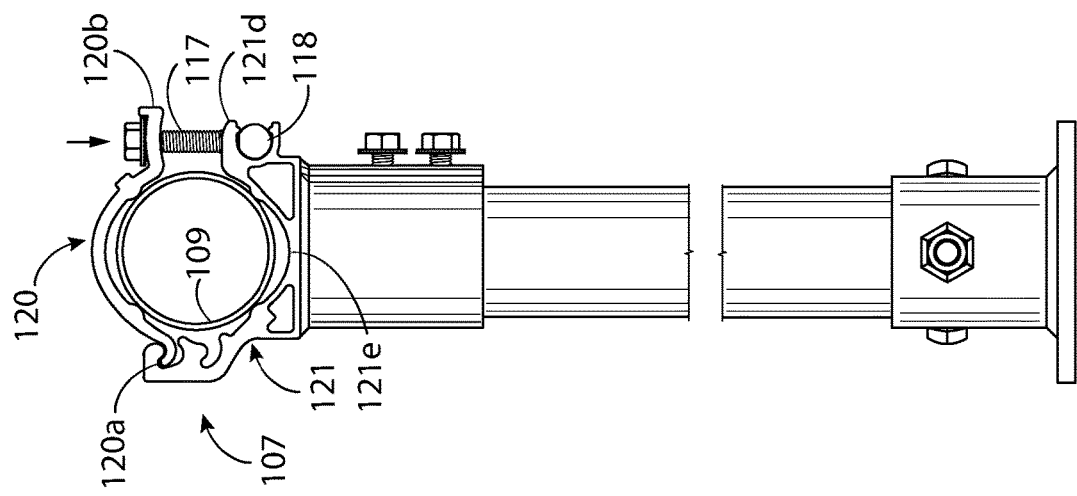
FIGS. 42, 43, and 44 illustrate, in left-side view, an assembly sequence of placing, seating, and clamping, respectively, a lateral-oriented pipe in a pipe clamp.

In FIGS. 41 and 44, in step 204, the installer secures the pipe 109 to pipe clamp 107, by securing clamp end 120*b* of hinge arm 120 to retainer 121*d* of pipe clamp body 121, retainer 121*d* extends outward from a second end of cradle 121e. Clamp end 120b extends outward from hinge arm 120 opposite the hinge end 120a. Referring to FIGS. 43 and 44, the installer can do this by first pivoting the threaded fastener 117 and cross-dowel 118 toward the hinge arm 120 (FIG. 43), and then tightening the threaded fastener 117 into the cross-dowel 118 (FIG. 44)

For clarity, FIGS. 50-52, and 56 show a portion of solar panel mounting system 101 in auxiliary view. Referring to FIG. 46, this auxiliary view is projected into plane 210 and designated with the letter "P." This view is essentially equivalent to a front view of a portion of the solar panel mounting system, rotated so that the rail 103 and rail-pipe bracket 106 in FIG. 46 are viewed as being parallel to the bottom of the page.

Referring to FIGS. 41 and 47, in step 205, the installer inserts the lateral-oriented pipe, pipe 109, into first pipe opening 150h and second pipe opening 150i of rail-pipe bracket body 150 of rail-pipe bracket 106. Rail-pipe bracket 106 is typically moved upward toward pipe 109 if pipe 109 is already attached to pipe clamp 107.

Figure 49:
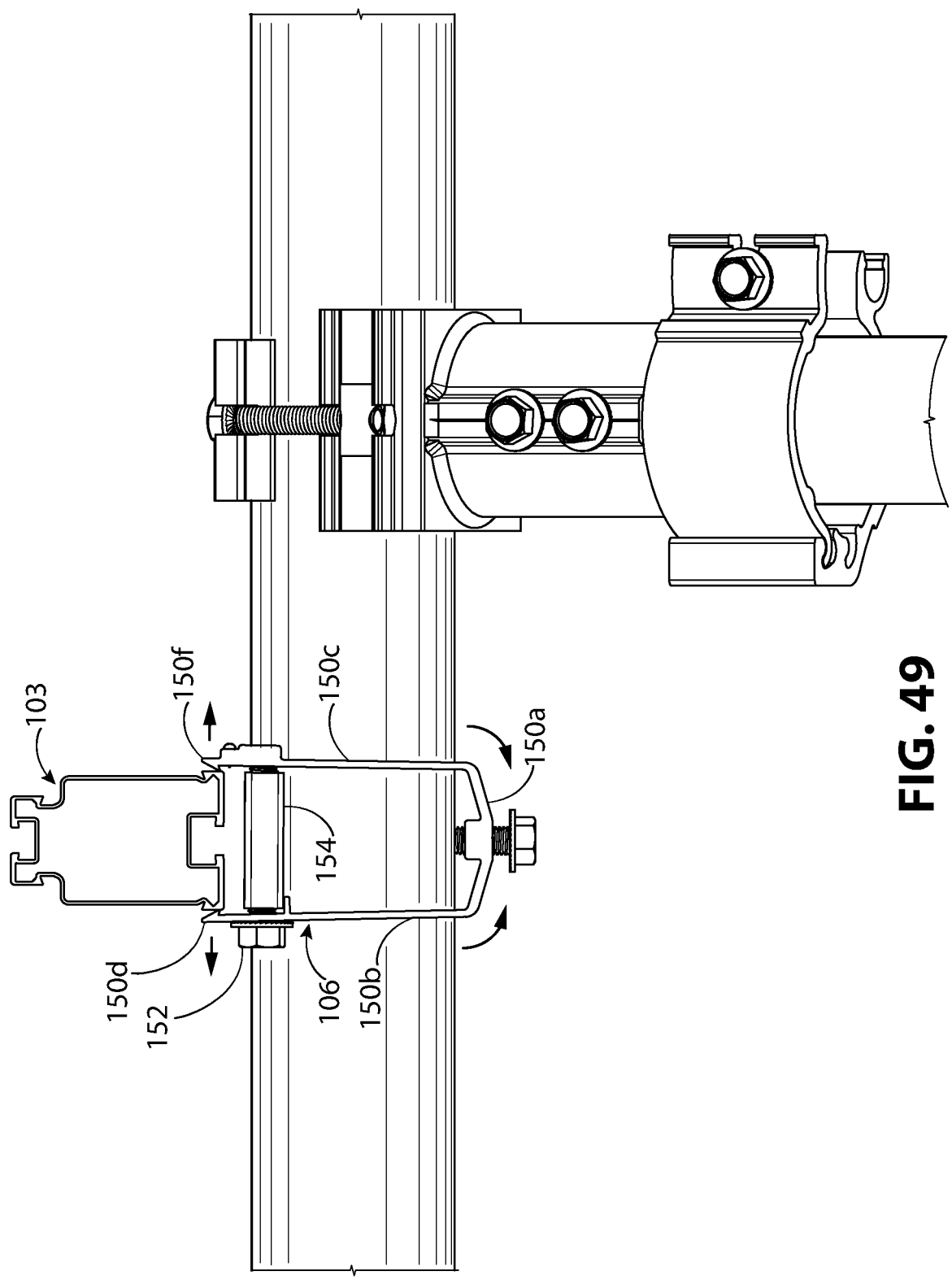

Referring to FIGS. 41, and 47-50, in step 206, the installer seats the rail 103 on spacer 154 and spacer 155. Spacer 154 and spacer 155, as well as rail 103, are positioned between first side 150b and second side 150c. Spacer 155 is hidden from view in FIGS. 48-50. Referring to FIG. 49, as rail 103 engages rail-pipe bracket 106, the hooks press against the rail sides. FIG. 49 shows two of the hooks, first hook 150d and third hook 150f pressing against the rail sides. The other hooks are hidden from view. As the hooks press against the rail sides, first side 150b and second side 150c hinge outward from bottom 150a. Threaded fastener 152 and threaded fastener 153 are sufficiently loosened to allow first side 150b and second side 150c to hinge outward without binding against the fastener heads. Threaded fastener 153 is hidden from view. Referring to FIG. 50, with first hook 150d and third hook 150f snapped into their respective detents, rail lower detent 103a and rail lower detent 103b, first side 150b and second side 150c of rail-pipe bracket 106 snap back into place by spring tension. Rail 103 is seated against spacer top surface 154b.

Referring to FIGS. 41 and 51, in step 207, the installer secures the rail 103 to rail-pipe bracket 106 by tightening threaded fastener 152 and threaded fastener 153 (hidden from view), resulting in the hooks, shown here as first hook 150d and third hook 150f clamping against rail sides, first rail side 103c and second rail side 103d.

Figure 53:
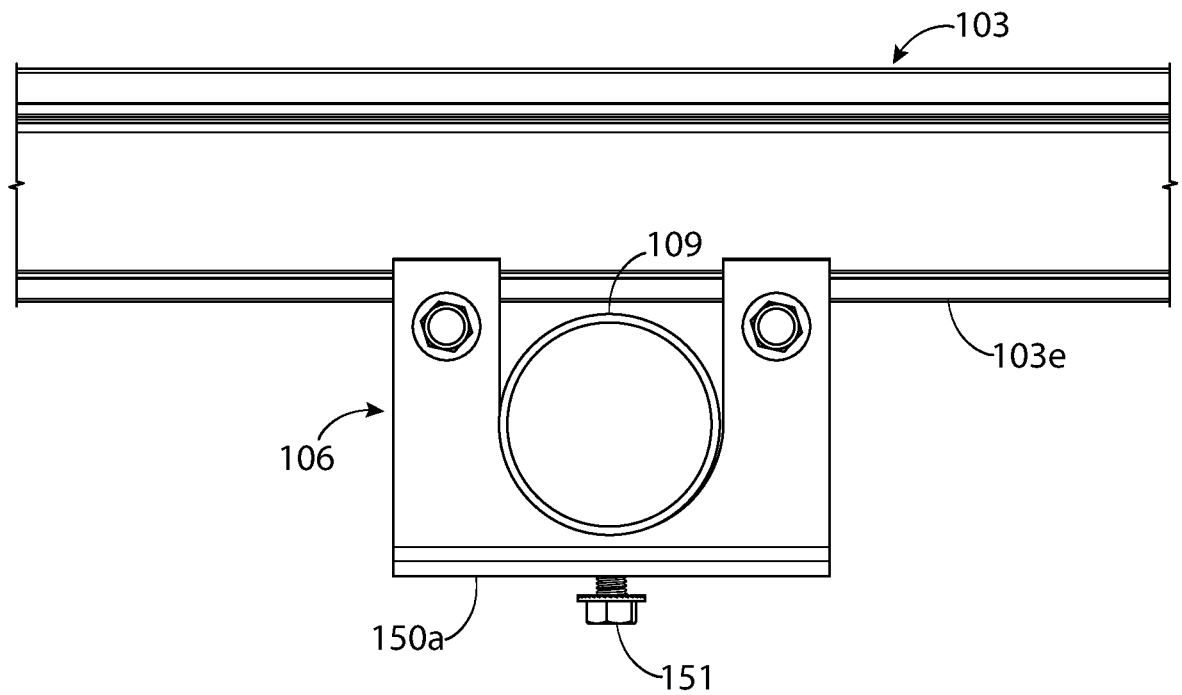
FIGS. 53 and 54 illustrate, in left-side view, the sequence of securing the lateral-oriented pipe to the rail and rail-pipe bracket.

Referring to FIGS. 41, 53, and 54, in step 208, the installer secures pipe 109 to rail 103 by tightening threaded fastener 151 through bottom 150a of rail-pipe bracket 106 and against pipe 109 resulting in pipe 109 between pressed against rail bottom surface 103e.

Figure 52:
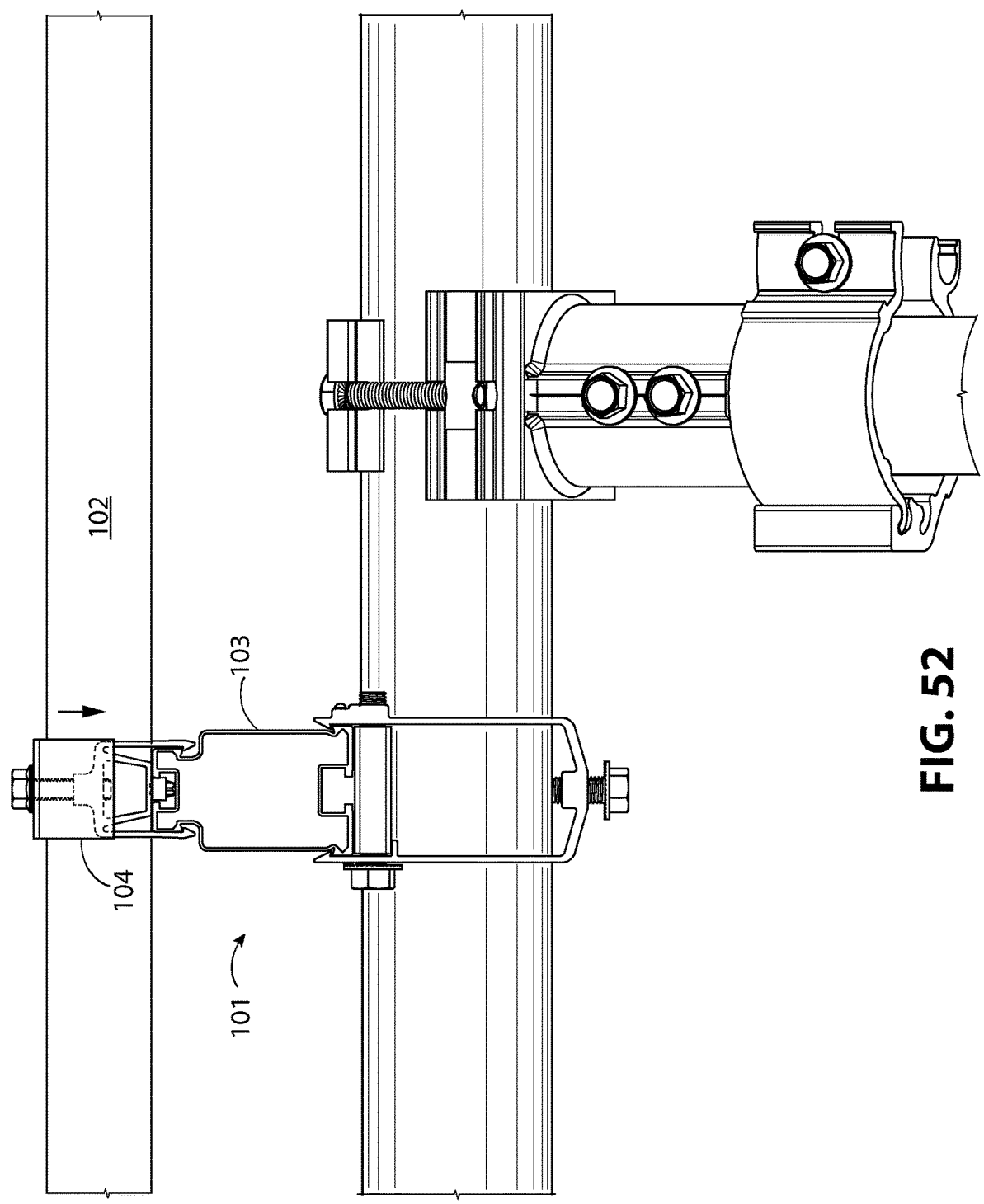

Referring to FIGS. 51 and 52, after the installer completes step 208, the installer can attach the solar panel 102 to the rail 103. In FIG. 51, the installer seats the solar panel 102 on top of the rail 103. In FIG. 52, the installer pops on, or snaps on, mid clamps and end clamps to the rail. FIG. 52 shows the end clamp 104, with mid clamps and other end clamps hidden from view.

Figure 55:
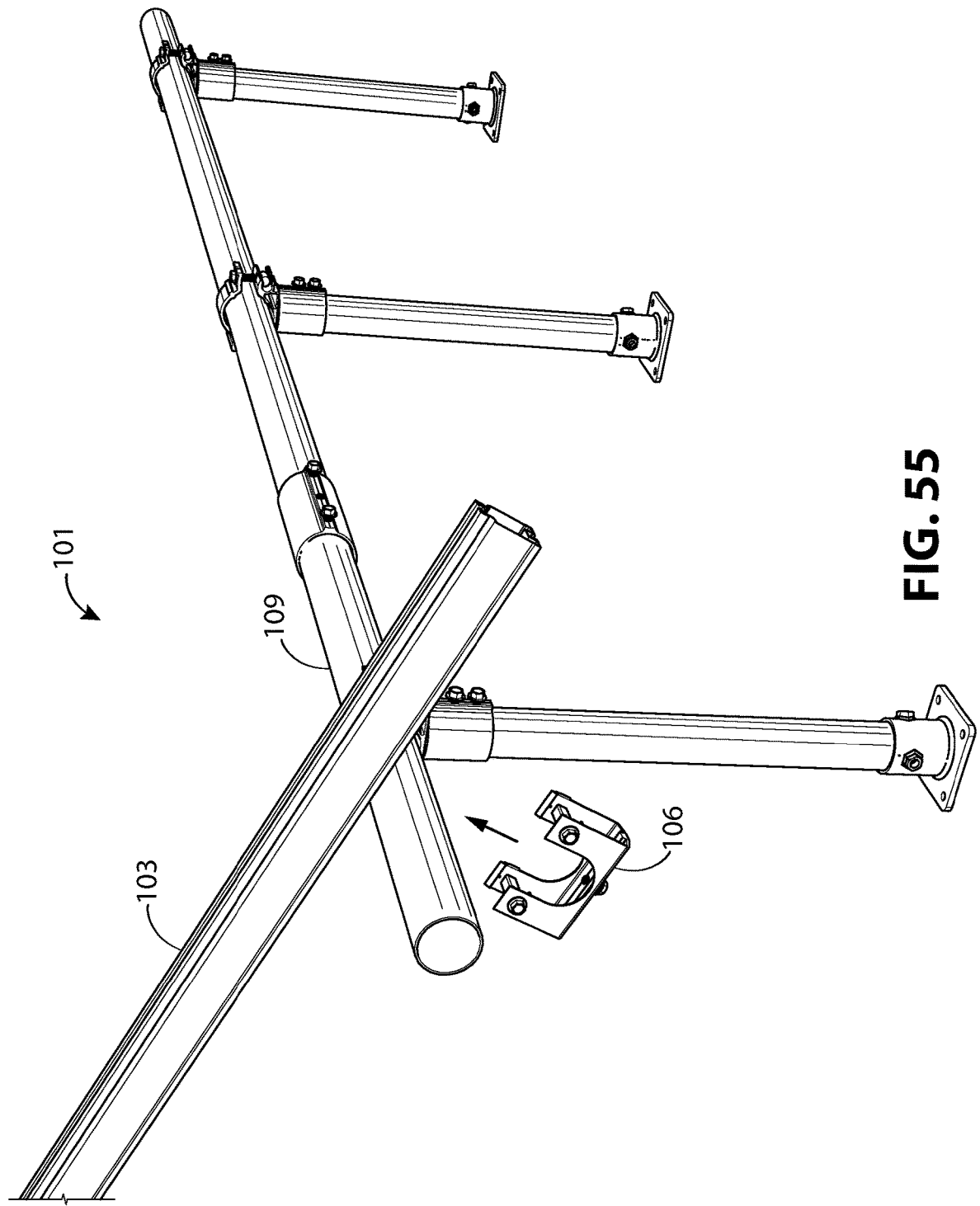
FIGS. 55 and 56 illustrate in perspective view and a front auxiliary view, respectively, an alternative step of attaching the rail clamp, rail, and lateral-oriented pipe.
Figure 56:
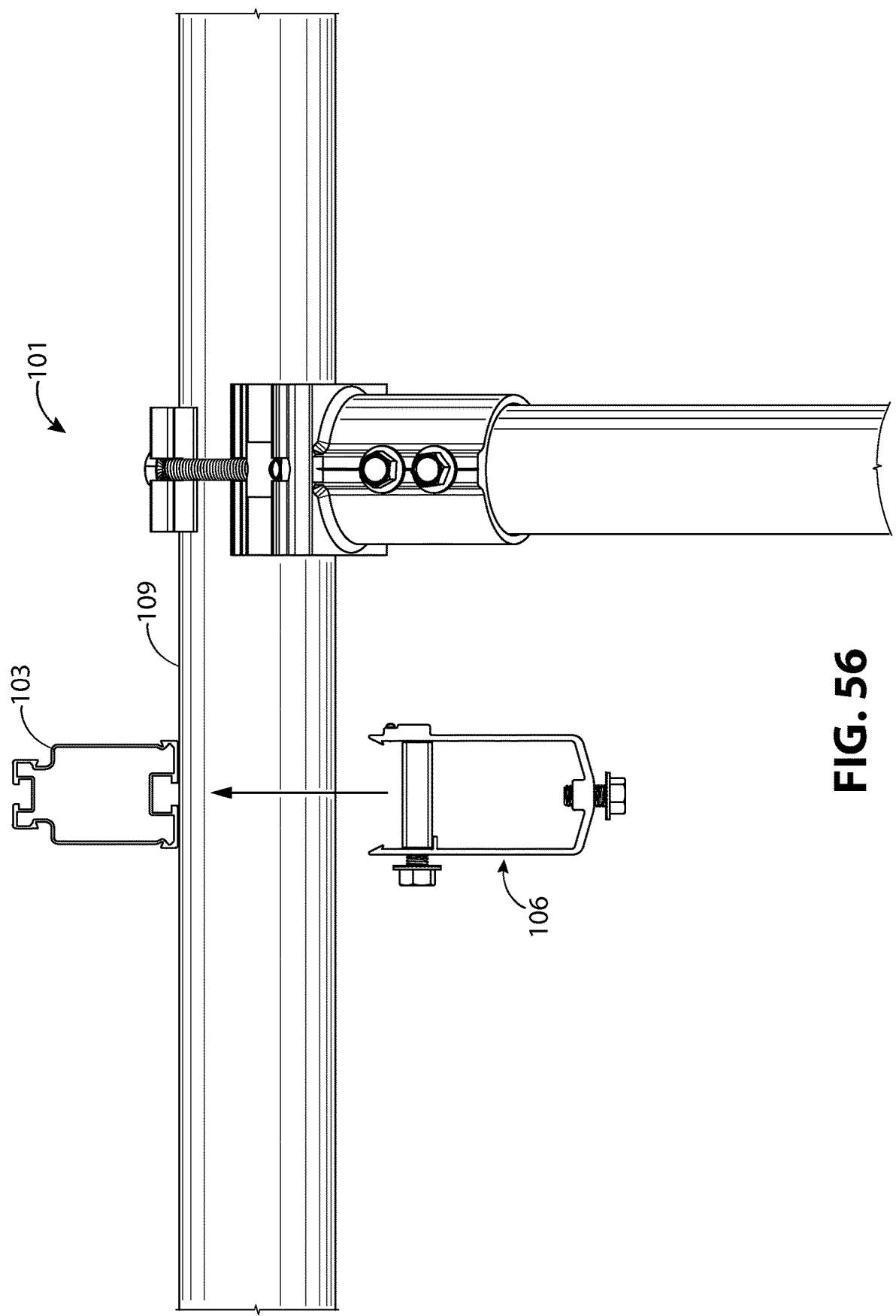

FIGS. 41, 55, and 56, show how steps 205 and 206 can be performed by first resting the rail 103 against pipe 109, or more than one pipe, to create a stable mounting surface. Rail-pipe bracket 106 is then brought upward, as was previously described, to snap rail-pipe bracket 106 against rail 103.

Figure 57:
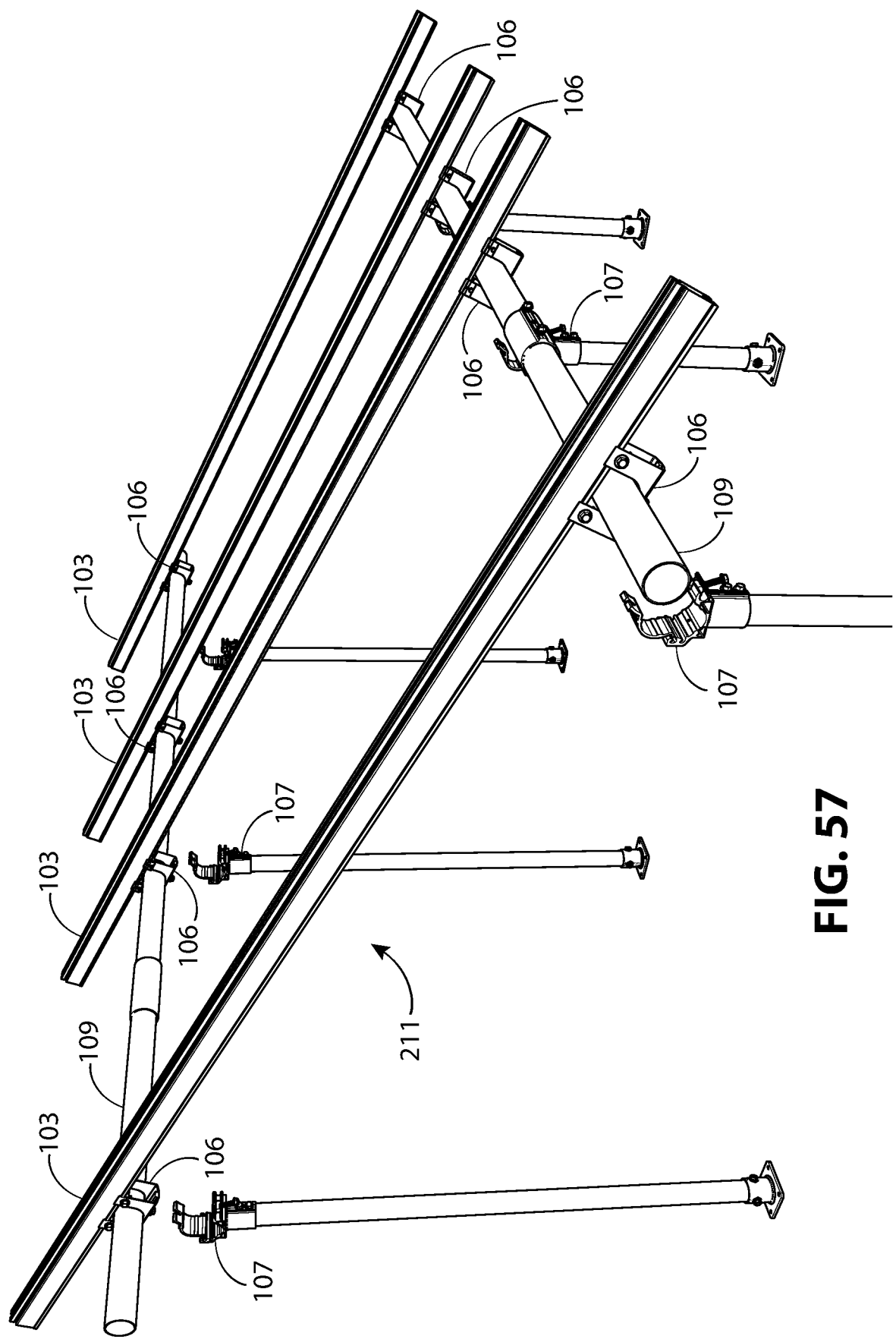
FIG. 57 illustrates, in perspective view, an alternative step of attaching a rail and pipe assembly to upward-oriented pipe assemblies.

Referring to FIGS. 41 and 57, it is possible to perform steps 205-208 first and then steps 202-204. For example, in FIG. 57, multiple instances of rail 103, pipe 109, and rail-pipe bracket 106 are pre-assembled together as a unit. The rail-pipe assembly 211, is attached to multiple instances of pipe clamp 107, as per steps 202-204. Note that step 201 can be performed either before or after rail-pipe assembly 211.

Additional Numbered Examples

The following are additional examples, in brief.

Example 1. A pipe clamp for securing a pipe in a solar panel mounting system, comprising: a pipe clamp body and a hinge arm; the pipe clamp body includes a cradle, a hinge-receiver extending upward from the cradle on a first end of the pipe clamp body, and a retainer extending outward from the cradle on a second of the pipe clamp body that is opposite the first end; the hinge-receiver includes a first channel extending widthwise along the hinge-receiver and a second channel positioned below the first channel extending widthwise along the hinge-receiver; the hinge arm includes hinge end and a clamp end positioned on opposite ends of the hinge arm; the hinge end is selectively pivotable within the first channel and the second channel; and the clamp end secures to the retainer.

Example 2. The pipe clamp of Example 1, further comprising: the retainer includes a retainer channel extending along the retainer; a cross-dowel positioned within the retainer channel; and a threaded fastener extends through the retainer and into the cross-dowel to secure the clamp end to the retainer.

Example 3. The pipe clamp of Example 1, further comprising: the retainer includes an upper arm, a lower arm positioned below the upper arm, a retainer channel extending along the retainer between the upper arm and the lower arm; a cross-dowel positioned within the retainer channel; and a threaded fastener extends through the upper arm and into the cross-dowel to secure the clamp end to the retainer.

Example 4. The pipe clamp of Example 1, further comprising: the retainer includes an upper arm, a lower arm positioned below the upper arm, a retainer channel extending along the retainer between the upper arm and the lower arm; the clamp end includes a first slot-shaped opening, the upper arm includes a second slot-shaped opening, and the lower arm includes a third slot-shaped opening; a cross-dowel positioned within the retainer channel; and a threaded fastener extends through the first slot-shaped opening and the second slot-shaped opening, and into the cross-dowel to secure the clamp end to the retainer, the threaded fastener is extendable through the cross-dowel and through the second slot-shaped opening.

Example 5. The pipe clamp of Example 1, further comprising: a bonding pin positioned within hinge arm and projecting inward toward the cradle.

Example 6. The pipe clamp of Example 1, wherein: the first channel and the second channel each curve upward into the hinge-receiver.

Example 7. The pipe clamp of Example 1, wherein the hinge end curves upward.

Example 8. The pipe clamp of Example 1, wherein: the first channel and the second channel each curve upward into the hinge-receiver; and the hinge end curves upward and is pivotable with the first channel and the second channel.

Example 9. The pipe clamp of Example 1, further comprising: a base extending downward from the cradle and a threaded fastener extending through the base.

Example 10. A device for securing a rail and a pipe in a solar panel mounting system, the rail including a rail bottom surface, comprising: a rail-pipe bracket body including a bottom and a first side and a second side extending upward from the bottom; the first side includes a first pair of hooks extending downward toward the bottom and a first pipe opening positioned through the first side and between the first pair of hooks; the second side includes a second pair of hooks extending downward toward the bottom and a second pipe opening positioned through the first side and between the first pair of hooks; and a first threaded fastener extends through the bottom toward the hooks.

Example 11. The device of Example 10, wherein: the first side and the second side are structured to seat the pipe; the first pair of hooks and the second pair of hooks are structured to secure the rail to the rail-pipe bracket body; and the first threaded fastener is positioned to press the pipe against the rail.

Example 12. A device for securing a rail and a pipe in a solar panel mounting system, the rail including a rail bottom surface, comprising: a rail-pipe bracket body including a bottom and a first side and a second side extending upward from the bottom; the first side includes a first pair of hooks extending downward toward the bottom and a first pipe opening positioned through the first side and between the first pair of hooks; the second side includes a second pair of hooks extending downward toward the bottom and a second pipe opening positioned through the first side and between the first pair of hooks; a first spacer and a second spacer removably attachable to the rail-pipe bracket body; and the first spacer and the second spacer each extend between the first side and the second side, are positioned outside the first pipe opening and the second pipe opening, and are positioned below the first pair of hooks and the second pair of hooks and above the bottom.

Example 13. The device of Example 12, wherein: the first side and the second side are structured to seat the pipe; the first pair of hooks and the second pair of hooks are structured to secure the rail to the rail-pipe bracket body; and a threaded fastener extending through the bottom toward the hooks and positioned to press the pipe against the rail.

Example 14. The device of Example 12, wherein: the first side and the second side are structured to seat the pipe; the first pair of hooks and the second pair of hooks are structured to secure the rail to the rail-pipe bracket body; and the first spacer and the second spacer are structured and positioned to seat the rail bottom surface.

Example 15. The device of Example 12, further comprising: a first threaded fastener extends through the first side, extends through the first spacer, and threadedly engages the second side; and a second threaded fastener extends through the first side, extends through the second spacer, and threadedly engages the second side.

Example 16. The device of Example 15, wherein: the first spacer limits how much the first threaded fastener can squeeze together the first side and the second side; and the second spacer limits how much the second threaded fastener can squeeze together the first side and the second side.

Example 17. The device of Example 12, wherein: the first spacer includes a first spacer top surface that is planar and is sized and shaped to seat the rail bottom surface and the second spacer includes a second spacer top surface that is planar and is sized and shaped to seat the rail bottom surface.

Example 18. The device of Example 12, wherein: the first spacer includes a first spacer bottom surface; and the rail-pipe bracket body includes a first platform, the first platform extends inward from the first side and is sized, shaped, and positioned to seat the first spacer bottom surface and prevent the first spacer from rotating.

Example 19. The device of Example 12, wherein: the rail-pipe bracket body comprises a one-piece body.

Example 20. The device of Example 12, wherein: a third threaded fastener extends through the bottom toward the hooks.

Example 21. A method for securing a rail and a pipe in a solar panel mounting system, comprising, inserting a pipe into a first side and a second side of a rail-pipe bracket body of a rail-pipe bracket; seating a rail on a spacer, the rail positioned above the pipe, the spacer and the rail positioned between the first side and second side, the spacer removably positioned between the first side and the second side; securing the rail to the rail-pipe bracket by tightening a threaded fastener extending through the first side, the spacer, and the second side, resulting in a first hook extending from the first side and a second hook extending from the second side to clamp detents in rail sides of the rail; and securing the pipe to the rail by tightening a second threaded fastener through a bottom of the rail-pipe bracket and against the pipe resulting in the pipe between pressed against a rail bottom surface.

Example 22. A method securing a first pipe to a second pipe in a solar panel mounting system, comprising: securing the first pipe to a base of a pipe clamp body of a pipe clamp; seating the second pipe in a cradle of a pipe clamp body of the pipe clamp, the cradle is positioned above the base; pivoting a hinge end of a hinge arm of a pipe clamp within one of a first channel and a second channel, the first channel and the second channel extending widthwise within a hinge-receiver of a pipe clamp body, the first channel is stacked above the second channel, the hinge-receiver extends upward from a first side of the cradle; securing a clamp end of the hinge arm to a retainer of the pipe clamp body; and the retainer extends outward from a second end of the cradle and the clamp end extends outward from the hinge arm opposite the hinge end.

Conclusion and Variations

The Summary, Detailed Description, and figures describe a system, devices, and methods related to a solar panel mounting system. This disclosure provides examples of devices, components, and configurations to help the reader understand the described general principles. The following are examples of variations and combinations of different components, structures, and features that still adhere to the general principles.

Figure 58:
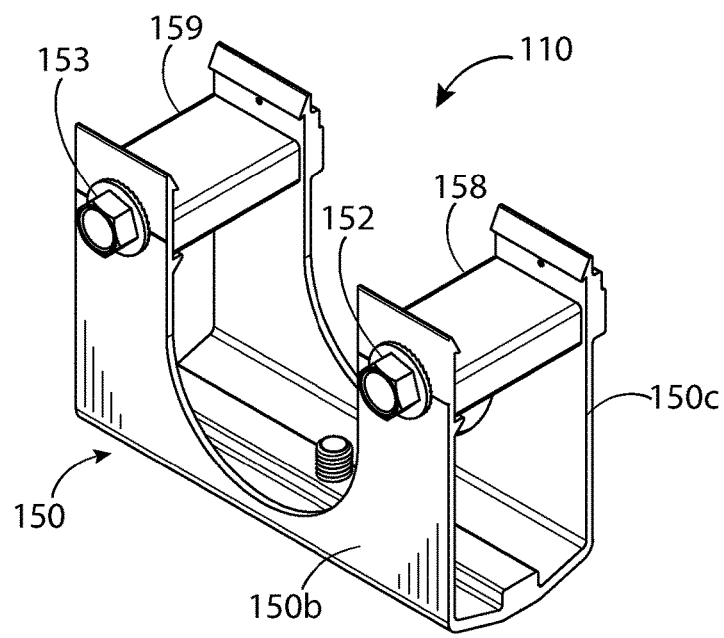
FIG. 58 illustrates in front isometric view, a rail-pipe bracket of the present disclosure with an alternative spacer.
Figure 59:
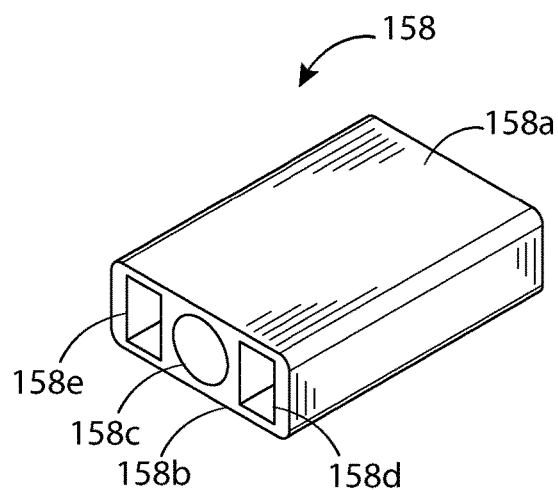
FIGS. 59 and 60 illustrate the alternative spacer in isometric and left-side view, respectively.
Figure 60:
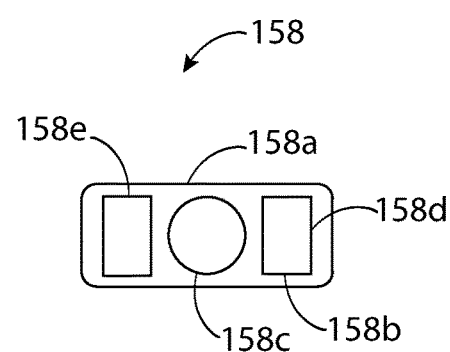

For example, FIGS. 32, 33, and 35 illustrate the spacer 154 and spacer 155. The Inventors envision other spacers that could be used with rail-pipe bracket 106. FIG. 58 illustrates rail-pipe bracket 110 using the same rail-pipe bracket body, rail-pipe bracket body 150, but with spacer 158 and spacer 159 both positioned between first side 150*b* and second side 150*c*. FIGS. 59 and 60 illustrate the spacer 158 in isometric and side view, respectively. The discussion that follows for these figures also applies to spacer 159 of FIG. 58. Referring to FIGS. 59 and 60, spacer 158 may have a rectangular cross section as illustrated. Spacer 158 includes spacer top surface 158*a* and spacer bottom surface 158*b*. Spacer top surface 158*a* can be planar, or partially planar, to accommodate a rail with a planar or a partially planar bottom surface. Spacer top surface 158*a* can also be non-planar to accommodate other rail bottom surfaces. For example, spacer top surface 158*a* could include a keyway projecting upward from the spacer to slidably engage a slot in a rail bottom surface. Spacer top surface 158*a* could include concave surfaces to seat a rail bottom surface with convex surfaces. Similarly, spacer top surface 158a could include convex surfaces to seat a rail bottom surface with concave surfaces. These features are not mutually exclusive with spacer 154 and spacer 155 of FIG. 32. Referring to FIG. 32, Spacer 154 and spacer 155 are illustrated with fillets, i.e., rounded or radiused edges. This is optional. The edges can be non-radiused. FIG. 38 illustrates spacer 154 with substantially planar sides. The sides can be any shape that allow the spacer to perform the function described in this disclosure. Spacer 154 and spacer 155 can be adapted to any of the modifications described in this paragraph. The various features are not necessarily mutually exclusive. For example, planar sides may be combined with a non-planar top. Non-planar sides can be combined with a planar top and so on.

Referring to FIGS. 59 and 60, aperture 158c is sized and shaped to pass through the body of a threaded fastener. For example, referring to FIGS. 58-60, the aperture 158c (FIGS. 59 and 60) can receive threaded fastener 152 (FIG. 58) or threaded fastener 153 (also FIG. 58). Aperture 158c is typically unthreaded, as previously discussed for aperture 154a in FIGS. 38-40. FIGS. 59 and 60 include additional apertures, aperture 158d and aperture 158e, which are optional. These apertures save material and reduce the weight of the spacer 158. While illustrated as rectangular, they can be any shape that accommodates the fabrication method of the spacer and does not compromise the spacer's strength.

Figure 61:
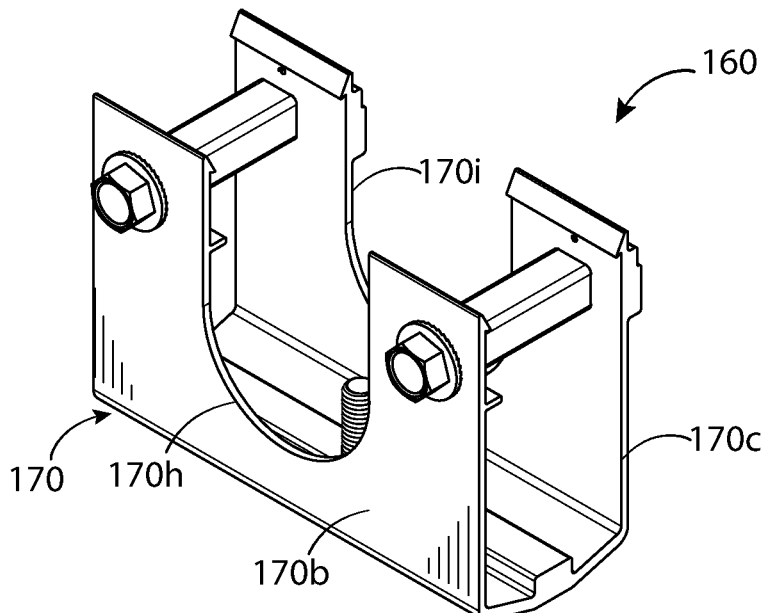
FIGS. 61, 62, 63, and 64 illustrate a first alternative rail-pipe bracket in front isometric view, rear isometric view, left-side view, and front view, respectively.
Figure 62:
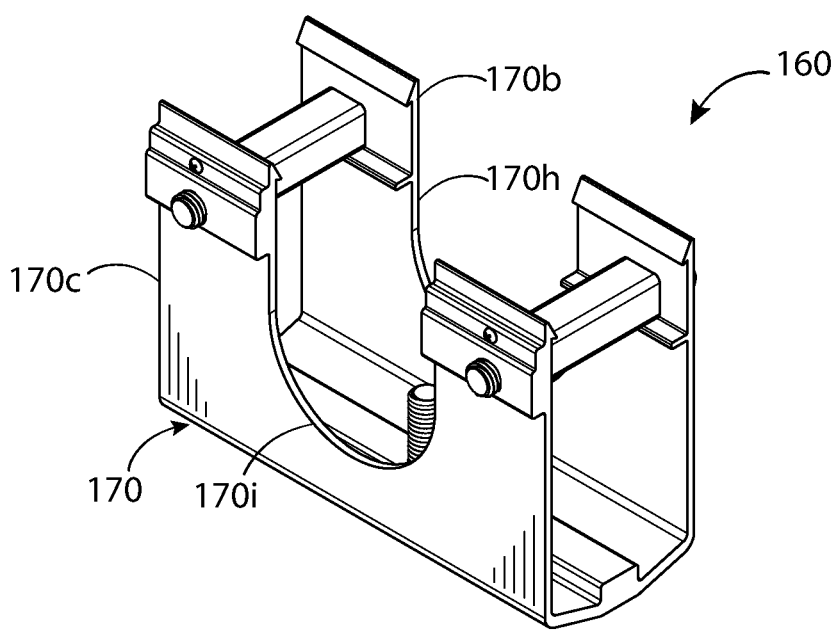
Figure 63:
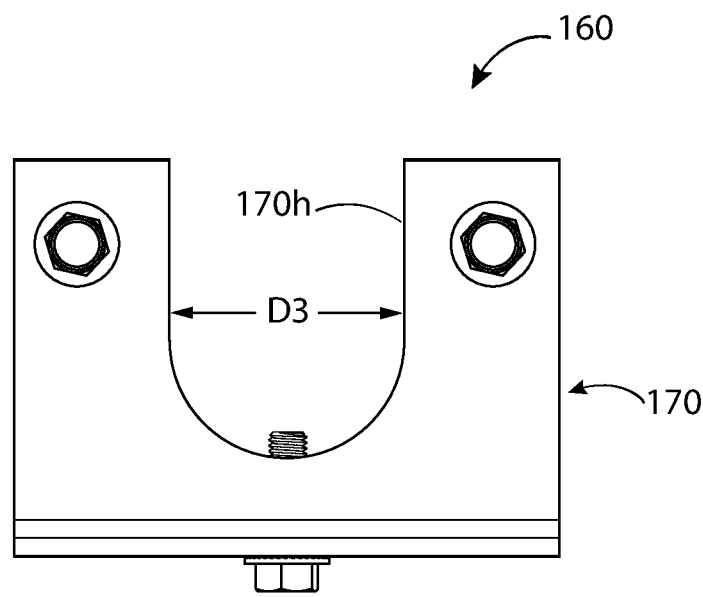
Figure 64:
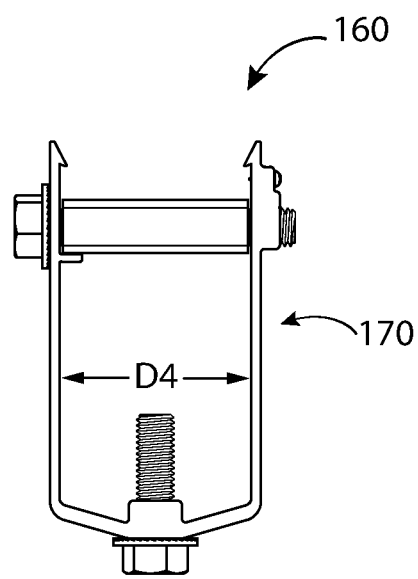

The pipe opening of the rail-pipe bracket can be sized to accommodate other pipe sizes. The shape of the pipe opening in the rail can also be modified to accommodate other shaped pipes (i.e., rectangular, hexagonal, etc.). For example, FIGS. 61-64 illustrate a rail-pipe bracket 160 with rail-pipe bracket body 170. Referring to FIGS. 61 and 62, rail-pipe bracket body 170 includes first pipe opening 170h and second pipe opening 170i in first side 170b and second side 170c, respectively. Referring to FIG. 63, the opening width D3 of the first pipe opening 170h, and the second pipe opening 170i is illustrated as narrower than the opening width D1 of the first pipe opening 150h of FIG. 36. The opening width D3 could be narrower or wider to accommodate other pipe widths. The dimensions of the rail-pipe bracket body 170 can be scaled up or down to accommodate larger or smaller pipes, respectively. Referring to FIG. 64, likewise, the width of the rail-pipe bracket body 170, width D4, can be narrower or wider than the width D2 of the rail-pipe bracket body 150 of FIG. 34 to accommodate wider or narrower rails.

Figure 65:
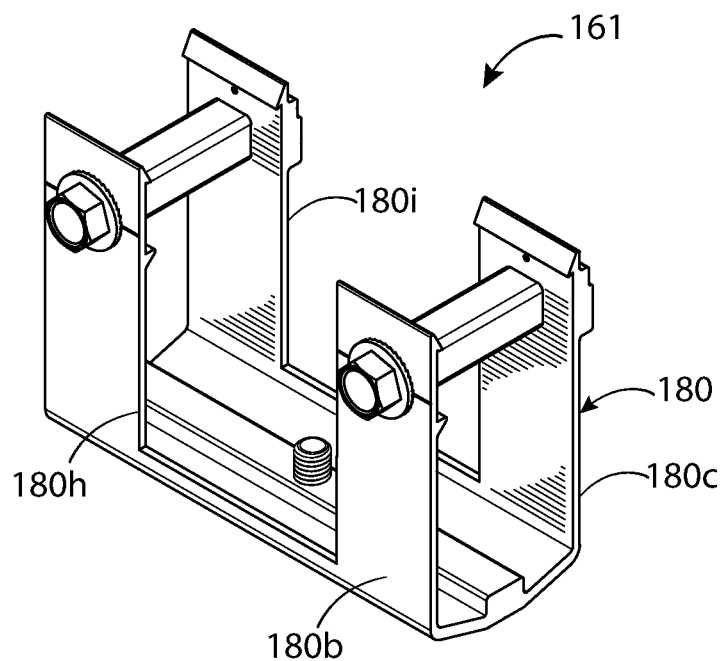
FIGS. 65 and 66 illustrate a second alternative rail-pipe bracket in front perspective view and front view, respectively.
Figure 66:
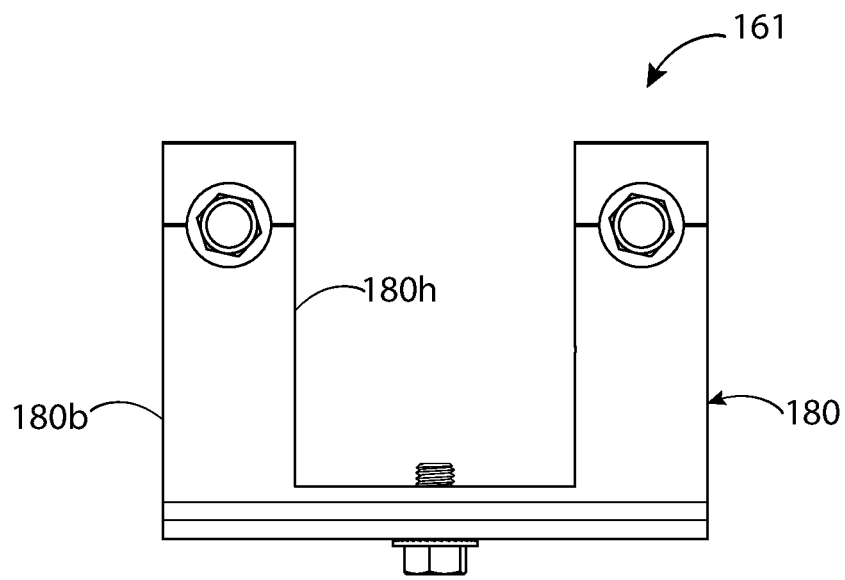

The rail-pipe bracket 161 of FIG. 65 includes pipe opening 180h and pipe opening 180i in rail side 180b and rail side 180c, respectively of pipe clamp body 180. The pipe openings are illustrated as rectangular to accommodate rectangular pipes. FIG. 66 also illustrates the rectangular opening, pipe opening 180h, in rail side 180b. The pipe openings could be shaped to accommodate other pipe cross sections. For example, the lower portion of the pipe opening could be shaped like the bottom three sides of a hexagon to receive a pipe with a hexagonal cross section. Note that the variations discussed in this paragraph and the last paragraph do not create mutually exclusive rail-pipe brackets. For example, an installer could modify the rail-pipe bracket of FIGS. 32-37 with one or more of these variations.

Figure 67:
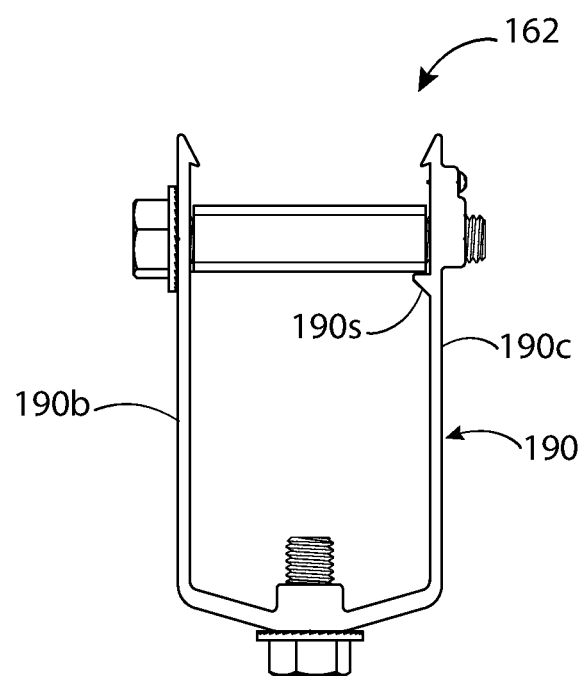
FIG. 67 illustrates, in front view, a third alternative rail-pipe bracket.

FIG. 33 illustrates platform 150s and platform 150t as extending from the first side 150b. Locating the platforms on the same side as the heads of the threaded fasteners helps to minimize rotation of the spacer bottom surface 154c and spacer bottom surface 155c. However, the platforms could instead extend from the second side 150c if required. FIG. 67 illustrates platform 190s extending from the second side 190c, i.e., the side away from the fastener head.

FIGS. 7, 9, 21, 23, 29, and 31 show one or more instances of bonding pin 119, which is optional. In FIGS. 7 and 9, one instance of bonding pin 119 engages cradle 121e while another instance of bonding pin 119 engages hinge arm 120. Additional benefit, as far as electrical bonding, might be gained from adding additional instances of bonding pin 119 to cradle 121e or hinge arm 120. The same is true for additional instances of bonding pin 119 to cradle 131e or hinge arm 130 of pipe clamp 113 of FIG. 23.

This disclosure shows the threaded fastener 117, 124, 125 of FIG. 7, threaded fastener 142, 144 of FIG. 29, threaded fastener 151, 152, 153 of FIG. 35 as hex head screws. These threaded fasteners may be any threaded fastener with suitable holding force to withstand the operating and environmental conditions of a particular solar panel system installation. For example, national, regional, or local building codes may require the solar panel mounting system to withstand specific wind forces or other harsh environmental conditions. While the fastener heads illustrated are hex head or flanged hex head, an installer or system designer can substitute other fastener heads that might be suitable for hand tools, electric, or pneumatic tools used to install the solar panel system. Examples of such fastener heads may include socket head, truss head, or pan head. These can include various drive patterns, for example, Phillips, slot, Torx, Frearson, Clutch, square (Robertson), hex, square slot combination, fluted socket, and various types of other drive patterns known in the art, and suitable for installing a solar panel mounting system.

FIG. 21 illustrates first washer 136 as a flat washer and second washer 137 as a star washer. These washers are optional and these washers are not limited to the types shown. For example, first washer 136 could be a fender washer, a shoulder washer, or any other washer that can provide a suitable mounting surface against the curved slot-shaped aperture 131O. If electrical bonding is the purpose of using the second washer 137, then an installer or system designer may choose any washers suitable for electrical bonding. For example, they may choose an external tooth washer, split washer, spring washers, wedge lock washer, or washers specifically designed for electrical conductivity. If the primary purpose of the second washer 137 is to prevent loosening because of vibration, then a washer may be chosen that is suitable for this purpose. For example, the installer or system designer may choose a lock washer or a wedge lock washer. Alternatively, an installer or system designer may choose a thread-locking chemical to prevent loosening. For example, the installer or system designer might choose a thread-locking chemical sold under the brand name LOCTITE® or a functional equivalent. In addition, the functionality of first washer 136 could be built into threaded fastener 135.

Referring to FIG. 50, the first hook 150d and third hook 150f are shaped and structured to hook into and secure the corresponding detents, rail lower detent 103a and rail lower detent 103b in rail 103. Referring to FIGS. 32 and 33, the shape of first hook 150d, second hook 150e, third hook 150f, and fourth hook 150g could be optimized for other rail types. For example, the current shape of these hooks will work with a rail with a flanged rail bottom ("flanged rail") and possibly provide electrical bonding. However, modifying the lower surface of the hooks to parallel with corresponding spacer top surfaces might provide better pullup strength for the flanged rail.

Throughout this disclosure the various pipe clamps are shown with two channels for receiving a hinge end, for example, first channel 121a and second channel 121b in the hinge-receiver 121c of FIGS. 6 and 7. The hinge-receiver 121c may include additional channels for receiving a hinge end. As an example, hinge-receiver 121c, hinge-receiver 131c, and hinge-receiver 141c of FIGS. 7, 21, and 29, respectively can include three, four, five, or even more channels as required. The shape of the hinge arm and cradle, as well as the position of the retainer could be adjusted to accommodate the additional channels.

The rails, pipes, end clamps, and mid clamps shown in this disclosure are examples. The solar panel mounting system can use other rails, pipes, end clamps, and mid clamps. While the end clamps, mid clamps, and rails snap together without tools, which is an advantage, the rail-pipe bracket does not require such a structure. The rail-pipe brackets may be used with any rail where the hooks can latch and secure detents, grooves, slots, or other similar structures in the rail sides. If the rail was replaced, then the installer could choose end clamps and mid clamps suitable for the substitute rails.

Similarly, as discussed earlier in this section, the rail-pipe brackets can be modified to work with pipes have cross-sectional shapes other than those illustrated. Similarly, the cradle and hinge arm could be modified to work with other shaped pipes. For example, the cradle and hinge arm together could form a rectangular interior, a hexagonal interior, or an oval interior to match pipes with rectangular, hexagonal, or oval cross-sections, respectively. Similarly, the base of the pipe clamps could be shaped to accommodate different shaped pipes. For example, the pipe base interior 123a (i.e., sleeve) of the pipe clamp base 123 in FIG. 9 could have a rectangular or hexagonal cross-sectional shape.

FIGS. 1-3 show solar panel system 100 and solar panel mounting system 101 in simplified form. This system showed six instances of solar panel 102. An actual solar panel system and solar panel mounting system might have fewer or more solar panels. For example, a simple solar panel system using the components discussed in this disclosure could include two solar panels. A more complex residential ground-mount system could include twenty-five or even fifty solar panels. A commercial ground-mount or commercial building roof top installation could include hundreds or even thousands of solar panels.

FIGS. 1-3 show the solar panel system 100 secured to mounting surface 115 using pipe base 116. The pipe base is typically anchored to a concrete ballast or concrete foundation using masonry screws or other masonry attachments. The pipe base 116 is optional. For example, the instances of pipe 111 could be coupled to a ground screw or helical anchor. The ground screw or helical anchor would be secured directly in the ground. Alternatively, pipe 111 could be embedded in either a concrete ballast, a concrete base, or cast in concrete in the ground.

In addition to ground-mount systems, the disclosed system can be used in some roof-mount systems. For example, the system of FIGS. 1-3 could be mounted to a commercial roof top using masonry fasteners with little or no modification. The pipe clamps discussed throughout this disclosure can be used in other systems that join pipes together, for example a scaffolding system. The rail-pipe brackets can be used in other systems that requires attachment of a rail to a pipe.

The solar panel system 100 of FIGS. 1-3, and its above-mentioned variations, could be used as a ground-mounted carport or shade structure by extending the length of pipes 111. The solar panel system 100, and its variations, could be similarly modified and used as a shade structure on a concrete roof top.

The variations described, the general principles taught, and undescribed variations, devices, and systems that encompass the general principles described in this disclosure, are within the claim's scope.

The invention claimed is:

1. A pipe clamp for securing a pipe in a solar panel mounting system, comprising:
   a pipe clamp body and a hinge arm;
   the pipe clamp body includes a cradle, a hinge-receiver integral with and extending upward from the cradle on a first end of the pipe clamp body, a retainer extending outward from the cradle on a second of the pipe clamp body that is opposite the first end;
   the hinge-receiver includes a first channel extending widthwise along the hinge-receiver and a second channel positioned below the first channel extending widthwise along the hinge-receiver;
   the hinge arm includes hinge end and a clamp end positioned on opposite ends of the hinge arm;
   the hinge end is selectively pivotable within the first channel and the second channel;
   the clamp end secures to the retainer;
   a space between the cradle, the hinge arm, the hinge-receiver, and the retainer form a cavity; and
   the first channel and the second channel each curve upward into the hinge-receiver and includes an opening that extends outward from the hinge-receiver into the cavity.

2. The pipe clamp of claim 1, further comprising:
   the retainer includes a retainer channel extending along the retainer;
   a cross-dowel positioned within the retainer channel; and
   a threaded fastener extends through the retainer and into the cross-dowel to secure the clamp end to the retainer.

3. The pipe clamp of claim 1, further comprising:
   the retainer includes an upper arm, a lower arm positioned below the upper arm, a retainer channel extending along the retainer between the upper arm and the lower arm;
   a cross-dowel positioned within the retainer channel; and
   a threaded fastener extends through the upper arm and into the cross-dowel to secure the clamp end to the retainer.

4. The pipe clamp of claim 1, further comprising:
   the hinge arm includes a blind aperture; and
   a bonding pin positioned within the blind aperture and projecting inward toward the cradle.

5. A pipe clamp for securing a lateral-oriented pipe and upward-oriented pipe in a solar panel mounting system, comprising:
   a pipe clamp body and a hinge arm;
   the pipe clamp body includes a cradle structured to seat the lateral-oriented pipe, a hinge-receiver integral with and extending upward from the cradle on a first end of the pipe clamp body, a retainer extending outward from the cradle on a second of the pipe clamp body that is opposite the first end, and a pipe clamp base extending downward from the cradle;
   the pipe clamp base includes a sleeve with an interior wall, the interior wall is structured to receive the upward-oriented pipe;
   the hinge-receiver includes a first channel extending widthwise along the hinge-receiver and a second channel positioned below the first channel extending widthwise along the hinge-receiver;

the hinge arm includes hinge end and a clamp end positioned on opposite ends of the hinge arm;

the hinge end is selectively pivotable within the first channel and the second channel;

the clamp end secures to the retainer;

a space between the cradle, the hinge arm, the hinge-receiver, and the retainer form a cavity; and the first channel and the second channel each curve upward into the hinge-receiver and includes an opening that extends outward from the hinge-receiver into the cavity.

6. The pipe clamp of claim 5, further comprising:

the retainer includes a retainer channel extending along the retainer;

a cross-dowel positioned within the retainer channel; and a threaded fastener extends through the retainer and into the cross-dowel to secure the clamp end to the retainer.

7. The pipe clamp of claim 5, further comprising:

the retainer includes an upper arm, a lower arm positioned below the upper arm, a retainer channel extending along the retainer between the upper arm and the lower arm;

a cross-dowel positioned within the retainer channel; and a threaded fastener extends through the upper arm and into the cross-dowel to secure the clamp end to the retainer.

8. The pipe clamp of claim 5, further comprising:

the hinge arm includes a blind aperture; and a bonding pin positioned within the blind aperture and projecting inward toward the cradle.

9. The pipe clamp of claim 5, further comprising:

a threaded fastener extending through the sleeve, into an interior of the sleeve, and capable of pressing the upward-oriented pipe against the interior of the sleeve.

* * * * *